(12) United States Patent
Gao

(10) Patent No.: US 11,218,349 B2
(45) Date of Patent: Jan. 4, 2022

(54) SHORTENED PHYSICAL UPLINK CONTROL CHANNEL TRANSMISSION METHHOD, USER EQUIPMENT AND BASE STATION

(71) Applicant: CHINA ACADEMY OF TELECOMMUNICATIONS TECHNOLOGY, Beijing (CN)

(72) Inventor: Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/323,774

(22) PCT Filed: May 26, 2017

(86) PCT No.: PCT/CN2017/086055
§ 371 (c)(1),
(2) Date: Feb. 6, 2019

(87) PCT Pub. No.: WO2018/028273
PCT Pub. Date: Feb. 15, 2018

(65) Prior Publication Data
US 2019/0173703 A1    Jun. 6, 2019

(30) Foreign Application Priority Data

Aug. 10, 2016  (CN) .......................... 201610654088.8

(51) Int. Cl.
*H04L 27/26* (2006.01)
*H04L 5/00* (2006.01)
(Continued)

(52) U.S. Cl.
CPC ........ *H04L 27/2607* (2013.01); *H04L 1/1861* (2013.01); *H04L 1/1864* (2013.01);
(Continued)

(58) Field of Classification Search
CPC . H04L 27/2607; H04L 1/1861; H04L 5/0053; H04L 1/1864; H04L 27/2602;
(Continued)

(56) References Cited

U.S. PATENT DOCUMENTS

2010/0074343 A1   3/2010 Gaal et al.
2013/0058302 A1   3/2013 Kim et al.
(Continued)

FOREIGN PATENT DOCUMENTS

CN    102075313 A    5/2011
CN    102224719 A    10/2011
(Continued)

OTHER PUBLICATIONS

Partial Supplementary European Search Report from EP app. No. 17838405.3, dated Jul. 1, 2019.
(Continued)

*Primary Examiner* — Kwang B Yao
*Assistant Examiner* — Syed M Bokhari
(74) *Attorney, Agent, or Firm* — Ladas & Parry, LLP

(57) ABSTRACT

The present disclosure provides an sPUCCH transmission method, a UE and a base station. The sPUCCH transmission method includes: receiving downlink data, and acquiring a cyclic shift value for the transmission of an sPUCCH in accordance with indication information carried in a downlink control channel corresponding to the received downlink data; and transmitting the sPUCCH in accordance with the cyclic shift value, ACK/NACK feedback information for the downlink data being carried in the sPUCCH.

16 Claims, 14 Drawing Sheets transmitting downlink data, and carrying indication information in a downlink control channel corresponding to the downlink data, the indication information being adopted by a UE for acquiring a cyclic shift value for the transmission of an sPUCCH  ∼ 1301 receiving the sPUCCH and acquiring ACK/NACK feedback information for the downlink data in the sPUCCH, the sPUCCH being transmitted by the UE in accordance with the cyclic shift value  ∼ 1302

(51) Int. Cl.
    *H04L 1/18*        (2006.01)
    *H04W 72/04*       (2009.01)
(52) U.S. Cl.
    CPC .......... *H04L 5/0053* (2013.01); *H04L 5/0055* (2013.01); *H04L 27/2602* (2013.01); *H04W 72/0413* (2013.01); *H04W 72/0446* (2013.01); *H04W 72/0453* (2013.01); *H04L 5/0007* (2013.01); *H04L 27/2636* (2013.01)
(58) Field of Classification Search
    CPC . H04L 5/0055; H04L 27/2636; H04L 5/0007; H04L 5/0044; H04W 72/0453; H04W 72/0446; H04W 72/0413; H04W 72/042; H04W 72/044
    USPC ......................................................... 370/329
    See application file for complete search history.

(56)            References Cited

U.S. PATENT DOCUMENTS

| | | | |
|---|---|---|---|
| 2013/0272258 | A1 | 10/2013 | Lee et al. |
| 2015/0195070 | A1 | 7/2015 | Kim et al. |
| 2017/0142713 | A1* | 5/2017 | Chendamarai Kannan ................. H04W 72/0446 |
| 2017/0223695 | A1* | 8/2017 | Kwak ............... H04W 56/0005 |
| 2018/0098337 | A1* | 4/2018 | Lee ................... H04W 72/1278 |
| 2018/0212732 | A1* | 7/2018 | You ....................... H04L 5/0053 |

FOREIGN PATENT DOCUMENTS

| | | |
|---|---|---|
| CN | 103384188 A | 11/2011 |
| CN | 103384183 A | 11/2013 |
| CN | 103404063 A | 11/2013 |
| CN | 104811281 A | 7/2015 |
| CN | 105471555 A | 4/2016 |
| CN | 105827371 A | 8/2016 |
| EP | 2704345 A1 | 3/2014 |
| JP | 2014501464 A | 1/2014 |
| KR | 20130009828 A | 1/2013 |

OTHER PUBLICATIONS

First Office Action and Search Report from CN app. No. 201610654088.8, dated Dec. 24, 2018, with English translation from Global Dossier.
"Physical layer aspects of short TTI for uplink transmissions", R1-157149, 3GPP TSG RAN WG1 Meeting #83, Anaheim, USA, Nov. 15-22, 2015.
"Definition of DCI bit fields for short TTI", R1-163323, 3GPP TSG RAN WG1 Meeting #84bis, Busan, Korea, Apr. 11-15, 2016.
"Discussion on PUCHH design for HARQ-ACK in shortened TTI", R1-163520, 3GPP TSG RAN WG1 Meeting #84bis. Busan, Korea, Apr. 11-15, 2016.
"Discussion on sPUCCH for HARQ-ACK in latency reduction", R1-164545, 3GPP TSG RAN WG1 Meeting #85, Nanjing, China, May 23-27, 2016.
"Discussion on sPUCCH for HARQ-ACK in latency reduction", R1-164546, 3GPP TSG RAN WG1 Meeting #85, Nanjing, China, May 23-27, 2016.
Written Opinion of the International Searching Authority from PCT/CN2017/086055, dated Aug. 17, 2017, with English translation from WIPO.
International Preliminary Report on Patentability from PCT/CN2017/086055, dated Feb. 12, 2019, with English translation from WIPO.
International Search Report for PCT/CN2017/086055 dated Aug. 17, 2017.and its English translation provided by WIPO.
Written Opinion of the International Searching Authority for PCT/CN2017/086055 dated Aug. 17, 2017 and its English translation provided by Google Translate.
Office Action dated Aug. 24, 2017 for Chinese Patent Application No. 201410077596.5, the search report, and its English translation by Global Dossier.
(3GPP TSG RAN WG1 #68 R1-120156), Dresden, Germany, Feb. 6-10, 2012, Samsung, "Resource allocation for PUCCH format Ib with Channel selection in TDD".
"Channel design of shortened PUCCH", R1-165001, 3GPP TSG RAN WG1 Meeting #85, Nanjing, China, May 23-27, 2016.
Extended European Search Report from EP app. No. 17838405.3 dated Oct. 16, 2019.
Notification of Reason for Refusal from KR app. No. 10-2019-7006632, dated May 21, 2020, with English translation from Global Dossier.
"Link-level evaluation of TTI shortening in UL", R1-163067, 3GPP TSG RAN WG1 #84b, Busan, Korea, Apr. 11-15, 2016.
Communication pursuant to Article 94(3) EPC from EP app. No. 17838405.3, dated Aug. 11, 2020.
"Discussion on PUCCH design for HARQ-ACK in shortened TTI", R1-162507, 3GP TSG RAN WG1 Meeting #84bis, Busan, Korea, Apr. 11-15, 2016.
Notice of Reasons for Refusal from JP app. No. 2019-506100, dated Nov. 17, 2020, with English translation from Global Dossier.
Notification of Reason for Refusal from KR app. No. 10-2019-7006632, dated Nov. 27, 2020.
Notice of Reasons for Refusal from JP app. No. 2019-506100, dated Mar. 9, 2021, with English translation provided by Global Dossier.

* cited by examiner

SHORTENED PHYSICAL UPLINK CONTROL CHANNEL TRANSMISSION METHHOD, USER EQUIPMENT AND BASE STATION

CROSS REFERENCE TO ELATED APPLICATIONS

The present application is the U.S. national phase of PCT/CN2017/086055 filed on May 26, 2017, which claims priority to Chinese Patent Application No. 201610654088.8 filed on Aug. 10, 2016, the disclosures of which are incorporated by reference herein in their entireties.

TECHNICAL FIELD

The present disclosure relates to the field of communication technology, in particular to a shortened Physical Uplink Control Channel (sPUCCH) transmission method, a User Equipment (UE), and a base station.

BACKGROUND

Along with the development of the mobile communication business requirements, many organizations including the International Telecommunications Union (ITU) have defined a higher user-plane time-delay performance requirement for a future mobile communication system. One of the principal methods for reducing a user-plane time delay is to reduce a length of a Transmission Time Interval (TTI). Hence, it is necessary for the mobile communication system to support an sPUCCH.

FIG. 15 shows a frame structure type 1 (FS1) adopted by a conventional Long Term Evolution (LTE) Frequency Division Duplexing (FDD) system. In the LTE FDD system, different carrier frequencies are adopted for uplink and downlink transmission, but a same frame structure is adopted for the uplink and downlink transmission. On each carrier, a radio frame having a length of 10 ms includes 10 subframes each having a length of 1 ms. Each subframe includes two time slots each having a length of 0.5 ms, and a length of the TTI for the transmission of uplink and downlink data is 1 ms.

FIG. 16 shows a frame structure type 2 (FS2) adopted by a conventional LTE Time Division Duplexing (TDD) system. In the LTE TDD system, different subframes or time slots are adopted for the uplink and downlink transmission at a same frequency. In the FS2, each radio frame having a length of 10 ms includes two half-frames each having a length of 5 ms. Each half-frame includes 5 subframes each having a length of 1 ms. There are three types of subframes in the FS2, i.e., downlink subframes, uplink subframes and special subframes. Each special subframe includes a Downlink Pilot Time Slot (DwPTS), a Guard Period (GP) and an Uplink Pilot Time Slot (UpPTS). Each half-frame includes at least one downlink subframe, at least one uplink subframe, and at most one special subframe.

In the conventional LTE system, the channel transmission is defined on a subframe basis, so there is no scheme for the transmission of the sPUCCH.

SUMMARY

An object of the present disclosure is to provide an sPUCCH transmission method, a UE and a base station, so as to provide a scheme for the transmission of the sPUCCH as compared with the conventional LTE system where the channel transmission is defined on a subframe basis.

In one aspect, the present disclosure provides in some embodiments an sPUCCH transmission method, including: receiving downlink data, and acquiring a cyclic shift value for the transmission of an sPUCCH in accordance with indication information carried in a downlink control channel corresponding to the received downlink data; and transmitting the sPUCCH in accordance with the cyclic shift value, Acknowledgement (ACK)/Negative ACK (NACK) feedback information for the downlink data being carried in the sPUCCH.

In some possible embodiments of the present disclosure, the receiving the downlink data, and acquiring the cyclic shift value for the transmission of the sPUCCH in accordance with the indication information carried in the downlink control channel corresponding to the received downlink data includes: receiving a shortened Physical Downlink Shared Channel (sPDSCH) with a corresponding downlink control channel or a downlink control channel indicating that a short downlink Semi-Persistent Scheduling (SPS) resource release, and acquiring the cyclic shift value for the transmission of the sPUCCH in accordance with the indication information carried in the downlink control channel; or receiving an sPDSCH without the corresponding downlink control channel, and acquiring the cyclic shift value for the transmission of the sPUCCH in accordance with the indication information carried in the downlink control channel indicating that the short downlink SPS resource activation.

In some possible embodiments of the present disclosure, the transmitting the sPUCCH in accordance with the cyclic shift value includes: generating a base sequence, and performing a cyclic shift operation on the base sequence in accordance with the cyclic shift value; modulating the ACK/NACK feedback information so as to acquire a modulation symbol; and acquiring a modulation symbol sequence in accordance with the modulation symbol and the cyclically-shifted base sequence, and mapping the modulation symbol sequence to time-domain and frequency-domain resources of the sPUCCH for transmission.

In some possible embodiments of the present disclosure, when a plurality of Single Carrier-Frequency Division Multiple Access (SC-FDMA) symbols is occupied by the sPUCCH for transmitting the ACK/NACK feedback information, the generating the base sequence and performing the cyclic shift operation on the base sequence in accordance with the cyclic shift value includes: applying a same cyclic shift value to each SC-FDMA symbol; or applying different cyclic shift values to different SC-FDMA symbols, and determining the cyclic shift value corresponding to each SC-FDMA symbol in accordance with the acquired cyclic shift value, or when the acquired cyclic shift value includes a plurality of values, determining one value of the acquired a plurality of cyclic shift values as the cyclic shift value corresponding to each SC-FDMA symbol.

In some possible embodiments of the present disclosure, the acquiring the modulation symbol sequence in accordance with the modulation symbol and the cyclically-shifted base sequence and mapping the modulation symbol sequence to the time-domain and frequency-domain resources in the sPUCCH for transmission includes: carrying same ACK/NACK feedback information in each SC-FDMA symbol; or carrying different ACK/NACK feedback information in different SC-FDMA symbols.

In some possible embodiments of the present disclosure, when the same cyclic shift value is applied to each SC-FDMA symbol and the same ACK/NACK feedback information is carried in each SC-FDMA symbol, the generating the base sequence and performing the cyclic shift operation on the base sequence in accordance with the cyclic shift value includes generating the base sequence, and performing the cyclic shift operation on the base sequence in accordance with the cyclic shift value, so as to acquire the cyclically-shifted base sequence as the cyclically-shifted base sequence corresponding to each SC-FDMA symbol. The acquiring the modulation symbol sequence in accordance with the modulation symbol and the cyclically-shifted base sequence and mapping the modulation symbol sequence to the time-domain and frequency-domain resources in the sPUCCH for transmission includes: multiplying the modulation symbol with the cyclically-shifted base sequence so as to acquire the modulation symbol sequence carried in one SC-FDMA symbol; and duplicating the modulation symbol sequence carried in the one SC-FDMA symbol into a plurality of modulation symbol sequences and mapping the duplicated modulation symbol sequences to the SC-FDMA symbols respectively for transmission. When the same cyclic shift value is applied to each SC-FDMA symbol and different ACK/NACK feedback information is carried in different SC-FDMA symbols, the generating the base sequence and performing the cyclic shift operation on the base sequence in accordance with the cyclic shift value includes generating the base sequence, and performing the cyclic shift operation on the base sequence in accordance with the cyclic shift value, so as to acquire the cyclically-shifted base sequence corresponding to each SC-FDMA symbol. The acquiring the modulation symbol sequence in accordance with the modulation symbol and the cyclically-shifted base sequence and mapping the modulation symbol sequence to the time-domain and frequency-domain resources in the sPUCCH for transmission includes: multiplying one of the modulation symbols carried in an $i^{th}$ SC-FDMA symbol of the plurality of SC-FDMA symbols with the cyclically-shifted base sequence, so as to acquire a modulation symbol sequence as the cyclically-shifted base sequence corresponding to the $i^{th}$ SC-FDMA symbol, where i=0, 1, . . . , A−1, and A represents the quantity of the SC-FDMA symbols; and mapping the modulation symbol sequence corresponding to the $i^{th}$ SC-FDMA symbol to the $i^{th}$ SC-FDMA symbol for transmission. When different cyclic shift values are applied to different SC-FDMA symbols and the same ACK/NACK feedback information is carried in each SC-FDMA symbol, the generating the base sequence and performing the cyclic shift operation on the base sequence in accordance with the cyclic shift value includes generating the base sequence, and performing the cyclic shift operation on the base sequence in accordance with the cyclic shift value corresponding to each SC-FDMA symbol, so as to acquire the cyclically-shifted base sequence corresponding to the SC-FDMA symbol respectively. The acquiring the modulation symbol sequence in accordance with the modulation symbol and the cyclically-shifted base sequence and mapping the modulation symbol sequence to the time-domain and frequency-domain resources in the sPUCCH for transmission includes: multiplying the modulation symbol with the cyclically-shifted base sequence corresponding to each SC-FDMA symbol, so as to acquire the modulation symbol sequence corresponding to each SC-FDMA symbol respectively; and mapping the modulation symbol sequence corresponding to each SC-FDMA symbol to a corresponding one of the SC-FDMA symbols for transmission. When different cyclic shift values are applied to different SC-FDMA symbols and different ACK/NACK feedback information is carried in different SC-FDMA symbols, the generating the base sequence and performing the cyclic shift operation on the base sequence in accordance with the cyclic shift value includes generating the base sequence, and performing the cyclic shift operation on the base sequence in accordance with the cyclic shift value corresponding to each SC-FDMA symbol, so as to acquire the cyclically-shifted base sequence corresponding to each SC-FDMA symbol respectively. The acquiring the modulation symbol sequence in accordance with the modulation symbol and the cyclically-shifted base sequence and mapping the modulation symbol sequence to the time-domain and frequency-domain resources in the sPUCCH for transmission includes: multiplying one of the modulation symbols carried in an $i^{th}$ SC-FDMA symbol of the plurality of SC-FDMA symbols with the cyclically-shifted base sequence corresponding to the $i^{th}$ SC-FDMA symbol, so as to acquire a modulation symbol sequence corresponding to the $i^{th}$ SC-FDMA symbol, where i=0, 1, . . . , A−1, and A represents the quantity of the SC-FDMA symbols; and mapping the modulation symbol sequence corresponding to the $i^{th}$ SC-FDMA symbol to the $i^{th}$ SC-FDMA symbol for transmission.

In some possible embodiments of the present disclosure, the acquiring the modulation symbol sequence in accordance with the modulation symbol and the cyclically-shifted base sequence and mapping the modulation symbol sequence to the time-domain and frequency-domain resources in the sPUCCH for transmission includes acquiring the modulation symbol sequence in accordance with the modulation symbol, the cyclically-shifted base sequence and a time-domain orthogonal spreading sequence, and mapping the modulation symbol sequence to the time-domain and frequency-domain resources of the sPUCCH for transmission.

In some possible embodiments of the present disclosure, when the same cyclic shift value is applied for each SC-FDMA symbol, the generating the base sequence and performing the cyclic shift operation on the base sequence in accordance with the cyclic shift value includes generating the base sequence, and performing a cyclic shift operation on the base sequence in accordance with the cyclic shift value, so as to acquire the cyclically-shifted base sequence as the cyclically-shifted base sequence corresponding to each SC-FDMA symbol. The acquiring the modulation symbol sequence in accordance with the modulation symbol and the cyclically-shifted base sequence and mapping the modulation symbol sequence to the time-domain and frequency-domain resources in the sPUCCH for transmission includes: multiplying the modulation symbol with the cyclically-shifted base sequence, so as to acquire a modulation symbol sequence; multiplying the modulation symbol sequence with a time-domain orthogonal spreading sequence acquired in advance, so as to acquire a plurality of orthogonally-spread modulation symbol sequences, wherein a length of the time-domain orthogonal spreading sequence is equal to the quantity of the SC-FDMA symbols occupied by the sPUCCH; and mapping the plurality of orthogonally-spread modulation symbol sequences to the plurality of SC-FDMA symbols for transmission. When different cyclic shift values are applied to different SC-FDMA symbols, the generating the base sequence and performing the cyclic shift operation on the base sequence in accordance with the cyclic shift value includes generating the base sequence, and performing the cyclic shift operation on the base sequence in accordance with the cyclic shift value corresponding to each SC-FDMA symbol, so as to acquire the cyclically-shifted base sequence corresponding to each SC-FDMA symbol respectively. The acquiring the modulation symbol sequence in accordance with the modulation symbol and the cyclically-shifted base sequence and mapping the modulation symbol sequence to the time-domain and frequency-domain resources in the sPUCCH for transmission includes: multiplying the modulation symbol with a cyclically-shifted base sequence corresponding to an $i^{th}$ SC-FDMA symbol of the plurality of SC-FDMA symbols, and multiplying the modulation symbol with an it orthogonal factor in an orthogonal sequence corresponding to the $i^{th}$ SC-FDMA symbol, so as to acquire a modulation symbol sequence corresponding to the $i^{th}$ SC-FDMA symbol, where i=0, 1, . . . , A−1, and A represents the quantity of the SC-FDMA symbols; and mapping the modulation symbol sequence corresponding to each SC-FDMA to the corresponding SC-FDMA symbol for transmission.

In some possible embodiments of the present disclosure, when a plurality of frequency-domain scheduling resource elements is occupied by the sPUCCH, the generating the base sequence and performing the cyclic shift operation on the base sequence in accordance with the cyclic shift value includes generating the base sequence in accordance with a length of each frequency-domain scheduling resource element, and performing the cyclic shift operation on the base sequence in accordance with the cyclic shift value.

In some possible embodiments of the present disclosure, the acquiring the modulation symbol sequence in accordance with the modulation symbol and the cyclically-shifted base sequence and mapping the modulation symbol sequence to the time-domain and frequency-domain resources in the sPUCCH for transmission includes: carrying same ACK/NACK feedback information on each frequency-domain scheduling resource element; or carrying different ACK/NACK feedback information on different frequency-domain scheduling resource elements.

In some possible embodiments of the present disclosure, when the same ACK/NACK feedback information is carried in each frequency-domain scheduling resource element, the acquiring the modulation symbol sequence in accordance with the modulation symbol and the cyclically-shifted base sequence and mapping the modulation symbol sequence to the time-domain and frequency-domain resources in the sPUCCH for transmission includes: multiplying the modulation symbol with the cyclically-shifted base sequence so as to acquire a modulation symbol sequence corresponding to one frequency-domain scheduling resource element; and duplicating the modulation symbol sequence corresponding to the one frequency-domain scheduling resource element into a plurality of modulation symbol sequences, and mapping the plurality of modulation symbol sequences to the frequency-domain scheduling resource elements occupied by the sPUCCH respectively for transmission. When different ACK/NACK feedback information is carried in different frequency-domain scheduling resource elements, the acquiring the modulation symbol sequence in accordance with the modulation symbol and the cyclically-shifted base sequence and mapping the modulation symbol sequence to the time-domain and frequency-domain resources in the sPUCCH for transmission includes: multiplying one of the modulation symbols carried in each frequency-domain scheduling resource element with the cyclically-shifted base sequence, so as to acquire the modulation symbol sequence corresponding to each frequency-domain scheduling resource element respectively; and mapping the modulation symbol sequence corresponding to each frequency-domain scheduling resource element to the corresponding frequency-domain scheduling resource element for transmission.

In some possible embodiments of the present disclosure, when a plurality of frequency-domain scheduling resource elements is occupied by the sPUCCH, the generating the base sequence and performing the cyclic shift operation on the base sequence in accordance with the cyclic shift value includes generating the base sequence in accordance with a total length of the frequency-domain scheduling resource elements, and performing the cyclic shift operation on the base sequence in accordance with the cyclic shift value. The acquiring the modulation symbol sequence in accordance with the modulation symbol and the cyclically-shifted base sequence and mapping the modulation symbol sequence to the time-domain and frequency-domain resources in the sPUCCH for transmission includes: multiplying the modulation symbol with the cyclically-shifted base sequence, so as to acquire the modulation symbol sequence, and mapping the modulation symbol sequence to the plurality of frequency-domain scheduling resource elements occupied by the sPUCCH for transmission.

In some possible embodiments of the present disclosure, the base sequence is a Constant Amplitude Zero Auto-Correlation (CAZAC) sequence.

In another aspect, the present disclosure provides in some embodiments a UE, including: a reception module configured to receive downlink data, and acquire a cyclic shift value for the transmission of an sPUCCH in accordance with indication information carried in a downlink control channel corresponding to the received downlink data; and a transmission module configured to transmit the sPUCCH in accordance with the cyclic shift value, ACK/NACK feedback information for the downlink data being carried in the sPUCCH.

In some possible embodiments of the present disclosure, the reception module includes: a first reception sub-module configured to receive an sPDSCH with a corresponding downlink control channel or a downlink control channel indicating that a short downlink SPS resource release, and acquiring the cyclic shift value for the transmission of the sPUCCH in accordance with the indication information carried in the downlink control channel; or a second reception sub-module configured to receive an sPDSCH without the corresponding downlink control channel, and acquiring the cyclic shift value for the transmission of the sPUCCH in accordance with the indication information carried in the downlink control channel indicating that the short downlink SPS resource activation.

In some possible embodiments of the present disclosure, the transmission module includes: a cyclic shift sub-module configured to generate a base sequence, and perform a cyclic shift operation on the base sequence in accordance with the cyclic shift value; a modulation sub-module configured to modulate the ACK/NACK feedback information so as to acquire a modulation symbol; and a transmission sub-module configured to acquire a modulation symbol sequence in accordance with the modulation symbol and the cyclically-shifted base sequence, and map the modulation symbol sequence to time-domain and frequency-domain resources of the sPUCCH for transmission.

In some possible embodiments of the present disclosure, when a plurality of SC-FDMA symbols is occupied by the sPUCCH for transmitting the ACK/NACK feedback information, the cyclic shift sub-module is further configured to: apply a same cyclic shift value to each SC-FDMA symbol; or apply different cyclic shift values to different SC-FDMA symbols, and determine the cyclic shift value corresponding to each SC-FDMA symbol in accordance with the acquired cyclic shift values, or when the acquired cyclic shift value includes a plurality of values, determine one value of the acquired a plurality of cyclic shift values as the cyclic shift value corresponding to each SC-FDMA symbol.

In some possible embodiments of the present disclosure, the transmission sub-module is further configured to: carry same ACK/NACK feedback information in each SC-FDMA symbol; or carry different ACK/NACK feedback information in different SC-FDMA symbols.

In some possible embodiments of the present disclosure, when the same cyclic shift value is applied to each SC-FDMA symbol and the same ACK/NACK feedback information is carried in each SC-FDMA symbol, the cyclic shift sub-module includes a first cyclic shift unit configured to generate the base sequence, and perform the cyclic shift operation on the base sequence in accordance with the cyclic shift value, so as to acquire the cyclically-shifted base sequence as the cyclically-shifted base sequence corresponding to each SC-FDMA symbol. The transmission sub-module includes a first transmission unit configured to: multiply the modulation symbol with the cyclically-shifted base sequence so as to acquire the modulation symbol sequence carried in one SC-FDMA symbol; and duplicate the modulation symbol sequence carried in the one SC-FDMA symbol into a plurality of modulation symbol sequences and map the duplicated modulation symbol sequences to the SC-FDMA symbols respectively for transmission. When the same cyclic shift value is applied to each SC-FDMA symbol and different ACK/NACK feedback information is carried in different SC-FDMA symbols, the cyclic shift sub-module includes a second cyclic shift unit configured to generate the base sequence, and perform the cyclic shift operation on the base sequence in accordance with the cyclic shift value, so as to acquire the cyclically-shifted base sequence as the cyclically-shifted base sequence corresponding to each SC-FDMA symbol. The transmission sub-module includes a second transmission unit configured to: multiply one of the modulation symbols carried in an $i^{th}$ SC-FDMA symbol of the plurality of SC-FDMA symbols with the cyclically-shifted base sequence, so as to acquire a modulation symbol sequence corresponding to the $i^{th}$ SC-FDMA symbol, where i=0, 1, ..., A−1, and A represents the quantity of the SC-FDMA symbols; and map the modulation symbol sequence corresponding to the $i^{th}$ SC-FDMA symbol to the $i^{th}$ SC-FDMA symbol for transmission. When different cyclic shift values are applied to different SC-FDMA symbols and the same ACK/NACK feedback information is carried in each SC-FDMA symbol, the cyclic shift sub-module includes a third cyclic shift unit configured to generate the base sequence, and perform the cyclic shift operation on the base sequence in accordance with the cyclic shift value corresponding to each SC-FDMA symbol, so as to acquire the cyclically-shifted base sequence corresponding to the SC-FDMA symbol respectively. The transmission sub-module includes a third transmission unit configured to: multiply the modulation symbol with the cyclically-shifted base sequence corresponding to each SC-FDMA symbol, so as to acquire the modulation symbol sequence corresponding to each SC-FDMA symbol respectively; and map the modulation symbol sequence corresponding to each SC-FDMA symbol to a corresponding one of the SC-FDMA symbols for transmission. When different cyclic shift values are applied to the SC-FDMA symbols and different ACK/NACK feedback information is carried in SC-FDMA symbols, the cyclic shift sub-module includes a fourth cyclic shift unit configured to generate the base sequence, and perform the cyclic shift operation on the base sequence in accordance with the cyclic shift value corresponding to each SC-FDMA symbol, so as to acquire the cyclically-shifted base sequence corresponding to each SC-FDMA symbol respectively. The transmission sub-module includes a fourth transmission unit configured to: multiply one of the modulation symbols carried in an $i^{th}$ SC-FDMA symbol of the plurality of SC-FDMA symbols with the cyclically-shifted base sequence corresponding to the $i^{th}$ SC-FDMA symbol, so as to acquire a modulation symbol sequence corresponding to the $i^{th}$ SC-FDMA symbol, where i=0, 1, ..., A−1, and A represents the quantity of the SC-FDMA symbols; and map the modulation symbol sequence corresponding to the $i^{th}$ SC-FDMA symbol to the $i^{th}$ SC-FDMA symbol for transmission.

In some possible embodiments of the present disclosure, the transmission sub-module is further configured to acquire the modulation symbol sequence in accordance with the modulation symbol, the cyclically-shifted base sequence and a time-domain orthogonal spreading sequence, and map the modulation symbol sequence to the time-domain and frequency-domain resources of the sPUCCH for transmission.

In some possible embodiments of the present disclosure, when the same cyclic shift value is applied for each SC-FDMA symbol, the cyclic shift sub-module includes a fifth cyclic shift unit configured to generate the base sequence, and perform a cyclic shift operation on the base sequence in accordance with the cyclic shift value, so as to acquire the cyclically-shifted base sequence as the cyclically-shifted base sequence corresponding to each SC-FDMA symbol. The transmission sub-module includes a fifth transmission unit configured to: multiply the modulation symbol with the cyclically-shifted base sequence so as to acquire a modulation symbol sequence; multiply the modulation symbol sequence with a time-domain orthogonal spreading sequence acquired in advance, so as to acquire a plurality of orthogonally-spread modulation symbol sequences, a length of the time-domain orthogonal spreading sequence being equal to the quantity of the SC-FDMA symbols occupied by the sPUCCH; and map the plurality of orthogonally-spread modulation symbol sequences to the plurality of SC-FDMA symbols for transmission. When different cyclic shift values are applied to different SC-FDMA symbols, the cyclic shift sub-module includes a sixth cyclic shift unit configured to generate the base sequence, and perform the cyclic shift operation on the base sequence in accordance with the cyclic shift value corresponding to each SC-FDMA symbol, so as to acquire the cyclically-shifted base sequence corresponding to each SC-FDMA symbol respectively. The transmission sub-module includes a sixth transmission unit configured to: multiply the modulation symbol with a cyclically-shifted base sequence corresponding to an $i^{th}$ SC-FDMA symbol of the plurality of SC-FDMA symbols, and multiply the modulation symbol with an $i^{th}$ orthogonal factor in an orthogonal sequence corresponding to the $i^{th}$ SC-FDMA symbol, so as to acquire a modulation symbol sequence corresponding to the $i^{th}$ SC-FDMA symbol, where i=0, 1, ..., A−1, and A represents the quantity of the SC-FDMA symbols; and map the modulation symbol sequence corresponding to each SC-FDMA to the corresponding SC-FDMA symbol for transmission.

In some possible embodiments of the present disclosure, when a plurality of frequency-domain scheduling resource elements is occupied by the sPUCCH, the cyclic shift sub-module includes a seventh cyclic shift unit configured to generate the base sequence in accordance with a length of each frequency-domain scheduling resource element, and perform the cyclic shift operation on the base sequence in accordance with the cyclic shift value.

In some possible embodiments of the present disclosure, the transmission sub-module is further configured to: carry same ACK/NACK feedback information on each frequency-domain scheduling resource element; or carry different ACK/NACK feedback information on different frequency-domain scheduling resource elements.

In some possible embodiments of the present disclosure, when the same ACK/NACK feedback information is carried in each frequency-domain scheduling resource element, the transmission sub-module includes a seventh transmission unit configured to: multiply the modulation symbol with the cyclically-shifted base sequence so as to acquire a modulation symbol sequence corresponding to one frequency-domain scheduling resource element; and duplicate the modulation symbol sequence corresponding to the one frequency-domain scheduling resource element into a plurality of modulation symbol sequences, and map the plurality of modulation symbol sequences to the frequency-domain scheduling resource elements occupied by the sPUCCH respectively for transmission. When different ACK/NACK feedback information is carried in different frequency-domain scheduling resource elements, the transmission sub-module includes an eighth transmission unit configured to: multiply one of the modulation symbols carried in each frequency-domain scheduling resource element with the cyclically-shifted base sequence, so as to acquire the modulation symbol sequence corresponding to each frequency-domain scheduling resource element respectively; and map the modulation symbol sequence corresponding to each frequency-domain scheduling resource element to the corresponding frequency-domain scheduling resource element for transmission.

In some possible embodiments of the present disclosure, when a plurality of frequency-domain scheduling resource elements is occupied by the sPUCCH, the cyclic shift sub-module includes an eighth cyclic shift unit configured to generate the base sequence in accordance with a total length of the frequency-domain scheduling resource elements, and perform the cyclic shift operation on the base sequence in accordance with the cyclic shift value. The transmission sub-module includes a ninth transmission unit configured to: multiply the modulation symbol with the cyclically-shifted base sequence so as to acquire the modulation symbol sequence, and map the modulation symbol sequence to the plurality of frequency-domain scheduling resource elements occupied by the sPUCCH for transmission.

In some possible embodiments of the present disclosure, the base sequence is a CAZAC sequence.

In yet another aspect, the present disclosure provides in some embodiments an sPUCCH transmission method, including: transmitting downlink data, and carrying indication information in a downlink control channel corresponding to the downlink data, the indication information being adopted by a UE for acquiring a cyclic shift value for the transmission of an sPUCCH; and receiving the sPUCCH and acquiring ACK/NACK feedback information for the downlink data in the sPUCCH, the sPUCCH being transmitted by the UE in accordance with the cyclic shift value.

In some possible embodiments of the present disclosure, the transmitting the downlink data and carrying the indication information in the downlink control channel corresponding to the downlink data includes: transmitting an sPDSCH with a corresponding downlink control channel or a downlink control channel indicating that a short downlink SPS resource release, and carrying the indication information in the downlink control channel; or transmitting an sPDSCH without the corresponding downlink control channel, and carrying the indication information in the downlink control channel indicating that the short downlink SPS resource activation.

In some possible embodiments of the present disclosure, the receiving the sPUCCH and acquiring the ACK/NACK feedback information for the downlink data in the sPUCCH includes determining the sPUCCH transmitted by the UE through: generating a base sequence, and performing a cyclic shift operation on the base sequence in accordance with the cyclic shift value; modulating the ACK/NACK feedback information so as to acquire a modulation symbol; and acquiring a modulation symbol sequence in accordance with the modulation symbol and the cyclically-shifted base sequence, and mapping the modulation symbol sequence to time-domain and frequency-domain resources of the sPUCCH for transmission.

In some possible embodiments of the present disclosure, when a plurality of SC-FDMA symbols is occupied by the sPUCCH for transmitting the ACK/NACK feedback information, the generating the base sequence and performing the cyclic shift operation on the base sequence in accordance with the cyclic shift value includes: applying a same cyclic shift value to each SC-FDMA symbol; or applying different cyclic shift values to different SC-FDMA symbols, and determining the cyclic shift value corresponding to each SC-FDMA symbol in accordance with the acquired cyclic shift value, or when the acquired cyclic shift value includes a plurality of values, determining one value of the acquired a plurality of cyclic shift values as the cyclic shift value corresponding to each SC-FDMA symbol.

In some possible embodiments of the present disclosure, the acquiring the modulation symbol sequence in accordance with the modulation symbol and the cyclically-shifted base sequence and mapping the modulation symbol sequence to the time-domain and frequency-domain resources in the sPUCCH for transmission includes: carrying same ACK/NACK feedback information in each SC-FDMA symbol; or carrying different ACK/NACK feedback information in different SC-FDMA symbols.

In some possible embodiments of the present disclosure, when the same cyclic shift value is applied to each SC-FDMA symbol and the same ACK/NACK feedback information is carried in each SC-FDMA symbol, the generating the base sequence and performing the cyclic shift operation on the base sequence in accordance with the cyclic shift value includes generating the base sequence, and performing the cyclic shift operation on the base sequence in accordance with the cyclic shift value, so as to acquire the cyclically-shifted base sequence as the cyclically-shifted base sequence corresponding to each SC-FDMA symbol. The acquiring the modulation symbol sequence in accordance with the modulation symbol and the cyclically-shifted base sequence and mapping the modulation symbol sequence to the time-domain and frequency-domain resources in the sPUCCH for transmission includes: multiplying the modulation symbol with the cyclically-shifted base sequence so as to acquire the modulation symbol sequence carried in one SC-FDMA symbol; and duplicating the modulation symbol sequence carried in the one SC-FDMA symbol into a plurality of modulation symbol sequences and mapping the duplicated modulation symbol sequences to the SC-FDMA symbols respectively for transmission. When the same cyclic shift value is applied to each SC-FDMA symbol and different ACK/NACK feedback information is carried in different SC-FDMA symbols, the generating the base sequence and performing the cyclic shift operation on the base sequence in accordance with the cyclic shift value includes generating the base sequence, and performing the cyclic shift operation on the base sequence in accordance with the cyclic shift value, so as to acquire the cyclically-shifted base sequence as the cyclically-shifted base sequence corresponding to each SC-FDMA symbol. The acquiring the modulation symbol sequence in accordance with the modulation symbol and the cyclically-shifted base sequence and mapping the modulation symbol sequence to the time-domain and frequency-domain resources in the sPUCCH for transmission includes: multiplying one of the modulation symbols carried in an $i^{th}$ SC-FDMA symbol of the plurality of SC-FDMA symbols with the cyclically-shifted base sequence, so as to acquire a modulation symbol sequence corresponding to the $i^{th}$ SC-FDMA symbol, where i=0, 1, . . . , A−1, and A represents the quantity of the SC-FDMA symbols; and mapping the modulation symbol sequence corresponding to the $i^{th}$ SC-FDMA symbol to the $i^{th}$ SC-FDMA symbol for transmission. When different cyclic shift values are applied to different SC-FDMA symbols and the same ACK/NACK feedback information is carried in each SC-FDMA symbol, the generating the base sequence and performing the cyclic shift operation on the base sequence in accordance with the cyclic shift value includes generating the base sequence, and performing the cyclic shift operation on the base sequence in accordance with the cyclic shift value corresponding to each SC-FDMA symbol, so as to acquire the cyclically-shifted base sequence corresponding to the SC-FDMA symbol respectively. The acquiring the modulation symbol sequence in accordance with the modulation symbol and the cyclically-shifted base sequence and mapping the modulation symbol sequence to the time-domain and frequency-domain resources in the sPUCCH for transmission includes: multiplying the modulation symbol with the cyclically-shifted base sequence corresponding to each SC-FDMA symbol, so as to acquire the modulation symbol sequence corresponding to each SC-FDMA symbol respectively; and mapping the modulation symbol sequence corresponding to each SC-FDMA symbol to a corresponding one of the SC-FDMA symbols for transmission. When different cyclic shift values are applied to different SC-FDMA symbols and different ACK/NACK feedback information is carried in different SC-FDMA symbols, the generating the base sequence and performing the cyclic shift operation on the base sequence in accordance with the cyclic shift value includes generating the base sequence, and performing the cyclic shift operation on the base sequence in accordance with the cyclic shift value corresponding to each SC-FDMA symbol, so as to acquire the cyclically-shifted base sequence corresponding to each SC-FDMA symbol respectively. The acquiring the modulation symbol sequence in accordance with the modulation symbol and the cyclically-shifted base sequence and mapping the modulation symbol sequence to the time-domain and frequency-domain resources in the sPUCCH for transmission includes: multiplying one of the modulation symbols carried in an $i^{th}$ SC-FDMA symbol of the plurality of SC-FDMA symbols with the cyclically-shifted base sequence corresponding to the $i^{th}$ SC-FDMA symbol, so as to acquire a modulation symbol sequence corresponding to the $i^{th}$ SC-FDMA symbol, where i=0, 1, . . . , A−1, and A represents the quantity of the SC-FDMA symbols; and mapping the modulation symbol sequence corresponding to the $i^{th}$ SC-FDMA symbol to the $i^{th}$ SC-FDMA symbol for transmission.

In some possible embodiments of the present disclosure, the acquiring the modulation symbol sequence in accordance with the modulation symbol and the cyclically-shifted base sequence and mapping the modulation symbol sequence to the time-domain and frequency-domain resources in the sPUCCH for transmission includes acquiring the modulation symbol sequence in accordance with the modulation symbol, the cyclically-shifted base sequence and a time-domain orthogonal spreading sequence, and mapping the modulation symbol sequence to the frequency-domain resources of the sPUCCH for transmission.

In some possible embodiments of the present disclosure, when the same cyclic shift value is applied for each SC-FDMA symbol, the generating the base sequence and performing the cyclic shift operation on the base sequence in accordance with the cyclic shift value includes generating the base sequence, and performing a cyclic shift operation on the base sequence in accordance with the cyclic shift value, so as to acquire the cyclically-shifted base sequence as the cyclically-shifted base sequence corresponding to each SC-FDMA symbol. The acquiring the modulation symbol sequence in accordance with the modulation symbol and the cyclically-shifted base sequence and mapping the modulation symbol sequence to the time-domain and frequency-domain resources in the sPUCCH for transmission includes: multiplying the modulation symbol with the cyclically-shifted base sequence so as to acquire a modulation symbol sequence; multiplying the modulation symbol sequence with a time-domain orthogonal spreading sequence acquired in advance, so as to acquire a plurality of orthogonally-spread modulation symbol sequences, a length of the time-domain orthogonal spreading sequence being equal to the quantity of the SC-FDMA symbols occupied by the sPUCCH; and mapping the plurality of orthogonally-spread modulation symbol sequences to the plurality of SC-FDMA symbols for transmission. When different cyclic shift values are applied to different SC-FDMA symbols, the generating the base sequence and performing the cyclic shift operation on the base sequence in accordance with the cyclic shift value includes generating the base sequence, and performing the cyclic shift operation on the base sequence in accordance with the cyclic shift value corresponding to each SC-FDMA symbol, so as to acquire the cyclically-shifted base sequence corresponding to each SC-FDMA symbol respectively. The acquiring the modulation symbol sequence in accordance with the modulation symbol and the cyclically-shifted base sequence and mapping the modulation symbol sequence to the time-domain and frequency-domain resources in the sPUCCH for transmission includes: multiplying the modulation symbol with a cyclically-shifted base sequence corresponding to an $i^{th}$ SC-FDMA symbol of the plurality of SC-FDMA symbols, and multiplying the modulation symbol with an $i^{th}$ orthogonal factor in an orthogonal sequence corresponding to the $i^{th}$ SC-FDMA symbol, so as to acquire a modulation symbol sequence corresponding to the $i^{th}$ SC-FDMA symbol, where i=0, 1, . . . , A−1, and A represents the quantity of the SC-FDMA symbols; and mapping the modulation symbol sequence corresponding to each SC-FDMA to the corresponding SC-FDMA symbol for transmission.

In some possible embodiments of the present disclosure, when a plurality of frequency-domain scheduling resource elements is occupied by the sPUCCH, the generating the base sequence and performing the cyclic shift operation on the base sequence in accordance with the cyclic shift value includes generating the base sequence in accordance with a length of each frequency-domain scheduling resource element, and performing the cyclic shift operation on the base sequence in accordance with the cyclic shift value.

In some possible embodiments of the present disclosure, the acquiring the modulation symbol sequence in accordance with the modulation symbol and the cyclically-shifted base sequence and mapping the modulation symbol sequence to the time-domain and frequency-domain resources in the sPUCCH for transmission includes: carrying same ACK/NACK feedback information on each frequency-domain scheduling resource element; or carrying different ACK/NACK feedback information on different frequency-domain scheduling resource elements.

In some possible embodiments of the present disclosure, when the same ACK/NACK feedback information is carried in each frequency-domain scheduling resource element, the acquiring the modulation symbol sequence in accordance with the modulation symbol and the cyclically-shifted base sequence and mapping the modulation symbol sequence to the time-domain and frequency-domain resources in the sPUCCH for transmission includes: multiplying the modulation symbol with the cyclically-shifted base sequence so as to acquire a modulation symbol sequence corresponding to one frequency-domain scheduling resource element; and duplicating the modulation symbol sequence corresponding to the one frequency-domain scheduling resource element into a plurality of modulation symbol sequences, and mapping the plurality of modulation symbol sequences to the frequency-domain scheduling resource elements occupied by the sPUCCH respectively for transmission. When different ACK/NACK feedback information is carried in different frequency-domain scheduling resource elements, the acquiring the modulation symbol sequence in accordance with the modulation symbol and the cyclically-shifted base sequence and mapping the modulation symbol sequence to the time-domain and frequency-domain resources in the sPUCCH for transmission includes: multiplying one of the modulation symbols carried in each frequency-domain scheduling resource element with the cyclically-shifted base sequence, so as to acquire the modulation symbol sequence corresponding to each frequency-domain scheduling resource element respectively; and mapping the modulation symbol sequence corresponding to each frequency-domain scheduling resource element to the corresponding frequency-domain scheduling resource element for transmission.

In some possible embodiments of the present disclosure, when a plurality of frequency-domain scheduling resource elements is occupied by the sPUCCH, the generating the base sequence and performing the cyclic shift operation on the base sequence in accordance with the cyclic shift value includes generating the base sequence in accordance with a total length of the frequency-domain scheduling resource elements, and performing the cyclic shift operation on the base sequence in accordance with the cyclic shift value. The acquiring the modulation symbol sequence in accordance with the modulation symbol and the cyclically-shifted base sequence and mapping the modulation symbol sequence to the time-domain and frequency-domain resources in the sPUCCH for transmission includes: multiplying the modulation symbol with the cyclically-shifted base sequence, so as to acquire the modulation symbol sequence, and mapping the modulation symbol sequence to the plurality of frequency-domain scheduling resource elements occupied by the sPUCCH for transmission.

In some possible embodiments of the present disclosure, the base sequence is a CAZAC sequence.

In still yet another aspect, the present disclosure provides in some embodiments a base station, including a transmission module configured to transmit downlink data, and carry indication information in a downlink control channel corresponding to the downlink data, the indication information being adopted by a UE for acquiring a cyclic shift value for the transmission of an sPUCCH; and an acquisition module configured to receive the sPUCCH and acquire ACK/NACK feedback information for the downlink data in the sPUCCH, the sPUCCH being transmitted by the UE in accordance with the cyclic shift value.

In some possible embodiments of the present disclosure, the transmission module includes: a first transmission sub-module configured to transmit an sPDSCH with a corresponding downlink control channel or a downlink control channel indicating that a short downlink SPS resource release, and carry the indication information in the downlink control channel; or a second transmission sub-module configured to transmit an sPDSCH without the corresponding downlink control channel, and carry the indication information in the downlink control channel indicating that the short downlink SPS resource activation.

In some possible embodiments of the present disclosure, the acquisition module includes a determination sub-module configured to determine the sPUCCH transmitted by the UE through: generating a base sequence, and performing a cyclic shift operation on the base sequence in accordance with the cyclic shift value; modulating the ACK/NACK feedback information so as to acquire a modulation symbol; and acquiring a modulation symbol sequence in accordance with the modulation symbol and the cyclically-shifted base sequence, and mapping the modulation symbol sequence to time-domain and frequency-domain resources of the sPUCCH for transmission.

In some possible embodiments of the present disclosure, when a plurality of SC-FDMA symbols is occupied by the sPUCCH for transmitting the ACK/NACK feedback information, the generating the base sequence and performing the cyclic shift operation on the base sequence in accordance with the cyclic shift value includes: applying a same cyclic shift value to each SC-FDMA symbol; or applying different cyclic shift values to different SC-FDMA symbols, and determining the cyclic shift value corresponding to each SC-FDMA symbol in accordance with the acquired cyclic shift value, or when the acquired cyclic shift value includes a plurality of values, determining one value of the acquired a plurality of cyclic shift values as the cyclic shift value corresponding to each SC-FDMA symbol.

In some possible embodiments of the present disclosure, the acquiring the modulation symbol sequence in accordance with the modulation symbol and the cyclically-shifted base sequence and mapping the modulation symbol sequence to the time-domain and frequency-domain resources in the sPUCCH for transmission includes: carrying same ACK/NACK feedback information in each SC-FDMA symbol; or carrying different ACK/NACK feedback information in different SC-FDMA symbols.

In some possible embodiments of the present disclosure, when the same cyclic shift value is applied to each SC-FDMA symbol and the same ACK/NACK feedback information is carried in each SC-FDMA symbol, the generating the base sequence and performing the cyclic shift operation on the base sequence in accordance with the cyclic shift value includes generating the base sequence, and performing the cyclic shift operation on the base sequence in accordance with the cyclic shift value, so as to acquire the cyclically-shifted base sequence as the cyclically-shifted base sequence corresponding to each SC-FDMA symbol. The acquiring the modulation symbol sequence in accordance with the modulation symbol and the cyclically-shifted base sequence and mapping the modulation symbol sequence to the time-domain and frequency-domain resources in the sPUCCH for transmission includes: multiplying the modulation symbol with the cyclically-shifted base sequence so as to acquire the modulation symbol sequence carried in one SC-FDMA symbol; and duplicating the modulation symbol sequence carried in the one SC-FDMA symbol into a plurality of modulation symbol sequences and mapping the duplicated modulation symbol sequences to the SC-FDMA symbols respectively for transmission. When the same cyclic shift value is applied to each SC-FDMA symbol and different ACK/NACK feedback information is carried in different SC-FDMA symbols, the generating the base sequence and performing the cyclic shift operation on the base sequence in accordance with the cyclic shift value includes generating the base sequence, and performing the cyclic shift operation on the base sequence in accordance with the cyclic shift value, so as to acquire the cyclically-shifted base sequence as the cyclically-shifted base sequence corresponding to each SC-FDMA symbol. The acquiring the modulation symbol sequence in accordance with the modulation symbol and the cyclically-shifted base sequence and mapping the modulation symbol sequence to the time-domain and frequency-domain resources in the sPUCCH for transmission includes: multiplying one of the modulation symbols carried in an $i^{th}$ SC-FDMA symbol of the plurality of SC-FDMA symbols with the cyclically-shifted base sequence, so as to acquire a modulation symbol sequence corresponding to the $i^{th}$ SC-FDMA symbol, where i=0, 1, . . . , A−1, and A represents the quantity of the SC-FDMA symbols; and mapping the modulation symbol sequence corresponding to the $i^{th}$ SC-FDMA symbol to the $i^{th}$ SC-FDMA symbol for transmission. When different cyclic shift values are applied to different SC-FDMA symbols and the same ACK/NACK feedback information is carried in each SC-FDMA symbol, the generating the base sequence and performing the cyclic shift operation on the base sequence in accordance with the cyclic shift value includes generating the base sequence, and performing the cyclic shift operation on the base sequence in accordance with the cyclic shift value corresponding to each SC-FDMA symbol, so as to acquire the cyclically-shifted base sequence corresponding to the SC-FDMA symbol respectively. The acquiring the modulation symbol sequence in accordance with the modulation symbol and the cyclically-shifted base sequence and mapping the modulation symbol sequence to the time-domain and frequency-domain resources in the sPUCCH for transmission includes: multiplying the modulation symbol with the cyclically-shifted base sequence corresponding to each SC-FDMA symbol, so as to acquire the modulation symbol sequence corresponding to each SC-FDMA symbol respectively; and mapping the modulation symbol sequence corresponding to each SC-FDMA symbol to a corresponding one of the SC-FDMA symbols for transmission. When different cyclic shift values are applied to different SC-FDMA symbols and different ACK/NACK feedback information is carried in different SC-FDMA symbols, the generating the base sequence and performing the cyclic shift operation on the base sequence in accordance with the cyclic shift value includes generating the base sequence, and performing the cyclic shift operation on the base sequence in accordance with the cyclic shift value corresponding to each SC-FDMA symbol, so as to acquire the cyclically-shifted base sequence corresponding to each SC-FDMA symbol respectively. The acquiring the modulation symbol sequence in accordance with the modulation symbol and the cyclically-shifted base sequence and mapping the modulation symbol sequence to the time-domain and frequency-domain resources in the sPUCCH for transmission includes: multiplying one of the modulation symbols carried in an $i^{th}$ SC-FDMA symbol of the plurality of SC-FDMA symbols with the cyclically-shifted base sequence corresponding to the $i^{th}$ SC-FDMA symbol, so as to acquire a modulation symbol sequence corresponding to the $i^{th}$ SC-FDMA symbol, where i=0, 1, . . . , A−1, and A represents the quantity of the SC-FDMA symbols; and mapping the modulation symbol sequence corresponding to the $i^{th}$ SC-FDMA symbol to the $i^{th}$ SC-FDMA symbol for transmission.

In some possible embodiments of the present disclosure, the acquiring the modulation symbol sequence in accordance with the modulation symbol and the cyclically-shifted base sequence and mapping the modulation symbol sequence to the time-domain and frequency-domain resources in the sPUCCH for transmission includes acquiring the modulation symbol sequence in accordance with the modulation symbol, the cyclically-shifted base sequence and a time-domain orthogonal spreading sequence, and mapping the modulation symbol sequence to the frequency-domain resources of the sPUCCH for transmission.

In some possible embodiments of the present disclosure, when the same cyclic shift value is applied for each SC-FDMA symbol, the generating the base sequence and performing the cyclic shift operation on the base sequence in accordance with the cyclic shift value includes generating the base sequence, and performing a cyclic shift operation on the base sequence in accordance with the cyclic shift value, so as to acquire the cyclically-shifted base sequence as the cyclically-shifted base sequence corresponding to each SC-FDMA symbol. The acquiring the modulation symbol sequence in accordance with the modulation symbol and the cyclically-shifted base sequence and mapping the modulation symbol sequence to the time-domain and frequency-domain resources in the sPUCCH for transmission includes: multiplying the modulation symbol with the cyclically-shifted base sequence, so as to acquire a modulation symbol sequence; multiplying the modulation symbol sequence with a time-domain orthogonal spreading sequence acquired in advance, so as to acquire a plurality of orthogonally-spread modulation symbol sequences, a length of the time-domain orthogonal spreading sequence being equal to the quantity of the SC-FDMA symbols occupied by the sPUCCH; and mapping the plurality of orthogonally-spread modulation symbol sequences to the plurality of SC-FDMA symbols for transmission. When different cyclic shift values are applied to different SC-FDMA symbols, the generating the base sequence and performing the cyclic shift operation on the base sequence in accordance with the cyclic shift value includes generating the base sequence, and performing the cyclic shift operation on the base sequence in accordance with the cyclic shift value corresponding to each SC-FDMA symbol, so as to acquire the cyclically-shifted base sequence corresponding to each SC-FDMA symbol respectively. The acquiring the modulation symbol sequence in accordance with the modulation symbol and the cyclically-shifted base sequence and mapping the modulation symbol sequence to the time-domain and frequency-domain resources in the sPUCCH for transmission includes: multiplying the modulation symbol with a cyclically-shifted base sequence corresponding to an $i^{th}$ SC-FDMA symbol of the plurality of SC-FDMA symbols, and multiplying the modulation symbol with an $i^{th}$ orthogonal factor in an orthogonal sequence corresponding to the $i^{th}$ SC-FDMA symbol, so as to acquire a modulation symbol sequence corresponding to the $i^{th}$ SC-FDMA symbol, where i=0, 1, . . . , A−1, and A represents the quantity of the SC-FDMA symbols; and mapping the modulation symbol sequence corresponding to each SC-FDMA to the corresponding SC-FDMA symbol for transmission.

In some possible embodiments of the present disclosure, when a plurality of frequency-domain scheduling resource elements is occupied by the sPUCCH, the generating the base sequence and performing the cyclic shift operation on the base sequence in accordance with the cyclic shift value includes generating the base sequence in accordance with a length of each frequency-domain scheduling resource element, and performing the cyclic shift operation on the base sequence in accordance with the cyclic shift value.

In some possible embodiments of the present disclosure, the acquiring the modulation symbol sequence in accordance with the modulation symbol and the cyclically-shifted base sequence and mapping the modulation symbol sequence to the time-domain and frequency-domain resources in the sPUCCH for transmission includes: carrying same ACK/NACK feedback information on each frequency-domain scheduling resource element; or carrying different ACK/NACK feedback information on different frequency-domain scheduling resource elements.

In some possible embodiments of the present disclosure, when the same ACK/NACK feedback information is carried in each frequency-domain scheduling resource element, the acquiring the modulation symbol sequence in accordance with the modulation symbol and the cyclically-shifted base sequence and mapping the modulation symbol sequence to the time-domain and frequency-domain resources in the sPUCCH for transmission includes: multiplying the modulation symbol with the cyclically-shifted base sequence so as to acquire a modulation symbol sequence corresponding to one frequency-domain scheduling resource element; and duplicating the modulation symbol sequence corresponding to the one frequency-domain scheduling resource element into a plurality of modulation symbol sequences, and mapping the plurality of modulation symbol sequences to the frequency-domain scheduling resource elements occupied by the sPUCCHI respectively for transmission. When different ACK/NACK feedback information is carried in different frequency-domain scheduling resource elements, the acquiring the modulation symbol sequence in accordance with the modulation symbol and the cyclically-shifted base sequence and mapping the modulation symbol sequence to the time-domain and frequency-domain resources in the sPUCCH for transmission includes: multiplying one of the modulation symbols carried in each frequency-domain scheduling resource element with the cyclically-shifted base sequence, so as to acquire the modulation symbol sequence corresponding to each frequency-domain scheduling resource element respectively; and mapping the modulation symbol sequence corresponding to each frequency-domain scheduling resource element to the corresponding frequency-domain scheduling resource element for transmission.

In some possible embodiments of the present disclosure, when a plurality of frequency-domain scheduling resource elements is occupied by the sPUCCH, the generating the base sequence and performing the cyclic shift operation on the base sequence in accordance with the cyclic shift value includes generating the base sequence in accordance with a total length of the frequency-domain scheduling resource elements, and performing the cyclic shift operation on the base sequence in accordance with the cyclic shift value. The acquiring the modulation symbol sequence in accordance with the modulation symbol and the cyclically-shifted base sequence and mapping the modulation symbol sequence to the time-domain and frequency-domain resources in the sPUCCH for transmission includes: multiplying the modulation symbol with the cyclically-shifted base sequence, so as to acquire the modulation symbol sequence, and mapping the modulation symbol sequence to the plurality of frequency-domain scheduling resource elements occupied by the sPUCCH for transmission.

In some possible embodiments of the present disclosure, the base sequence is a CAZAC sequence.

In still yet another aspect, the present disclosure provides in some embodiments a UE, including a processor, a memory and a transceiver. The processor is configured to read programs stored in the memory, so as to: receive through the transceiver downlink data, and acquire a cyclic shift value for the transmission of an sPUCCH in accordance with indication information carried in a downlink control channel corresponding to the received downlink data; and transmit through the transceiver the sPUCCH in accordance with the cyclic shift value, ACK/NACK feedback information for the downlink data being carried in the sPUCCH. The transceiver is configured to receive and transmit data. The memory is configured to store therein data for the operation of the processor.

In still yet another aspect, the present disclosure provides in some embodiments a base station, including a processor, a memory and a transceiver. The processor is configured to read programs stored in the memory, so as to: transmit through the transceiver downlink data, and carry indication information in a downlink control channel corresponding to the downlink data, the indication information being adopted by a UE for acquiring a cyclic shift value for the transmission of an sPUCCH; and receive through the transceiver the sPUCCH and acquire ACK/NACK feedback information for the downlink data in the sPUCCH, the sPUCCH being transmitted by the UE in accordance with the cyclic shift value. The transceiver is configured to receive and transmit data. The memory is configured to store therein data for the operation of the processor.

According to the embodiments of the present disclosure, the downlink data may be received at first, and the cyclic shift value for the transmission of the sPUCCH may be acquired in accordance with the indication information carried in the downlink control channel corresponding to the received downlink data. Next, the sPUCCH may be transmitted in accordance with the cyclic shift value, and the ACK/NACK feedback information for the transmission of the downlink data may be carried in the sPUCCH. As a result, it is able to achieve the transmission of the sPUCCH as compared with a conventional LTE system where the channel transmission is defined on a subframe basis.

BRIEF DESCRIPTION OF THE DRAWINGS

In order to illustrate the technical solutions of the present disclosure or the related art in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort. Shapes and sizes of the members in the drawings are for illustrative purposes only, but shall not be used to reflect any actual scale.

DETAILED DESCRIPTION OF THE EMBODIMENTS

Figure 1:
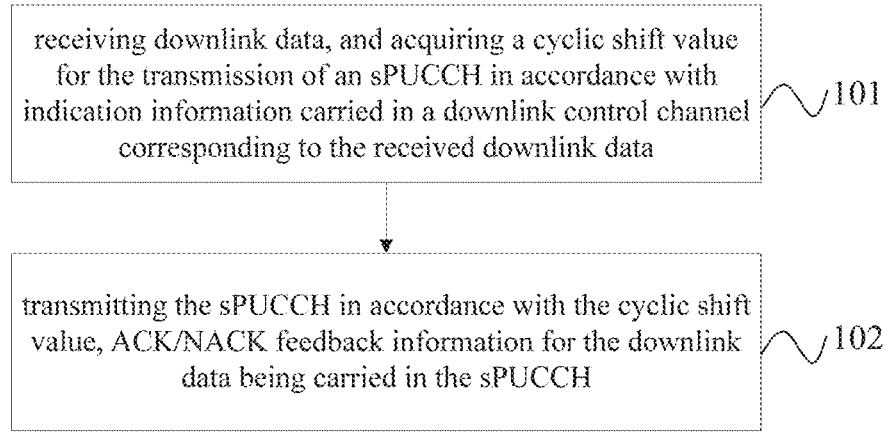
FIG. 1 is a flow chart of an sPUCCH transmission method for use in a UE according to some embodiments of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In order to facilitate the understanding of the present disclosure, a short TTI and an sPUCCH will be described hereinafter at first.

For short TTI transmission as a typical working mode, a frame structure defined in a conventional LTE mechanism includes a plurality of short TTIs each having a length smaller than 1 ms. A shortened Physical Uplink Shared Channel (sPUSCH) and an sPUCCH are supported for uplink transmission. The sPUCCH may at least carry ACK/NACK feedback information for downlink transmission within the short TTIs. Each TTI may include 2, 3, 4 or 7 Orthogonal Frequency Division Multiplexing (OFDM) or SC-FDMA symbols. Of course, the quantity of the symbols may be of any other value not greater than 14 or a time-domain length may not be greater than 1 ms.

An object of the present disclosure is to provide an sPUCCH transmission method and a UE, so as to notify a cyclic shift value for the transmission of the sPUCCH in accordance with a downlink control channel corresponding to downlink data, thereby to transmit the sPUCCH.

The present disclosure provides in some embodiments an sPUCCH transmission method, which includes the following steps.

Step 101: receiving downlink data, and acquiring a cyclic shift value for the transmission of an sPUCCH in accordance with indication information carried in a downlink control channel corresponding to the received downlink data.

In this step, the cyclic shift value for the transmission of the sPUCCH may be notified through the indication information carried in the downlink control channel corresponding to the downlink data, e.g., through an indicator in Downlink (DL) grant (a downlink control channel in a Downlink Control Information (DCI) format).

Step 102: transmitting the sPUCCH in accordance with the cyclic shift value, ACK/NACK feedback information for the downlink data being carried in the sPUCCH.

In this step, the sPUCCH may be transmitted in accordance with the acquired cyclic shift value, and the ACK/NACK feedback information for the downlink data may be carried in the sPUCCH.

According to the sPUCCH transmission method in the embodiments of the present disclosure, the sPUCCH may be transmitted in accordance with the cyclic shift value notified through the downlink control channel corresponding to the downlink data. As a result, it is able to transmit the sPUCCH as compared with a conventional LTE system where the channel transmission is defined on a subframe basis.

In some possible embodiments of the present disclosure, Step 101 may include: Step 1011 of receiving an sPDSCH with a corresponding downlink control channel or a downlink control channel indicating that a short downlink SPS resource release, and acquiring the cyclic shift value for the transmission of the sPUCCH in accordance with the indication information carried in the downlink control channel; or Step 1012 of receiving an sPDSCH without the corresponding downlink control channel, and acquiring the cyclic shift value for the transmission of the sPUCCH in accordance with the indication information carried in the downlink control channel indicating that the short downlink SPS resource activation.

In other words, in the embodiments of the present disclosure, the downlink control channel for notifying the cyclic shift value for the transmission of the sPUCCH may include the downlink control channel with the corresponding dynamic sPDSCH, the downlink control channel indicating that the short downlink SPS resource activation (i.e., the downlink control channel is adopted for activating the transmission of an SPS sPDSCH), and the downlink control channel indicating that the short downlink SPS resource release. Of course, when the sPUCCH carries the ACK/NACK feedback information for the downlink data transmitted within a conventional TTI length, the downlink control channel for notifying the cyclic shift value for the transmission of the sPUCCH may further include a downlink control channel with a corresponding dynamic PDSCH, a downlink control channel indicating that a downlink SPS resource activation, and a downlink control channel indicating that a downlink SPS resource release.

In addition, the downlink control channel in the embodiments of the present disclosure may be a downlink control channel transmitted within a conventional TTI, e.g., a legacy Physical Downlink Control Channel (PDCCH)/Enhanced Physical Downlink Control Channel (EPDCCH), or a downlink control channel transmitted within a TTI having a length smaller than 1 ms, i.e., a shortened Physical Downlink Control Channel (sPDCCH).

In some possible embodiments of the present disclosure, Step 102 may include: Step 1021 of generating a base sequence, and performing a cyclic shift operation on the base sequence in accordance with the cyclic shift value; Step 1022 of modulating the ACK/NACK feedback information so as to acquire a modulation symbol; and Step 1023 of acquiring a modulation symbol sequence in accordance with the modulation symbol and the cyclically-shifted base sequence, and mapping the modulation symbol sequence to time-domain and frequency-domain resources of the sPUCCH for transmission.

At this time, the UE may generate the base sequence, perform the cyclic shift operation on the base sequence in accordance with the cyclic shift value, acquire the frequency-spread modulation symbol sequence in accordance with the modulation symbol acquired after modulating the ACK/NACK feedback information and the cyclically-shifted base sequence, and map the modulation symbol sequence to the corresponding time-domain and frequency-domain resources, so as to transmit the sPUCCH.

To be specific, the base sequence may be a CAZAC sequence which may be generated from a gold sequence or a Zadoff-Chu (ZC) sequence.

In some possible embodiments of the present disclosure, when merely one SC-FDMA symbol is occupied by the sPUCCH for the transmission of the ACK/NACK feedback information, Step 102 may include: generating the base sequence, and performing the cyclic shift operation on the base sequence in accordance with the cyclic shift value, so as to acquire the cyclically-shifted base sequence corresponding to the SC-FDMA symbol; multiplying the modulation symbol with the cyclically-shifted base sequence, so as to acquire the modulation symbol sequence; and mapping the modulation symbol sequence to the SC-FDMA symbol occupied by the sPUCCH for transmission.

At this time, when one SC-FDMA symbol is occupied by the sPUCCH for the transmission of the ACK/NACK feedback information, it is able to transmit the sPUCCH as mentioned above.

Of course, in many circumstances, more than one SC-FDMA symbol may be occupied by the sPUCCH. The transmission of the sPUCCH will be described hereinafter when a plurality of SC-FDMA symbols is occupied by the sPUCCH for the transmission of the ACK/NACK feedback information.

When the plurality of SC-FDMA symbols is occupied by the sPUCCH for the transmission of the ACK/NACK feedback information, Step 1021 may be implemented in one of the following two modes.

Mode 1: applying a same cyclic shift value to each SC-FDMA symbol.

At this time, the UE may generate the base sequence, and perform the cyclic shift operation on the base sequence in accordance with the cyclic shift value, so as to acquire the cyclically-shifted base sequence corresponding to each SC-FDMA symbol.

Mode 2: applying different cyclic shift values to different SC-FDMA symbols, and determining the cyclic shift value corresponding to each SC-FDMA symbol in accordance with the acquired cyclic shift value, or when the acquired cyclic shift value includes a plurality of values, determining one value of the acquired a plurality of cyclic shift values as the cyclic shift value corresponding to each SC-FDMA symbol.

At this time, the UE may generate the base sequence, and perform the cyclic shift operation on the base sequence in accordance with the cyclic shift value corresponding to an $i^{th}$ SC-FDMA symbol occupied by the sPUCCH, so as to acquire the cyclically-shifted base sequence corresponding to the $i^{th}$ SC-FDMA symbol, where i=0, 1, . . . , A−1, and A represents the quantity of the SC-FDMA symbols.

Here, when different cyclic shift values are applied to different SC-FDMA symbols, the cyclic shift value corresponding to each SC-FDMA symbol may be determined in accordance with the acquired cyclic shift values. For example, the cyclic shift value corresponding to each SC-FDMA symbol may be determined through a function about the acquired cyclic shift value and a serial number of each SC-FDMA symbol. For example, a cyclic shift value corresponding to a first SC-FDMA symbol may be just the acquired cyclic shift value, and for the remaining SC-FDMA symbols, a cyclic shift value corresponding to each SC-FMDA symbol is a cyclic shift value corresponding to a previous SC-FDMA symbol plus a value "A", and the value "A" represents a step value pre-agreed or notified in the downlink control channel.

When the plurality of SC-FDMA symbols is occupied by the sPUCCH for the transmission of the ACK/NACK feedback information, the same cyclic shift value may be applied to each SC-FDMA symbol, or different cyclic shift values may be applied to different SC-FDMA symbols.

In some possible embodiments of the present disclosure, Step 1023 may include: carrying same ACK/NACK feedback information in each SC-FDMA symbol; or carrying different ACK/NACK feedback information in different SC-FDMA symbols.

At this time, when the plurality of SC-FDMA symbols is occupied by the sPUCCH for the transmission of the ACK/NACK feedback information, the same ACK/NACK feedback information may be carried in each SC-FDMA symbol (at this time, when a plurality of frequency-domain scheduling resource elements are occupied by the sPUCCH in a frequency domain, the ACK/NACK feedback information transmitted on the frequency-domain scheduling resource elements may be the same or different, but a same ACK/NACK feedback information sequence may be transmitted on the different SC-FDMA symbols, e.g., an ACK/NACK modulation symbol 1 may be transmitted on a first frequency-domain scheduling resource element for each SC-FDMA symbol, and an ACK/NACK modulation symbol 2 may be transmitted on a second frequency-domain scheduling resource element for each SC-FDMA symbol; at this time, it may also be deemed that the same ACK/NACK feedback information is carried in each SC-FDMA symbol), or different ACK/NACK feedback information may be carried in different SC-FDMA symbols.

Mode 1-1: when the same cyclic shift value is applied to each SC-FDMA symbol and the same ACK/NACK feedback information is carried in each SC-FDMA symbol, Step 1021 may include generating the base sequence, and performing the cyclic shift operation on the base sequence in accordance with the cyclic shift value, so as to acquire the cyclically-shifted base sequence as the cyclically-shifted base sequence corresponding to each SC-FDMA symbol.

Step 1023 may include: multiplying the modulation symbol with the cyclically-shifted base sequence so as to acquire the modulation symbol sequence carried in one SC-FDMA symbol; and duplicating the modulation symbol sequence carried in the one SC-FDMA symbol into a plurality of modulation symbol sequences and mapping the duplicated modulation symbol sequences to the SC-FDMA symbols respectively for transmission.

At this time, the UE may multiply the modulation symbol acquired after modulating the ACK/NACK feedback information with the cyclically-shifted base sequence so as to acquire the frequency-spread modulation symbol sequence, and map the same modulation symbol sequence to the SC-FDMA symbols for transmission (i.e., the same modulation symbol sequence may be transmitted on each SC-FDMA symbol).

Mode 1-2: when the same cyclic shift value is applied to each SC-FDMA symbol and different ACK/NACK feedback information is carried in different SC-FDMA symbols, Step 1021 may include generating the base sequence, and performing the cyclic shift operation on the base sequence in accordance with the cyclic shift value, so as to acquire the cyclically-shifted base sequence as the cyclically-shifted base sequence corresponding to each SC-FDMA symbol.

Step 1023 may include: multiplying one of the modulation symbols carried in an $i^{th}$ SC-FDMA symbol of the plurality of SC-FDMA symbols with the cyclically-shifted base sequence, so as to acquire a modulation symbol sequence corresponding to the $i^{th}$ SC-FDMA symbol, where i=0, 1, ..., A−1, and A represents the quantity of the SC-FDMA symbols; and mapping the modulation symbol sequence corresponding to the $i^{th}$ SC-FDMA symbol to the $i^{th}$ SC-FDMA symbol for transmission.

At this time, the UE may multiply the $i^{th}$ SC-FDMA symbol acquired through modulating the ACK/NACK feedback information with the cyclically-shifted base sequence so as to acquire an $i^{th}$ frequency-spread modulation symbol sequence, and map the $i^{th}$ frequency-spread modulation symbol sequence to the $i^{th}$ SC-FDMA symbol occupied by the sPUCCH for transmission.

Mode 2-1: when different cyclic shift values are applied to different SC-FDMA symbols and the same ACK/NACK feedback information is carried in each SC-FDMA symbol, Step 1021 may include generating the base sequence, and performing the cyclic shift operation on the base sequence in accordance with the cyclic shift value corresponding to each SC-FDMA symbol, so as to acquire the cyclically-shifted base sequence corresponding to the SC-FDMA symbol respectively.

Step 1023 may include: multiplying the modulation symbol with the cyclically-shifted base sequence corresponding to each SC-FDMA symbol, so as to acquire the modulation symbol sequence corresponding to each SC-FDMA symbol respectively; and mapping the modulation symbol sequence corresponding to each SC-FDMA symbol to a corresponding one of the SC-FDMA symbols for transmission.

At this time, the UE may generate the base sequence, and perform the cyclic shift operation on the base sequence in accordance with the cyclic shift value corresponding to the $i^{th}$ SC-FDMA symbol occupied by the sPUCCH, so as to acquire the cyclically-shifted base sequence corresponding to the $i^{th}$ SC-FDMA symbol, where i=0, 1, ..., A−1, and A represents the quantity of the SC-FDMA symbols. Then, the UE may multiply the modulation symbol acquired through modulating the ACK/NACK feedback information with the cyclically-shifted base sequence corresponding to the $i^{th}$ SC-FDMA symbol so as to acquire the modulation symbol sequence corresponding to the $i^{th}$ SC-FDMA symbol, and map the modulation symbol sequence corresponding to the $i^{th}$ SC-FDMA symbol to the $i^{th}$ SC-FDMA symbol for transmission.

Mode 2-2: when different cyclic shift values are applied to different SC-FDMA symbols and different ACK/NACK feedback information is carried in different SC-FDMA symbols, Step 1021 may include generating the base sequence, and performing the cyclic shift operation on the base sequence in accordance with the cyclic shift value corresponding to each SC-FDMA symbol, so as to acquire the cyclically-shifted base sequence corresponding to each SC-FDMA symbol respectively.

Step 1023 may include: multiplying one of the modulation symbols carried in an $i^{th}$ SC-FDMA symbol of the plurality of SC-FDMA symbols with the cyclically-shifted base sequence corresponding to the $i^{th}$ SC-FDMA symbol, so as to acquire a modulation symbol sequence corresponding to the $i^{th}$ SC-FDMA symbol, where i=0, 1, ..., A−1, and A represents the quantity of the SC-FDMA symbols; and mapping the modulation symbol sequence corresponding to the $i^{th}$ SC-FDMA symbol to the $i^{th}$ SC-FDMA symbol for transmission.

At this time, the UE may generate the base sequence, and perform the cyclic shift operation on the base sequence in accordance with the cyclic shift value corresponding to the $i^{th}$ SC-FDMA symbol occupied by the sPUCCH, so as to acquire the cyclically-shifted base sequence corresponding to the $i^{th}$ SC-FDMA symbol, where i=0, 1, ..., A−1, and A represents the quantity of the SC-FDMA symbols. Then, the UE may multiply the modulation symbol carried in the $i^{th}$ SC-FDMA symbol with the cyclically-shifted base sequence corresponding to the $i^{th}$ SC-FDMA symbol so as to acquire the modulation symbol sequence corresponding to the $i^{th}$ SC-FDMA symbol, and map the modulation symbol sequence corresponding to the $i^{th}$ SC-FDMA symbol to the $i^{th}$ SC-FDMA symbol for transmission.

Mode 3: Step 1023 may include acquiring the modulation symbol sequence in accordance with the modulation symbol, the cyclically-shifted base sequence and a time-domain orthogonal spreading sequence, and mapping the modulation symbol sequence to the time-domain and frequency-domain resources of the sPUCCH for transmission.

The time-domain orthogonal spreading sequence may be pre-agreed, configured through high-layer signaling, or notified through the downlink control channel.

At this time, the UE may generate the base sequence, perform the cyclic shift operation on the base sequence in accordance with the corresponding cyclic shift value (the same cyclic shift value or different cyclic shift values may be applied to the SC-FDMA symbols), multiply the modulation symbol acquired through modulating the ACK/NACK feedback information with the cyclically-shifted base sequence to acquire the frequency-spread modulation symbol sequence, multiply the modulation symbol sequence with the orthogonal spreading sequence having a length of A (A represents the quantity of the SC-FDMA symbols occupied by the sPUCCH), and map the resultant A orthogonally-spread modulation symbol sequences to the A SC-FDMA symbols respectively for transmission.

For Mode 3, when the same cyclic shift value is applied for each SC-FDMA symbol, Step 1021 may include generating the base sequence, and performing a cyclic shift operation on the base sequence in accordance with the cyclic shift value, so as to acquire the cyclically-shifted base sequence as the cyclically-shifted base sequence corresponding to each SC-FDMA symbol.

Step 1023 may include: multiplying the modulation symbol with the cyclically-shifted base sequence, so as to acquire a modulation symbol sequence; multiplying the modulation symbol sequence with a time-domain orthogonal spreading sequence acquired in advance, so as to acquire a plurality of columns of orthogonally-spread modulation symbol sequences, wherein a length of the time-domain orthogonal spreading sequence is equal to the quantity of the SC-FDMA symbols occupied by the sPUCCH; and mapping the plurality of orthogonally-spread modulation symbol sequences to the plurality of SC-FDMA symbols for transmission.

At this time, the UE may generate the base sequence, perform the cyclic shift operation on the base sequence in accordance with the cyclic shift value, multiply the modulation symbol acquired through modulating the ACK/NACK feedback information with the cyclically-shifted base sequence so as to acquire the frequency-spread modulation symbol sequence, multiply the modulation symbol sequence with the time-domain orthogonal spreading sequence having a length of A (A represents the quantity of the SC-FDMA symbols occupied by the sPUCCH), and map the A orthogonally-spread modulation symbol sequences to the A SC-FDMA symbols respectively for transmission.

For Mode 3, when different cyclic shift values are applied to different SC-FDMA symbols, Step 1021 may include generating the base sequence, and performing the cyclic shift operation on the base sequence in accordance with the cyclic shift value corresponding to each SC-FDMA symbol, so as to acquire the cyclically-shifted base sequence corresponding to each SC-FDMA symbol respectively.

Step 1023 may include: multiplying the modulation symbol with a cyclically-shifted base sequence corresponding to an $i^{th}$ SC-FDMA symbol of the plurality of SC-FDMA symbols, and multiplying the modulation symbol with an $i^{th}$, orthogonal factor in an orthogonal sequence corresponding to the $i^{th}$ SC-FDMA symbol, so as to acquire a modulation symbol sequence corresponding to the $i^{th}$ SC-FDMA symbol, where i=0, 1, . . . , A−1, and A represents the quantity of the SC-FDMA symbols; and mapping the modulation symbol sequence corresponding to each SC-FDMA to the corresponding SC-FDMA symbol for transmission.

When there are the number A of SC-FDMA symbols, the time-domain orthogonal spreading sequence has a length of A and includes the number A of orthogonal coefficients, and each orthogonal coefficient corresponds to one SC-FDMA symbol, the modulation symbol may be multiplied with the cyclically-shifted base sequence corresponding to the $i^{th}$ SC-FDMA symbol and then multiplied with the orthogonal coefficient corresponding to the $i^{th}$ SC-FDMA symbol so as to acquire the modulation symbol sequence, and then the modulation symbol sequence may be mapped to the $i^{th}$ SC-FDMA symbol for transmission.

In some possible embodiments of the present disclosure, when merely one frequency-domain scheduling resource element is occupied by the sPUCCH, Step 1021 may include generating the base sequence in accordance with a length of the frequency-domain scheduling resource element, and performing the cyclic shift operation on the base sequence in accordance with the cyclic shift value.

Step 1023 may include: multiplying the modulation symbol with the cyclically-shifted base sequence so as to acquire the modulation symbol sequence; and mapping the modulation symbol sequence to the frequency-domain scheduling resource element occupied by the sPUCCH for transmission.

At this time, when one frequency-domain scheduling resource element is occupied by the sPUCCH, it is able to transmit the sPUCCH as mentioned above.

The length of the frequency-domain scheduling resource element may be defined in accordance with the practical need. For example, one Resource Block (RB) or more than one RB may be defined as one frequency-domain scheduling resource element. Of course, the frequency-domain scheduling resource element may be any other resource, but shall not be limited to the RB.

In many circumstances, more than one frequency-domain scheduling resource element may be occupied by the sPUCCH. The transmission of the sPUCCH will be described hereinafter when more than one frequency-domain scheduling resource element is occupied by the sPUCCH.

Mode 4: when a plurality of frequency-domain scheduling resource elements is occupied by the sPUCCH, Step 1021 may include generating the base sequence in accordance with the length of each frequency-domain scheduling resource element, and performing the cyclic shift operation on the base sequence in accordance with the cyclic shift value.

At this time, the UE may generate the base sequence having a length of N1 (N1 represents the length of one frequency-domain scheduling resource element), and then perform the cyclic shift operation on the base sequence having the length of N1 in accordance with the corresponding cyclic shift value (the same cyclic shift value may be applied to each SC-FDMA symbol or different cyclic shift values may be applied to the SC-FDMA symbols).

In some possible embodiments of the present disclosure, when the base sequence is generated in accordance with the length of one frequency-domain scheduling resource element, Step 1023 may include: carrying same ACK/NACK feedback information on each frequency-domain scheduling resource element; or carrying different ACK/NACK feedback information on different frequency-domain scheduling resource elements.

At this time, when the plurality of frequency-domain scheduling resource elements is occupied by the sPUCCH, the same ACK/NACK feedback information may be carried in each frequency-domain scheduling resource element, or different ACK/NACK feedback information may be carried in different frequency-domain scheduling resource elements.

Mode 4-1: when the same ACK/NACK feedback information is carried in each frequency-domain scheduling resource element, Step 1023 may include: multiplying the modulation symbol with the cyclically-shifted base sequence so as to acquire a modulation symbol sequence corresponding to one frequency-domain scheduling resource element; and duplicating the modulation symbol sequence corresponding to the one frequency-domain scheduling resource element into a plurality of modulation symbol sequences, and mapping the plurality of modulation symbol sequences to the frequency-domain scheduling resource elements occupied by the sPUCCH respectively for transmission.

At this time, the UE may multiply the modulation symbol acquired through modulating the ACK/NACK feedback information with the cyclically-shifted base sequence so as to acquire the frequency-spread modulation symbol sequence having a length of N1, and map the modulation symbol sequence having the length of N1 to each frequency-domain scheduling resource element for transmission (i.e., the same modulation symbol sequence may be transmitted on each frequency-domain scheduling resource element).

Mode 4-2: when different ACK/NACK feedback information is carried in different frequency-domain scheduling resource elements, Step 1023 may include: multiplying one of the modulation symbols carried in each frequency-domain scheduling resource element with the cyclically-shifted base sequence so as to acquire the modulation symbol sequence corresponding to each frequency-domain scheduling resource element respectively; and mapping the modulation symbol sequence corresponding to each frequency-domain scheduling resource element to the corresponding frequency-domain scheduling resource element for transmission.

At this time, the UE may multiply an $i^{th}$ modulation symbol acquired through modulating the ACK/NACK feedback information with the cyclically-shifted base sequence so as to acquire the frequency-spread modulation symbol sequence, and map the modulation symbol sequence to an $i^{th}$ frequency-domain scheduling resource element occupied by the sPUCCH for transmission, where i=0, 1, . . . , B−1, and B represents the quantity of the frequency-domain scheduling resource elements occupied by the sPUCCH.

Mode 5: when a plurality of frequency-domain scheduling resource elements is occupied by the sPUCCH, Step 1021 may include generating the base sequence in accordance with a total length of the frequency-domain scheduling resource elements, and performing the cyclic shift operation on the base sequence in accordance with the cyclic shift value.

At this time, the UE may generate the base sequence having a length of N2 (N2 represents the total length of the plurality of frequency-domain scheduling resource elements), and perform the cyclic shift operation on the base sequence having the length of N2 in accordance with the corresponding cyclic shift value (the same cyclic shift value may be applied to each SC-FDMA symbol or different cyclic shift values may be applied to the SC-FDMA symbols).

For Mode 5, Step 1023 may include: multiplying the modulation symbol with the cyclically-shifted base sequence, so as to acquire the modulation symbol sequence, and mapping the modulation symbol sequence to the plurality of frequency-domain scheduling resource elements occupied by the sPUCCH for transmission.

At this time, the UE may multiply the modulation symbol acquired through modulating the ACK/NACK feedback information with the cyclically-shifted base sequence so as to acquire the frequency-spread modulation symbol sequence having the length of N2, and map the modulation symbol sequence to the plurality of frequency-domain scheduling resource elements (i.e., the same ACK/NACK feedback information is carried in each frequency-domain scheduling resource element).

In the embodiments of the present disclosure, the method where at least one frequency-domain scheduling resource element is occupied by the sPUCCH in the frequency domain may be combined with the method where at least one SC-FDMA symbol is occupied by the sPUCCH in a time domain for the transmission of the ACK/NACK feedback information.

According to the sPUCCH transmission method in the embodiments of the present disclosure, the sPUCCH may be transmitted in accordance with the cyclic shift value notified through the downlink control channel corresponding to the downlink data, e.g., through the DL grant, so as to flexibly control different UEs to transmit the sPUCCH through the same resource in a multiplexing manner, thereby to provide a scheme for the transmission of the sPUCCH as compared with the conventional LTE system where the channel transmission is defined on a subframe basis.

An application scenario for the embodiment in FIG. 1 will be provided hereinafter.

In this scenario, the sPUCCH has a length including 2 SC-FDMA symbols, and merely one piece of ACK/NACK feedback information transmitted within a downlink short TTI is carried in one sPUCCH.

The procedure of the sPUCCH transmission will be described as follows.

The UE may receive, within a downlink subframe or a downlink short TTI, the sPDSCH with the corresponding downlink control channel or the downlink control channel indicating that the short downlink SPS resource release, and acquire the cyclic shift value for the transmission of the sPUCCH carrying the ACK/NACK feedback information in accordance with the indication information in the downlink control channel in a DCI format. The same cyclic shift value may be applied to each SC-FDMA symbol, i.e., the cyclic shift value indicated by the downlink control channel.

Next, the UE may generate 1-bit or 2-bit ACK/NACK feedback information for the sPDSCH or the downlink control channel indicating that the short downlink SPS resource release (when the sPDSCH is transmitted in a multi-codeword manner and no spatial combination is adopted, the ACK/NACK feedback information may include 2 bits, and otherwise, it may include 1 bit), and modulate the ACK/NACK feedback information through Quadrature Phase Shift Keying (QPSK) so as to acquire one modulation symbol.

In a first circumstance, a Demodulation Reference Signal (DMRS) for the sPUCCH may not be included in the two SC-FDMA symbols, or the channel estimation may be performed on the sPUCCH in accordance with the sequence itself rather than the additional DMRS.

When two RBs (one RB represents one frequency-domain scheduling resource element) are occupied by the sPUCCH in the frequency domain or the quantity of RBs (e.g., two RBs) occupied by the sPUCCH carrying the ACK/NACK feedback information corresponding to the downlink control channel is notified through the downlink control channel to the UE, the sPUCCH may be transmitted in the following modes.

Figure 2:
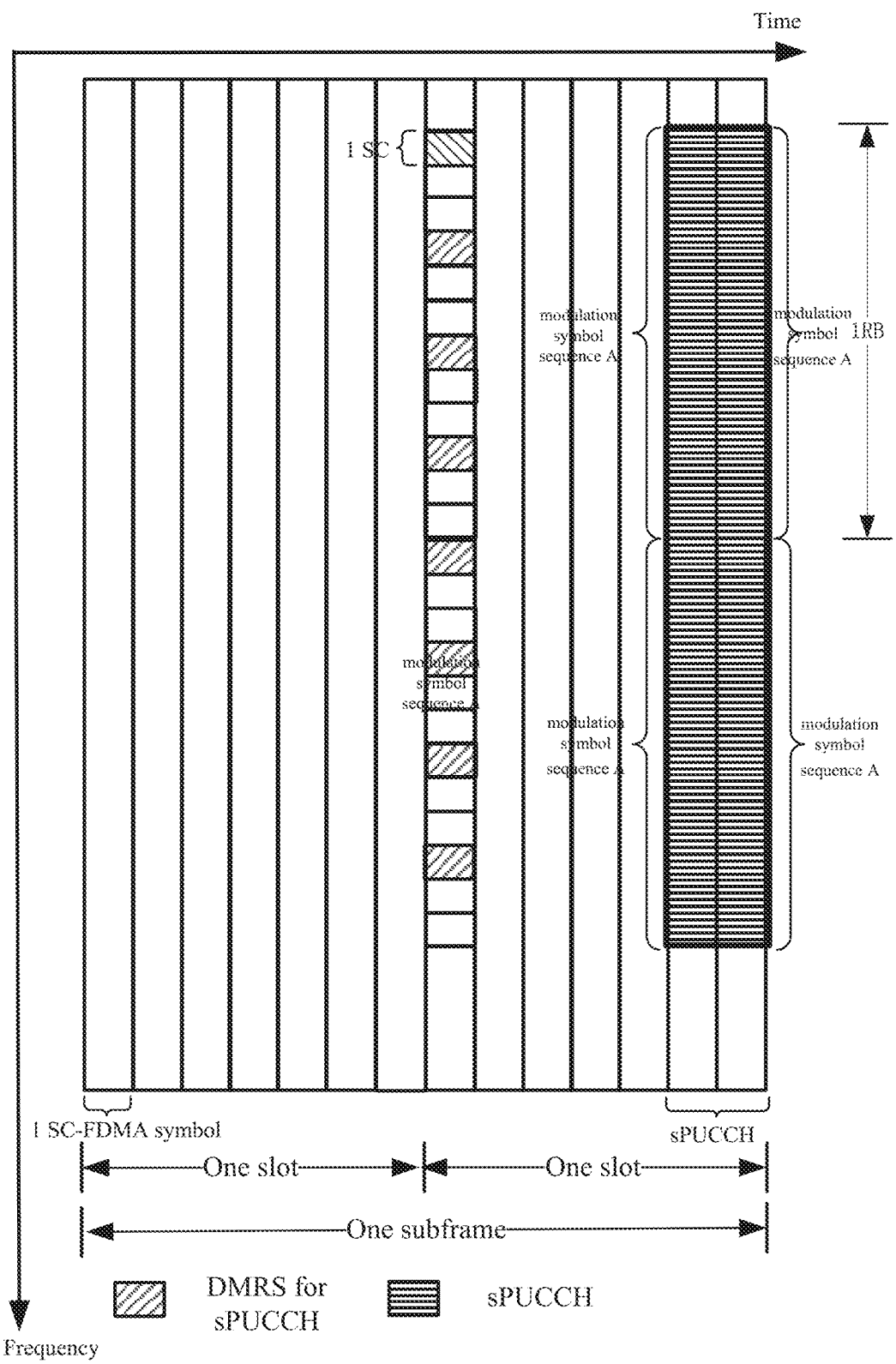
FIG. 2 through FIG. 7 are schematic views showing a transmission structure for the sPUCCH transmission method according to some embodiments of the present disclosure.

Mode 1-1+Mode 4-1: the UE may generate a base sequence having a length of 12 subcarriers (corresponding to 1 RB), perform the cyclic shift operation on the base sequence in accordance with the above-mentioned cyclic shift value, multiply the modulation symbol with the cyclically-shifted base sequence so as to acquire a frequency-spread modulation symbol sequence A having a length of 12 subcarriers, duplicate the modulation symbol sequence into two modulation symbol sequences, and map the modulation symbol sequences to each RB for one SC-FDMA symbol. The above procedure may be repeated for each SC-FDMA symbol. In other words, the same modulation symbol sequence A may be transmitted in each SC-FDMA symbol and in different RBs for each SC-FDMA symbol, as shown in FIG. 2.

Figure 3:
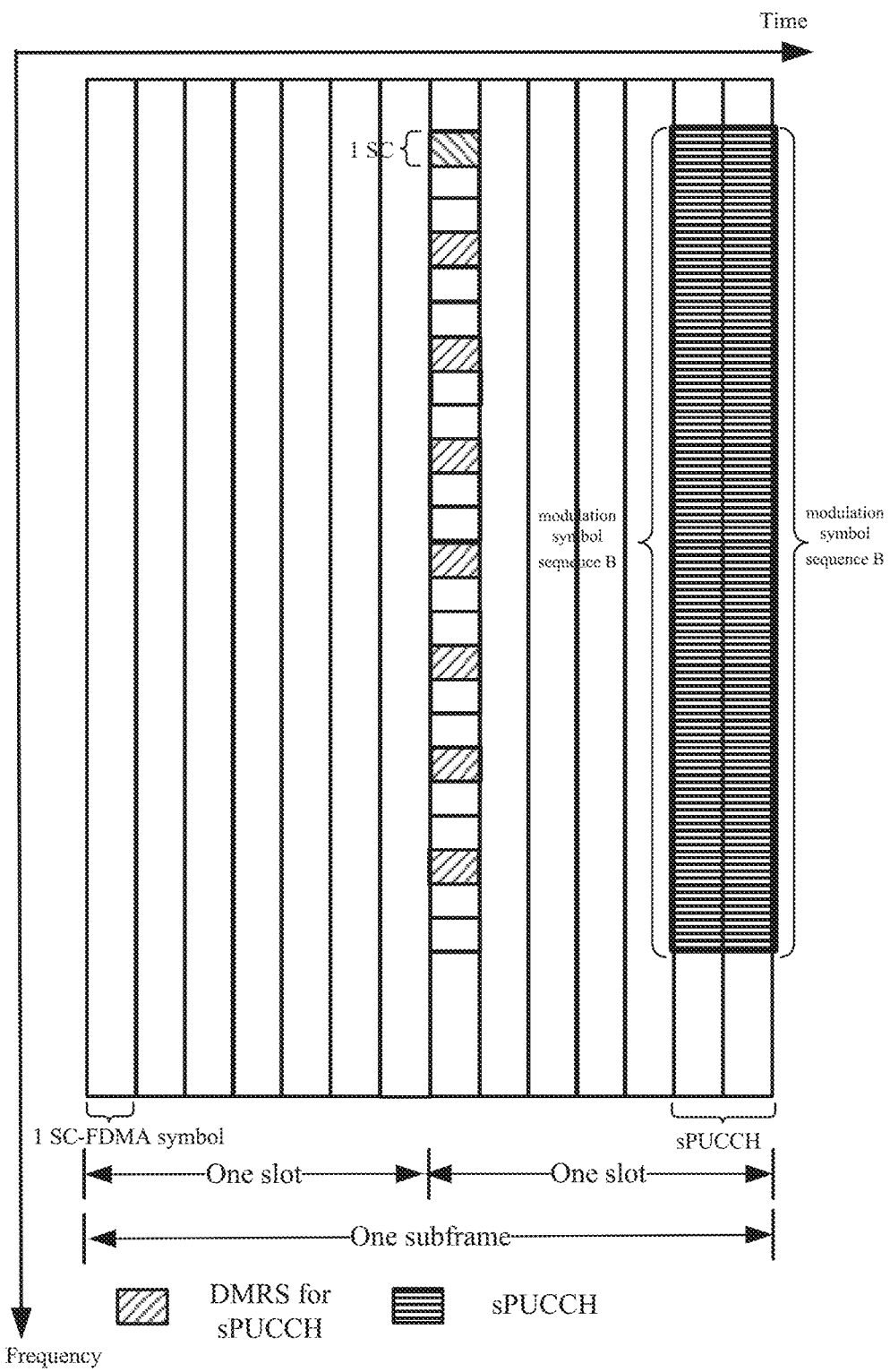

Mode 1-1+Mode 5: the UE may generate a base sequence having a length of 24 subcarriers (corresponding to 2 RBs), perform the cyclic shift operation on the base sequence in accordance with the above-mentioned cyclic shift value, multiply the modulation symbol with the cyclically-shifted base sequence so as to acquire a frequency-spread modulation symbol sequence B having a length of 24 subcarriers, and map the modulation symbol sequence B to two RBs for one SC-FDMA symbol. The above procedure may be repeated for each SC-FDMA symbol. In other words, the same modulation symbol sequence B may be transmitted in each SC-FDMA symbol, as shown in FIG. 3.

When one RB (one RB represents one frequency-domain scheduling resource element) is occupied by the sPUCCH in the frequency domain or the quantity of RBs (e.g., one RB) occupied by the sPUCCH carrying the ACK/NACK feedback information corresponding to the downlink control channel is notified through the downlink control channel to the UE, the sPUCCH may be transmitted in the following mode.

Mode 1-1: the UE may generate a base sequence having a length of 12 subcarriers (corresponding to 1 RB), perform the cyclic shift operation on the base sequence in accordance with the above-mentioned cyclic shift value, multiply the modulation symbol with the cyclically-shifted base sequence so as to acquire a frequency-spread modulation symbol sequence A having a length of 12 subcarriers, duplicate the modulation symbol sequence A having the length of 12 subcarriers into two modulation symbol sequences, and map the modulation symbol sequences to the SC-FDMA symbols respectively. In other words, the modulation symbol sequence may be transmitted on one RB, as shown in FIG. 2.

Figure 4:
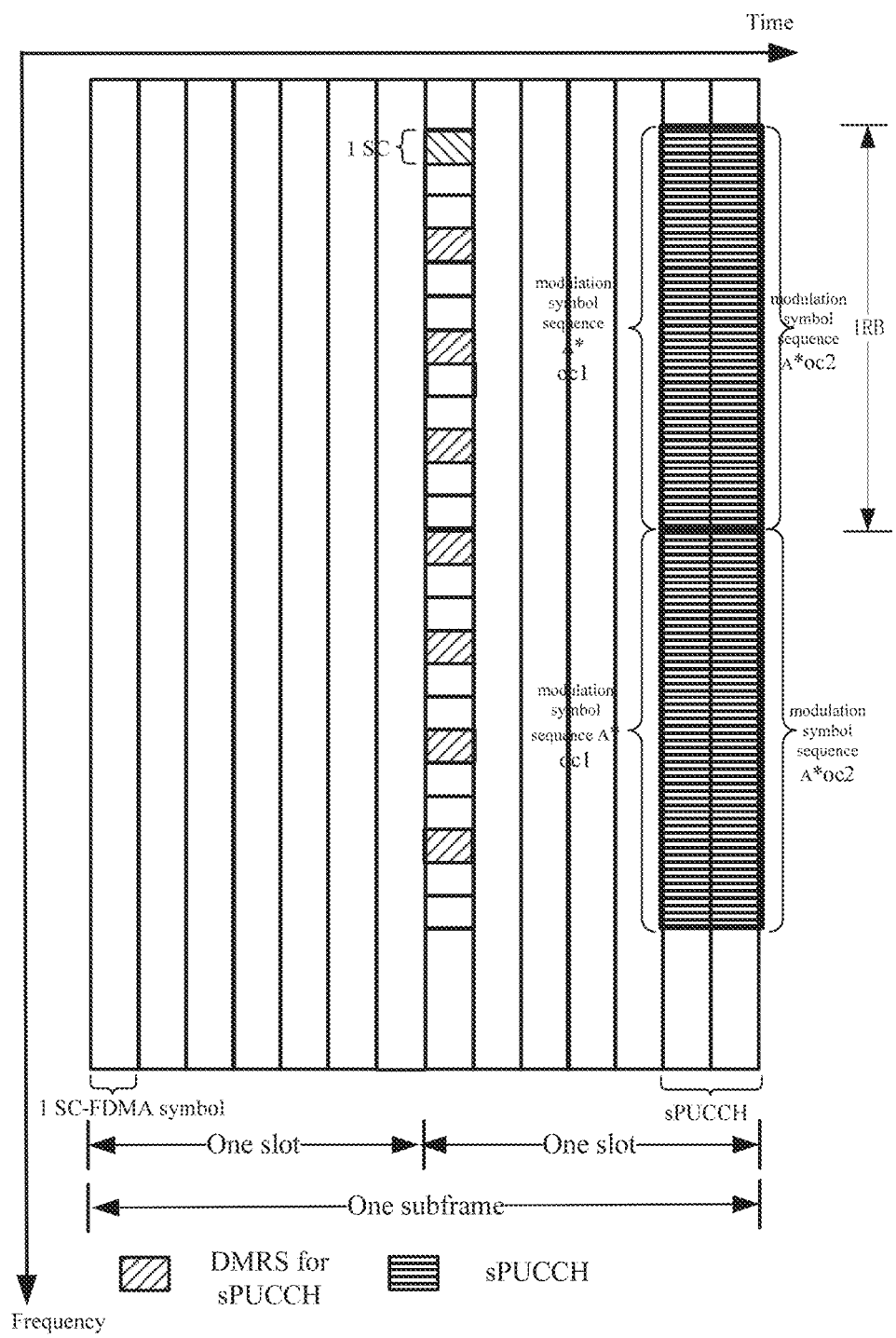
Figure 5:
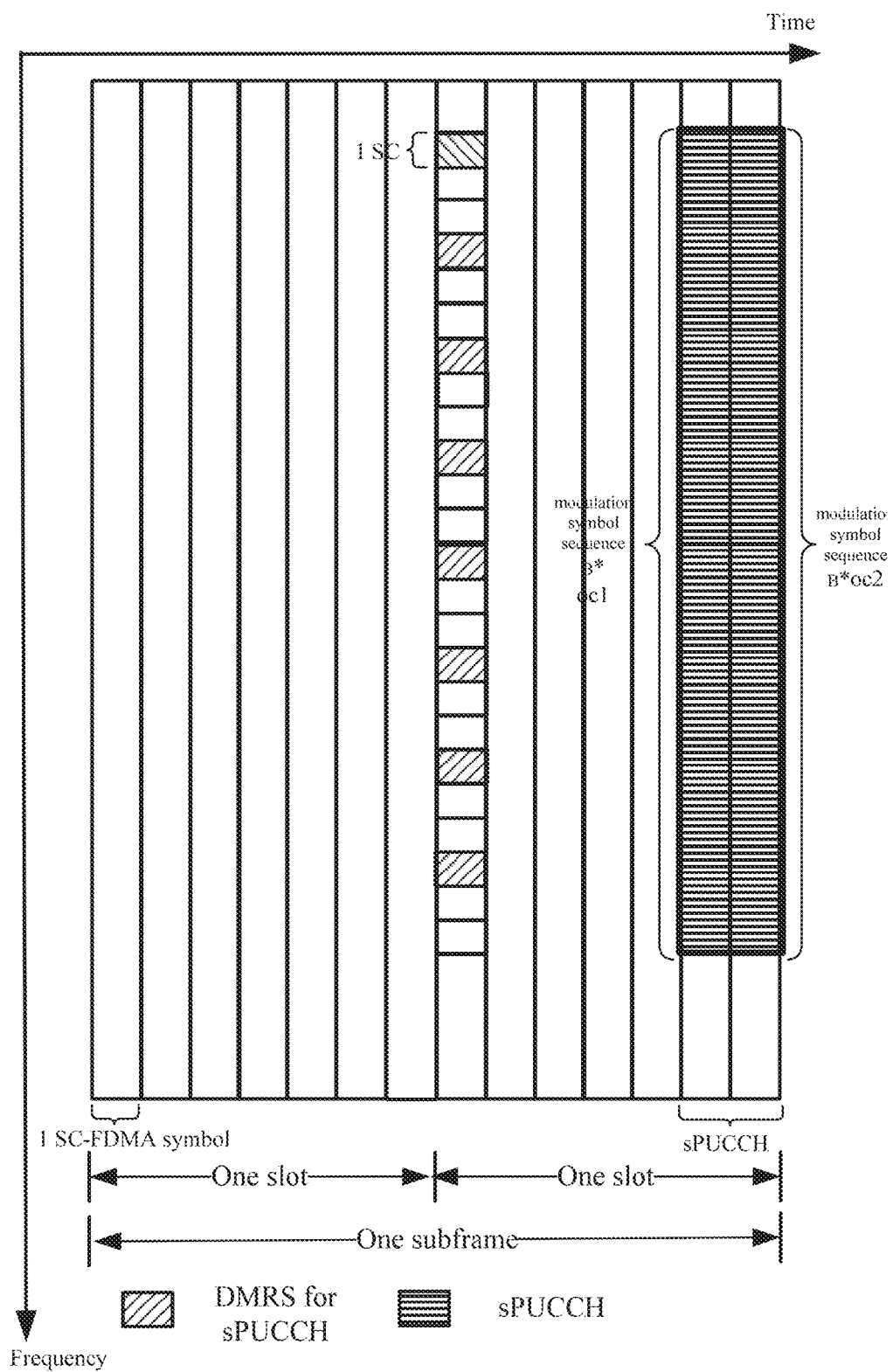

Based on the above, a time-domain orthogonal spreading operation may also be performed on the SC-FDMA symbols. To be specific, the modulation symbol sequence A may be multiplied with an orthogonal sequence [oc1,oc2] having a length of 2 subcarriers, so s to acquire two modulation symbol sequences A*oc1 and A*oc2 each having a length of 12 subcarriers. Next, the two modulation symbol sequences may each be mapped to each RB of the corresponding one of the two SC-FDMA symbols for transmission. In other words, the two modulation symbol sequences each having a length of 12 subcarriers acquired after the time-domain orthogonal spreading operation may be transmitted on the same RB of the two SC-FDMA symbols, and the same content may be transmitted on the two RBs of each SC-FDMA symbol, as shown in FIG. 4. When merely one RB is occupied by the sPUCCH in the frequency domain, the sPUCCH may be transmitted on the RB as shown in FIG. 4. Alternatively, the modulation symbol sequence B may be multiplied with the orthogonal sequence [oc1,oc2] having a length of 2 subcarriers, so as to acquire two modulation symbol sequences B*oc1 and B*oc2 each having a length of 24 subcarriers. Next, the two modulation symbol sequences may be mapped to the two RBs of the two SC-FDMA symbols, i.e., the two modulation symbol sequences each having a length of 24 subcarriers acquired through the time-domain orthogonal spreading operation may be transmitted on the two RBs of the two SC-FDMA symbols, as shown in FIG. 5.

In a second circumstance, the DMRS for the sPUCCH may be included in the two SC-FDMA symbols, e.g., a first SC-FDMA symbol may be the DMRS, and merely a second SC-FDMA symbol maybe adopted for carrying the ACK/NACK feedback information.

When two RBs (one RB represents one frequency-domain scheduling resource element) are occupied by the sPUCCH in the frequency domain or the quantity of RBs (e.g., two RBs) occupied by the sPUCCH carrying the ACK/NACK feedback information corresponding to the downlink control channel is notified through the downlink control channel to the UE, the sPUCCH may be transmitted in the following modes.

Figure 6:
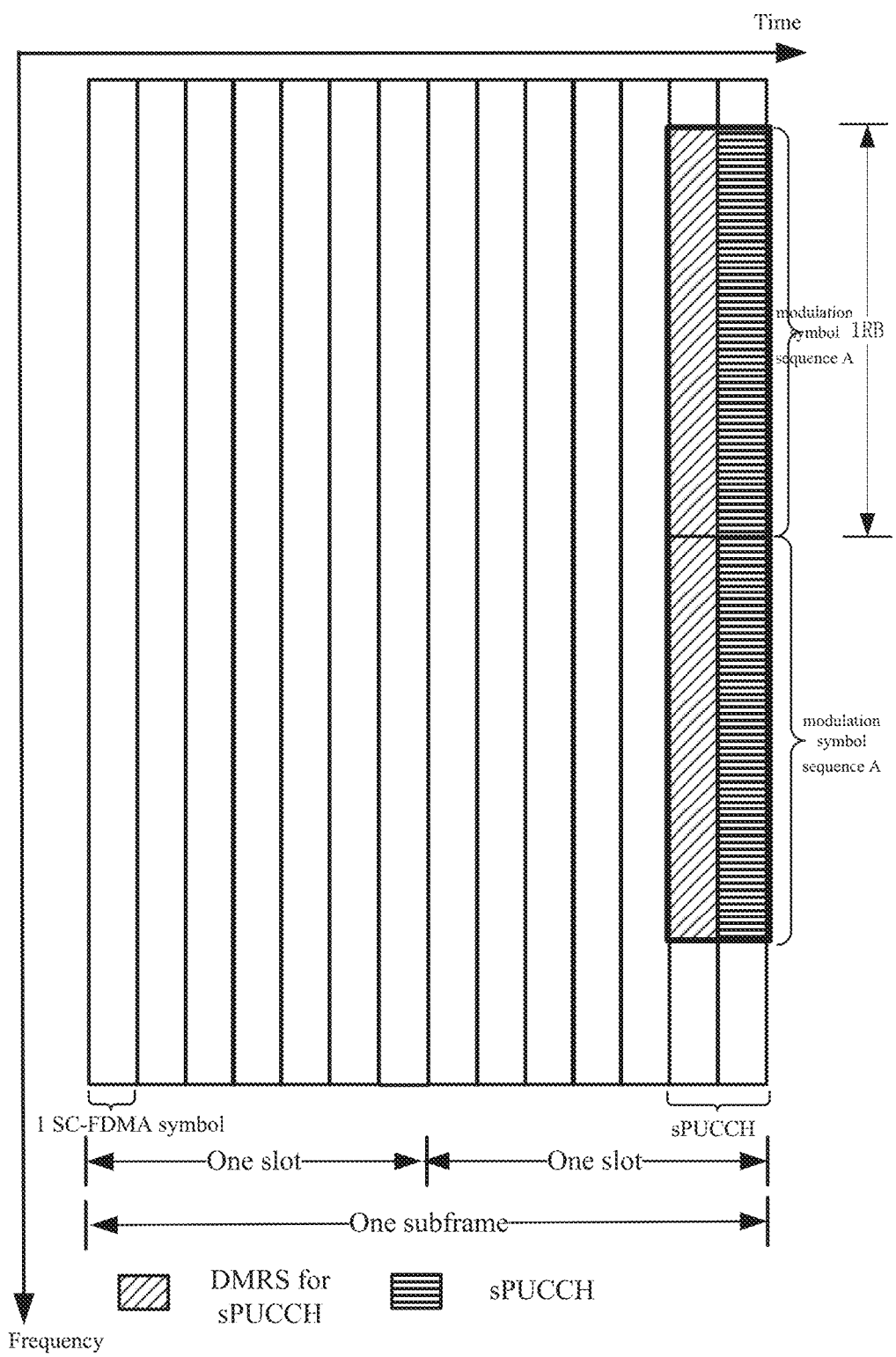

Mode 1-1+Mode 4-1: the UE may generate a base sequence having a length of 12 subcarriers (corresponding to 1 RB), perform the cyclic shift operation on the base sequence in accordance with the above-mentioned cyclic shift value, multiply the modulation symbol with the cyclically-shifted base sequence so as to acquire a frequency-spread modulation symbol sequence A having a length of 12 subcarriers, duplicate the modulation symbol sequence into two modulation symbol sequences, and map the modulation symbol sequences to the RBs for the SC-FDMA symbol carrying the ACK/NACK feedback information, as shown in FIG. 6.

Figure 7:
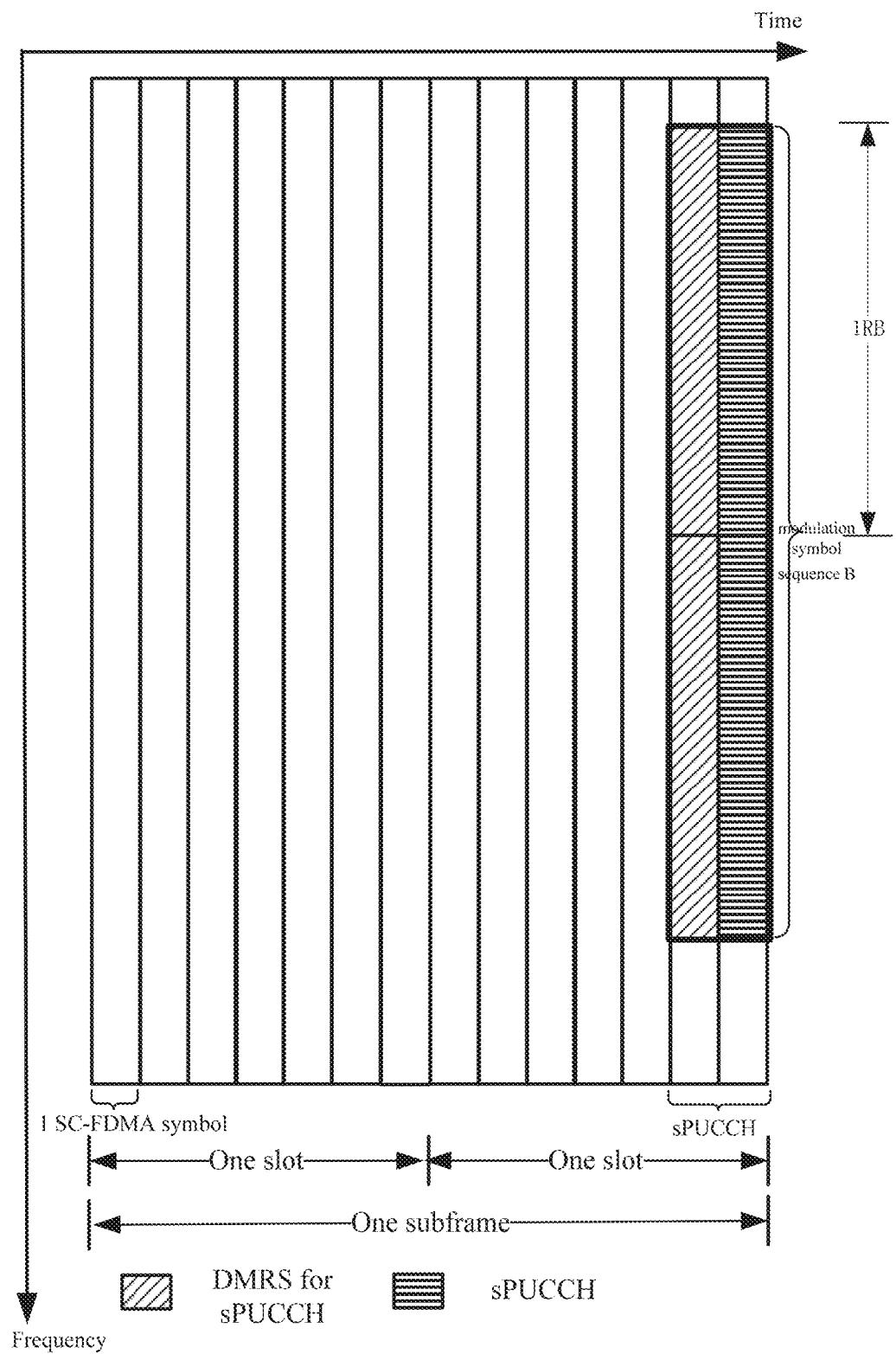

Mode 1-1+Mode 5: the UE may generate a base sequence having a length of 24 subcarriers (corresponding to 2 RBs), perform the cyclic shift operation on the base sequence in accordance with the above-mentioned cyclic shift value, multiply the modulation symbol with the cyclically-shifted base sequence so as to acquire a frequency-spread modulation symbol sequence B having a length of 24 subcarriers, and map the modulation symbol sequence B to two RBs for the SC-FDMA symbol carrying the ACK/NACK feedback information. In other words, the same modulation symbol sequence B may be transmitted in each SC-FDMA symbol, as shown in FIG. 7.

When one RB (one RB represents one frequency-domain scheduling resource element) is occupied by the sPUCCH in the frequency domain or the quantity of RBs (e.g., one RB) occupied by the sPUCCH carrying the ACK/NACK feedback information corresponding to the downlink control channel is notified through the downlink control channel to the UE, the sPUCCH may be transmitted in the following mode.

Mode 1-1: the UE may generate a base sequence having a length of 12 subcarriers (corresponding to 1 RB), perform the cyclic shift operation on the base sequence in accordance with the above-mentioned cyclic shift value, multiply the modulation symbol with the cyclically-shifted base sequence so as to acquire a frequency-spread modulation symbol sequence A having a length of 12 subcarriers, and map the modulation symbol sequence A to the SC-FDMA symbol carrying the ACK/NACK feedback information for transmission. In other words, the modulation symbol sequence may be transmitted on one RB, as shown in FIG. 6.

Another application scenario for the embodiment in FIG. 1 will be provided hereinafter.

In this scenario, the sPUCCH has a length including 2 SC-FDMA symbols, and a plurality of pieces of ACK/NACK feedback information each transmitted within a downlink short TTI are carried in one sPUCCH.

The procedure of the sPUCCH transmission will be described as follows.

The UE may receive, within a downlink subframe or a downlink short TTI, the sPDSCH with the corresponding downlink control channel or the downlink control channel indicating that the short downlink SPS resource release, and acquire the cyclic shift value for the transmission of the sPUCCH carrying the ACK/NACK feedback information in accordance with the indication information in the downlink control channel in a DCI format. The cyclic shift values indicated by the downlink control channel for the ACK/NACK feedback information in the same sPUCCH are the same. The same cyclic shift value may be applied to each SC-FDMA symbol, i.e., the cyclic shift value indicated by the downlink control channel.

Next, the UE may generate K-bit ACK/NACK feedback information for the sPDSCH transmitted in a current sPUCCH or the downlink control channel indicating that the short downlink SPS resource release (when the ACK/NACK feedback information for two sPDSCHs is transmitted in the same sPUCCH and each sPDSCH is transmitted in a two-codeword manner, each sPDSCH may correspond to 2-bit ACK/NACK feedback information, and there may exist totally 4-bit ACK/NACK feedback information; when the ACK/NACK feedback information for four sPDSCHs or four downlink control channels indicating that the downlink SPS resource release is transmitted within the same sPUCCH, each sPDSCH is transmitted in a single-codeword manner or a multi-codeword manner and the spatial combination is adopted, each sPDSCH or downlink control channel indicating that the downlink SPS resource release may corresponding to I-bit ACK/NACK feedback information, and there may exist totally 4,bit ACK/NACK feedback information), and modulate the ACK/NACK feedback information through Quadrature Phase Shift Keying (QPSK) so as to acquire two modulation symbols.

In a first circumstance, the DMRS for the sPUCCH may not be included in the two SC-FDMA symbols, or the channel estimation may be performed on the sPUCCH in accordance with the sequence itself rather than the additional DMRS.

When two RBs (one RB represents one frequency-domain scheduling resource element) are occupied by the sPUCCH in the frequency domain or the quantity of RBs (e.g., two RBs) occupied by the sPUCCH carrying the ACK/NACK feedback information corresponding to the downlink control channel is notified through the downlink control channel to the UE, the sPUCCH may be transmitted in the following modes.

Figure 8:
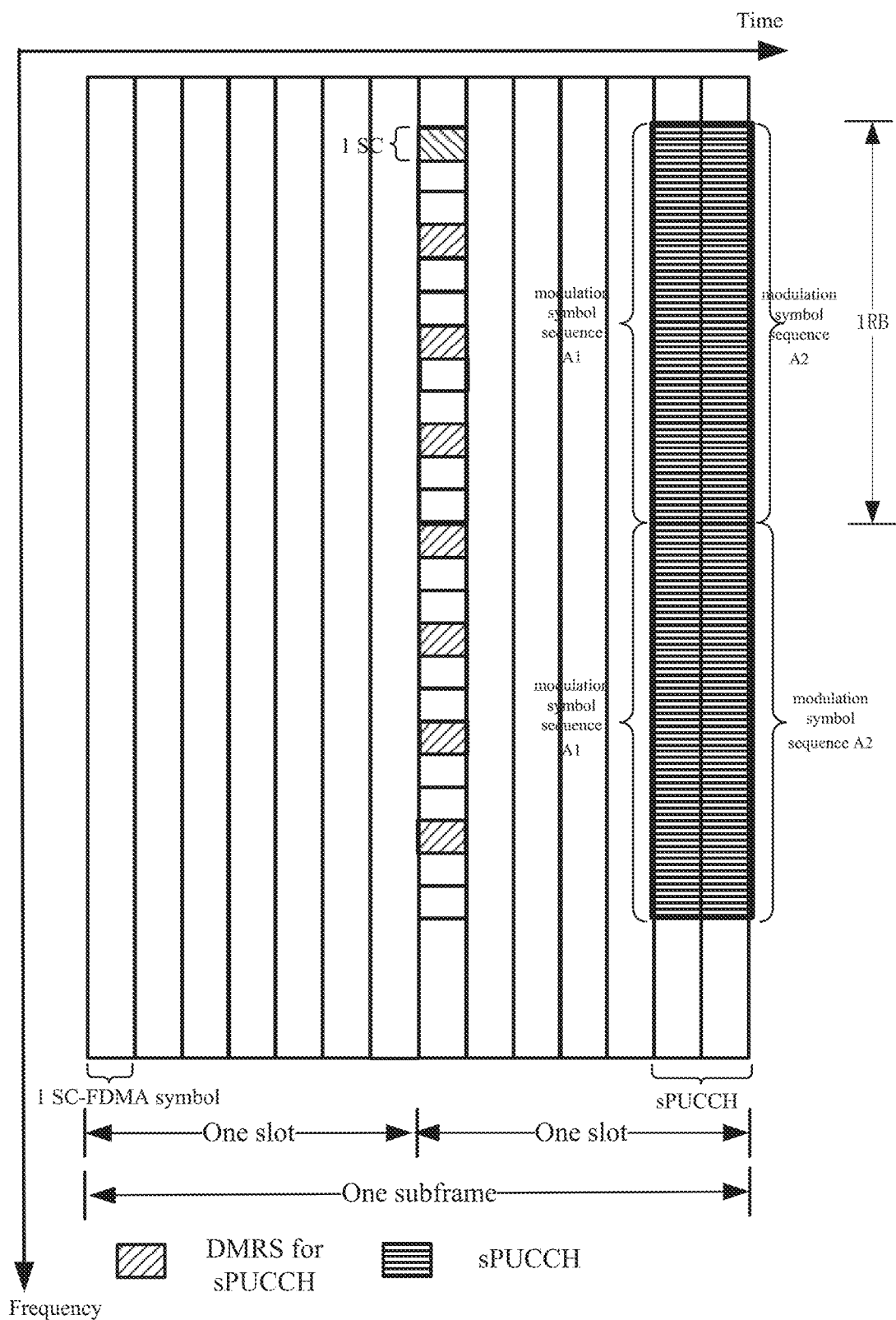
FIG. 8 through FIG. 11 are schematic view showing another transmission structure for the sPUCCH transmission method according to some embodiments of the present disclosure.

Mode 1-2+Mode 4-1: the UE may generate a base sequence having a length of 12 subcarriers (corresponding to 1 RB), perform the cyclic shift operation on the base sequence in accordance with the above-mentioned cyclic shift value, multiply a modulation symbol 1 of the two modulation symbols with the cyclically-shifted base sequence so as to acquire a frequency-spread modulation symbol sequence A1 having a length of 12 subcarriers, duplicate the modulation symbol sequence into two modulation symbol sequences, map the modulation symbol sequences to the RBs for the first SC-FDMA symbol respectively for transmission, multiply a modulation symbol 2 of the two modulation symbols with the cyclically-shifted base sequence so as to acquire a frequency-spread modulation symbol sequence A2 having a length of 12 subcarriers, duplicate the modulation symbol sequence into two modulation symbol sequences, map the modulation symbol sequences to the RBs for the second SC-FDMA symbol respectively for transmission. In other words, the same modulation symbol sequence may be transmitted on the different RBs for each SC-FDMA symbol, and different modulation symbol sequences may be transmitted on different SC-FDMA symbols, as shown in FIG. 8.

Figure 9:
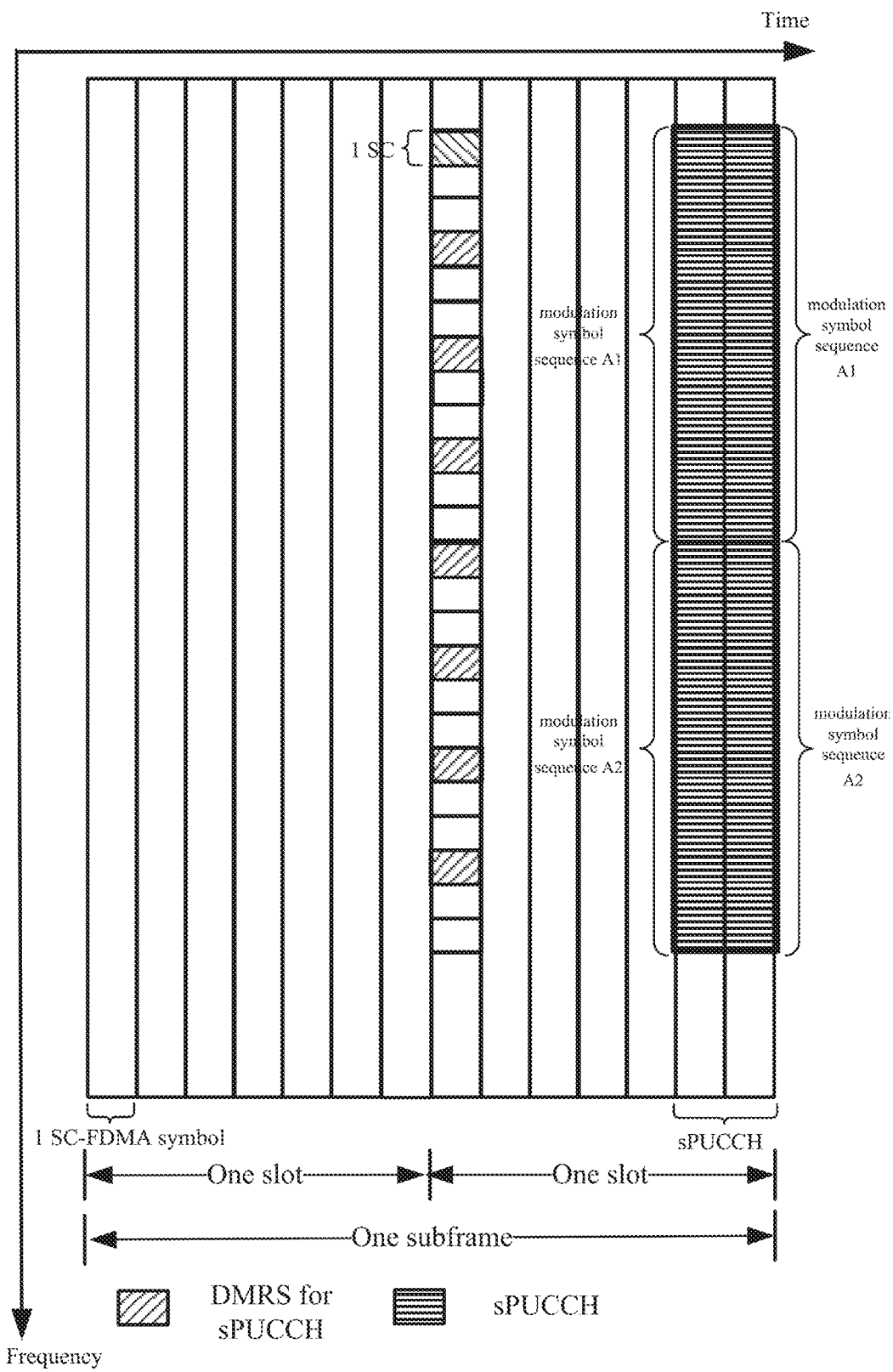

Mode 1-1+Mode 4-2: the UE may generate a base sequence having a length of 12 subcarriers (corresponding to 1 RB), perform the cyclic shift operation on the base sequence in accordance with the above-mentioned cyclic shift value, multiply the modulation symbol 1 of the two modulation symbols with the cyclically-shifted base sequence so as to acquire the frequency-spread modulation symbol sequence A1 having a length of 12 subcarriers, duplicate the modulation symbol sequence into two modulation symbol sequences, map the modulation symbol sequences to the RBs at a same position of the two SC-FDMA symbols respectively for transmission, multiply the modulation symbol 2 of the two modulation symbols with the cyclically-shifted base sequence so as to acquire the frequency-spread modulation symbol sequence A2 having a length of 12 subcarriers, duplicate the modulation symbol sequence into two modulation symbol sequences, map the modulation symbol sequences to the RBs at a same position of the two SC-FDMA symbols respectively for transmission. In other words, different modulation symbol sequences may be transmitted on the different RBs for each SC-FDMA symbol, and the same modulation symbol sequence may be transmitted on the RBs at the same position of the different SC-FDMA symbols, as shown in FIG. 9.

Figure 10:
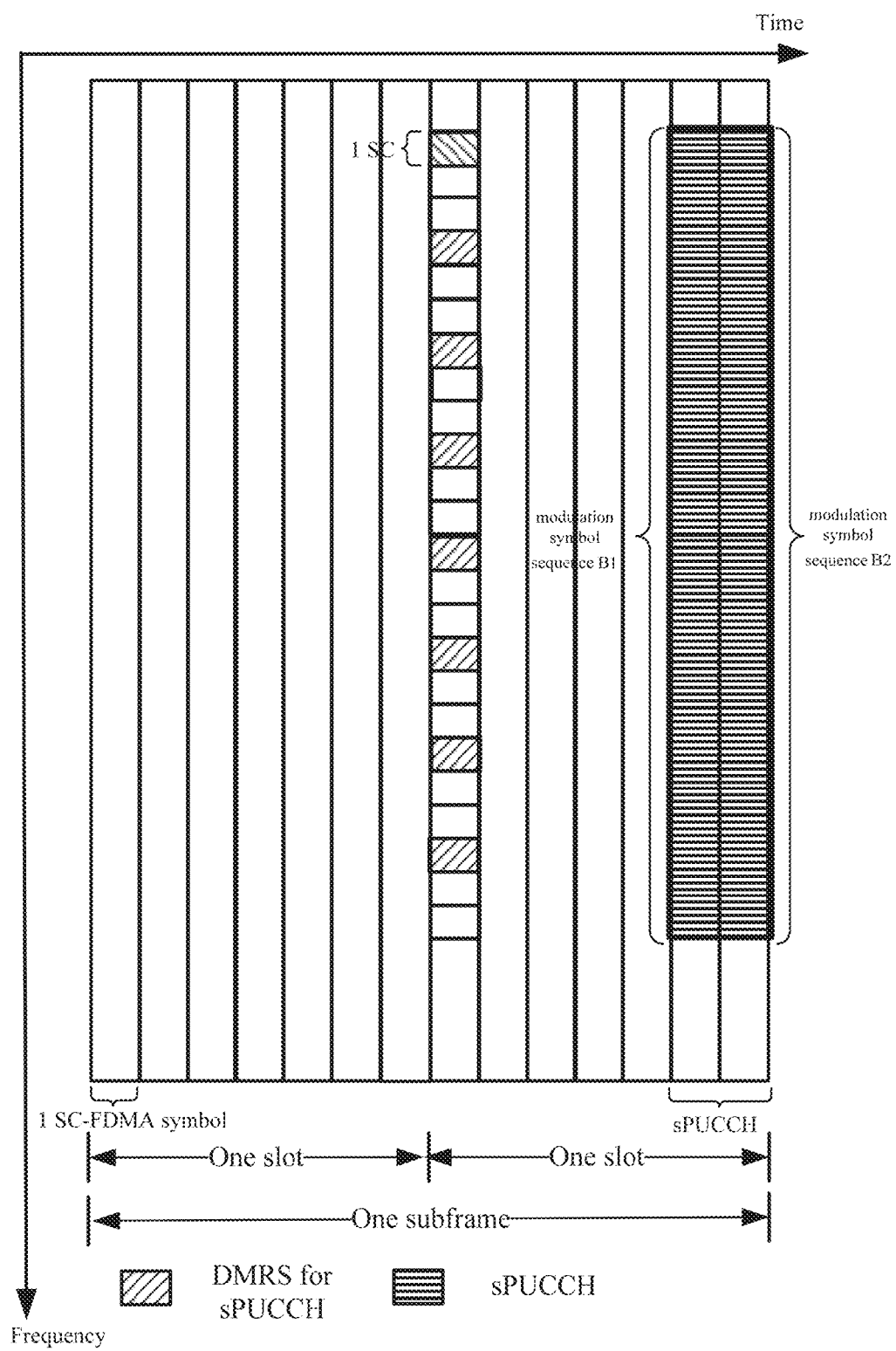

Mode 1-2+Mode 5: the UE may generate a base sequence having a length of 24 subcarriers (corresponding to 2 RBs), perform the cyclic shift operation on the base sequence in accordance with the above-mentioned cyclic shift value, multiply the modulation symbol 1 of the two modulation symbols with the cyclically-shifted base sequence so as to acquire a frequency-spread modulation symbol sequence B1 having a length of 24 subcarriers, map the modulation symbol sequence to the two RBs for the first SC-FDMA symbol, multiply the modulation symbol 2 of the two modulation symbols with the cyclically-shifted base sequence so as to acquire a frequency-spread modulation symbol sequence B2 having a length of 24 subcarriers, map the modulation symbol sequence to the two RBs for the second SC-FDMA symbol for transmission. In other words, the same modulation symbol sequence may be transmitted on each SC-FDMA symbol, as shown in FIG. 10.

When one RB (one RB represents one frequency-domain scheduling resource element) is occupied by the sPUCCH in the frequency domain or the quantity of RBs (e.g., one RB) occupied by the sPUCCH carrying the ACK/NACK feedback information corresponding to the downlink control channel is notified through the downlink control channel to the UE, the sPUCCH may be transmitted in the following mode.

Mode 1-2: the UE may generate a base sequence having a length of 12 subcarriers (corresponding to 1 RB), perform the cyclic shift operation on the base sequence in accordance with the above-mentioned cyclic shift value, multiply the modulation symbol 1 of the two modulation symbols with the cyclically-shifted base sequence so as to acquire the frequency-spread modulation symbol sequence A1 having a length of 12 subcarriers, map the modulation symbol sequence to the RB for the first SC-FDMA symbol for transmission, multiply the modulation symbol 2 of the two modulation symbols with the cyclically-shifted base sequence so as to acquire the frequency-spread modulation symbol sequence A2 having a length of 12 subcarriers, and map the modulation symbol sequence to the RB for the second SC-FDMA symbol for transmission. In other words, different modulation symbol sequences may be transmitted on different SC-FDMA symbols, similar to the circumstance as shown in FIG. 8 where the modulation symbol sequence is transmitted on one RB.

In a second circumstance, the DMRS for the sPUCCH may be included in the two SC-FDMA symbols, e.g., the first SC-FDMA symbol may be the DMRS, and merely the second SC-FDMA symbol maybe adopted for carrying the ACK/NACK feedback information.

When two RBs (one RB represents one frequency-domain scheduling resource element) are occupied by the sPUCCH in the frequency domain or the quantity of RBs (e.g., two RBs) occupied by the sPUCCH carrying the ACK/NACK feedback information corresponding to the downlink control channel is notified through the downlink control channel to the UE, the sPUCCH may be transmitted in the following mode.

Figure 11:
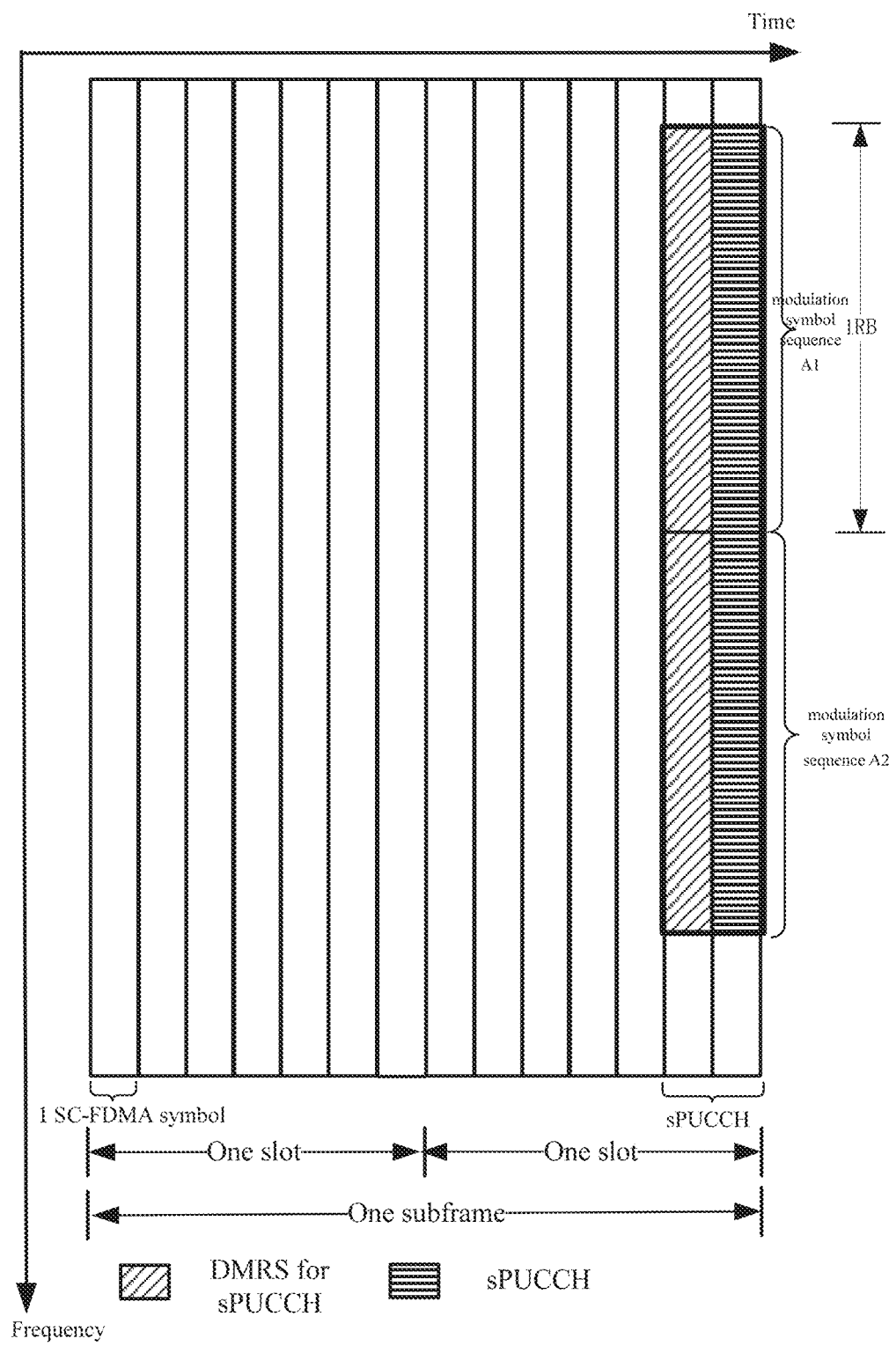

Mode 1-1+Mode 4-2: the UE may generate a base sequence having a length of 12 subcarriers (corresponding to 1 RB), perform the cyclic shift operation on the base sequence in accordance with the above-mentioned cyclic shift value, multiply the modulation symbol 1 of the two modulation symbols with the cyclically-shifted base sequence so as to acquire the frequency-spread modulation symbol sequence A1 having a length of 12 subcarriers, map the modulation symbol sequence to the first RB for the SC-FDMA symbol carrying the ACK/NACK feedback information for transmission, multiply the modulation symbol 2 of the two modulation symbols with the cyclically-shifted base sequence so as to acquire the frequency-spread modulation symbol sequence A2 having a length of 12 subcarriers, and map the modulation symbol sequence to the second RB for the SC-FDMA symbol carrying the ACK/NACK feedback information for transmission. The above procedure may be repeated for each SC-FDMA symbol. In other words, different modulation symbols sequences may be transmitted on different RBs for the SC-FDMA symbol, as shown in FIG. 11.

Based on the embodiments with reference to FIG. 2 through FIG. 7 and the embodiments with reference to FIG. 8 through FIG. 11, the cyclic shift values corresponding to the SC-FDMA symbols may also be different from each other. At this time, the cyclic shift value corresponding to each SC-FDMA symbol may be determined in accordance with the cyclic shift value notified through the downlink control channel using a pre-agreed formula. For example, when a cyclic shift value corresponding to the first SC-FDMA symbol is determined as a1 and a cyclic shift value corresponding to the second SC-FDMA symbol is determined as a2, for each SC-FDMA symbol, the cyclic shift operation and the other operations may be performed on the base sequence in accordance with the corresponding cyclic shift value, and then the resultant modulation symbol sequence may be mapped to the corresponding SC-FDMA symbol.

It should be appreciated that, in the embodiments with reference to FIG. 2 through FIG. 7 and the embodiments with reference to FIG. 8 through FIG. 11, the transmission of the sPUCCH carrying merely two SC-FDMA symbols is taken as an example. Of course, the above-mentioned transmission procedure may also be applied to the sPUCCH carrying one or more than two SC-FDMA symbols.

It should be further appreciated that, in the embodiments with reference to FIG. 2 through FIG. 7 and the embodiments with reference to FIG. 8 through FIG. 11, a same pilot signal (i.e., the DMRS) shared by a plurality of short TTIs in a combined manner or a self-contained DMRS is taken as the DRMS for the uplink transmission. Of course, the other DRMS may also be applied, with a same effect.

Figure 12:
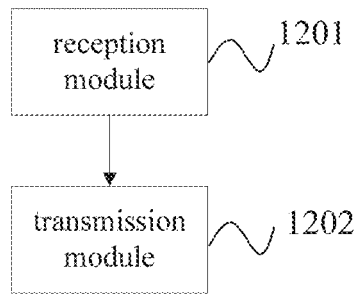
FIG. 12 is a schematic view showing a UE according to some embodiments of the present disclosure.

The present disclosure further provides in some embodiments a UE which, as shown in FIG. 12, includes: a reception module 1201 configured to receive downlink data, and acquire a cyclic shift value for the transmission of an sPUCCH in accordance with indication information carried in a downlink control channel corresponding to the received downlink data; and a transmission module 1202 configured to transmit the sPUCCH in accordance with the cyclic shift value, ACK/NACK feedback information for the downlink data being carried in the sPUCCH.

According to the UE in the embodiments of the present disclosure, the sPUCCH may be transmitted in accordance with the cyclic shift value notified through the downlink control channel corresponding to the downlink data. As a result, it is able to transmit the sPUCCH as compared with the conventional LTE system where the channel transmission is defined on a subframe basis.

In some possible embodiments of the present disclosure, the reception module 1201 may include: a first reception sub-module configured to receive an sPDSCH with a corresponding downlink control channel or a downlink control channel indicating that a short downlink SPS resource release, and acquiring the cyclic shift value for the transmission of the sPUCCH in accordance with the indication information carried in the downlink control channel; or a second reception sub-module configured to receive an sPDSCH without the corresponding downlink control channel, and acquiring the cyclic shift value for the transmission of the sPUCCH in accordance with the indication information carried in the downlink control channel indicating that the short downlink SPS resource activation.

In some possible embodiments of the present disclosure, the transmission module 1202 may include: a cyclic shift sub-module configured to generate a base sequence, and perform a cyclic shift operation on the base sequence in accordance with the cyclic shift value; a modulation sub-module configured to modulate the ACK/NACK feedback information so as to acquire a modulation symbol; and a transmission sub-module configured to acquire a modulation symbol sequence in accordance with the modulation symbol and the cyclically-shifted base sequence, and map the modulation symbol sequence to time-domain and frequency-domain resources of the sPUCCH for transmission.

In some possible embodiments of the present disclosure, when a plurality of SC-FDMA symbols is occupied by the sPUCCH for transmitting the ACK/NACK feedback information, the cyclic shift sub-module is further configured to: apply a same cyclic shift value to each SC-FDMA symbol; or apply different cyclic shift values to different SC-FDMA symbols, and determine the cyclic shift value corresponding to each SC-FDMA symbol in accordance with the acquired cyclic shift value, or when the acquired cyclic shift value includes a plurality of values, determine one value of the acquired a plurality of cyclic shift values as the cyclic shift value corresponding to each SC-FDMA symbol.

In some possible embodiments of the present disclosure, the transmission sub-module is further configured to: carry same ACK/NACK feedback information in each SC-FDMA symbol; or carry different ACK/NACK feedback information in different SC-FDMA symbols.

In some possible embodiments of the present disclosure, when the same cyclic shift value is applied to each SC-FDMA symbol and the same ACK/NACK feedback information is carried in each SC-FDMA symbol, the cyclic shift sub-module includes a first cyclic shift unit configured to generate the base sequence, and perform the cyclic shift operation on the base sequence in accordance with the cyclic shift value, so as to acquire the cyclically-shifted base sequence as the cyclically-shifted base sequence corresponding to each SC-FDMA symbol. The transmission sub-module includes a first transmission unit configured to: multiply the modulation symbol with the cyclically-shifted base sequence so as to acquire the modulation symbol sequence carried in one SC-FDMA symbol; and duplicate the modulation symbol sequence carried in the one SC-FDMA symbol into a plurality of modulation symbol sequences and map the duplicated modulation symbol sequences to the SC-FDMA symbols respectively for transmission. When the same cyclic shift value is applied to each SC-FDMA symbol and different ACK/NACK feedback information is carried in different SC-FDMA symbols, the cyclic shift sub-module includes a second cyclic shift unit configured to generate the base sequence, and perform the cyclic shift operation on the base sequence in accordance with the cyclic shift value, so as to acquire the cyclically-shifted base sequence as the cyclically-shifted base sequence corresponding to each SC-FDMA symbol. The transmission sub-module includes a second transmission unit configured to: multiply one of the modulation symbols carried in an $i^{th}$ SC-FDMA symbol of the plurality of SC-FDMA symbols with the cyclically-shifted base sequence, so as to acquire a modulation symbol sequence corresponding to the $i^{th}$ SC-FDMA symbol, where i=0, 1, . . . , A−1, and A represents the quantity of the SC-FDMA symbols; and map the modulation symbol sequence corresponding to the $i^{th}$ SC-FDMA symbol to the $i^{th}$ SC-FDMA symbol for transmission. When different cyclic shift values are applied to different SC-FDMA symbols and the same ACK/NACK feedback information is carried in each SC-FDMA symbol, the cyclic shift sub-module includes a third cyclic shift unit configured to generate the base sequence, and perform the cyclic shift operation on the base sequence in accordance with the cyclic shift value corresponding to each SC-FDMA symbol, so as to acquire the cyclically-shifted base sequence corresponding to the SC-FDMA symbol respectively. The transmission sub-module includes a third transmission unit configured to: multiply the modulation symbol with the cyclically-shifted base sequence corresponding to each SC-FDMA symbol, so as to acquire the modulation symbol sequence corresponding to each SC-FDMA symbol respectively; and map the modulation symbol sequence corresponding to each SC-FDMA symbol to a corresponding one of the SC-FDMA symbols for transmission. When different cyclic shift values are applied to different SC-FDMA symbols and different ACK/NACK feedback information is carried in different SC-FDMA symbols, the cyclic shift sub-module includes a fourth cyclic shift unit configured to generate the base sequence, and perform the cyclic shift operation on the base sequence in accordance with the cyclic shift value corresponding to each SC-FDMA symbol, so as to acquire the cyclically-shifted base sequence corresponding to each SC-FDMA symbol respectively. The transmission sub-module includes a fourth transmission unit configured to: multiply one of the modulation symbols carried in an $i^{th}$ SC-FDMA symbol of the plurality of SC-FDMA symbols with the cyclically-shifted base sequence corresponding to the $i^{th}$ SC-FDMA symbol, so as to acquire a modulation symbol sequence corresponding to the $i^{th}$ SC-FDMA symbol, where i=0, 1, . . . , A−1, and A represents the quantity of the SC-FDMA symbols; and map the modulation symbol sequence corresponding to the $i^{th}$ SC-FDMA symbol to the $i^{th}$ SC-FDMA symbol for transmission.

In some possible embodiments of the present disclosure, a time-domain orthogonal spreading operation may be performed on the SC-FDMA symbols. At this time, the transmission sub-module is further configured to acquire the modulation symbol sequence in accordance with the modulation symbol, the cyclically-shifted base sequence and a time-domain orthogonal spreading sequence, and map the modulation symbol sequence to the time-domain and frequency-domain resources of the sPUCCH for transmission.

In some possible embodiments of the present disclosure, when the same cyclic shift value is applied for each SC-FDMA symbol, the cyclic shift sub-module includes a fifth cyclic shift unit configured to generate the base sequence, and perform a cyclic shift operation on the base sequence in accordance with the cyclic shift value, so as to acquire the cyclically-shifted base sequence as the cyclically-shifted base sequence corresponding to each SC-FDMA symbol. The transmission sub-module includes a fifth transmission unit configured to: multiply the modulation symbol with the cyclically-shifted base sequence, so as to acquire a modulation symbol sequence; multiply the modulation symbol sequence with a time-domain orthogonal spreading sequence acquired in advance, so as to acquire a plurality of orthogonally-spread modulation symbol sequences, a length of the time-domain orthogonal spreading sequence being equal to the quantity of the SC-FDMA symbols occupied by the sPUCCH; and map the plurality of orthogonally-spread modulation symbol sequences to the plurality of SC-FDMA symbols for transmission. When different cyclic shift values are applied to different SC-FDMA symbols, the cyclic shift sub-module includes a sixth cyclic shift unit configured to generate the base sequence, and perform the cyclic shift operation on the base sequence in accordance with the cyclic shift value corresponding to each SC-FDMA symbol, so as to acquire the cyclically-shifted base sequence corresponding to each SC-FDMA symbol respectively. The transmission sub-module includes a sixth transmission unit configured to: multiply the modulation symbol with a cyclically-shifted base sequence corresponding to an $i^{th}$ SC-FDMA symbol of the plurality of SC-FDMA symbols, and multiply the modulation symbol with an $i^{th}$ orthogonal factor in an orthogonal sequence corresponding to the $i^{th}$ SC-FDMA symbol, so as to acquire a modulation symbol sequence corresponding to the $i^{th}$ SC-FDMA symbol, where i=0, 1, . . . , A−1, and A represents the quantity of the SC-FDMA symbols; and map the modulation symbol sequence corresponding to each SC-FDMA to the corresponding SC-FDMA symbol for transmission.

In some possible embodiments of the present disclosure, when a plurality of frequency-domain scheduling resource elements is occupied by the sPUCCH, the cyclic shift sub-module includes a seventh cyclic shift unit configured to generate the base sequence in accordance with a length of each frequency-domain scheduling resource element, and perform the cyclic shift operation on the base sequence in accordance with the cyclic shift value.

In some possible embodiments of the present disclosure, the transmission sub-module is further configured to: carry same ACK/NACK feedback information on each frequency-domain scheduling resource element; or carry different ACK/NACK feedback information on different frequency-domain scheduling resource elements.

In some possible embodiments of the present disclosure, when the same ACK/NACK feedback information is carried in each frequency-domain scheduling resource element, the transmission sub-module includes a seventh transmission unit configured to: multiply the modulation symbol with the cyclically-shifted base sequence so as to acquire a modulation symbol sequence corresponding to one frequency-domain scheduling resource element; and duplicate the modulation symbol sequence corresponding to the one frequency-domain scheduling resource element into a plurality of modulation symbol sequences, and map the plurality of modulation symbol sequences to the frequency-domain scheduling resource elements occupied by the sPUCCH respectively for transmission. When different ACK/NACK feedback information is carried in different frequency-domain scheduling resource elements, the transmission sub-module includes an eighth transmission unit configured to: multiply one of the modulation symbols carried in each frequency-domain scheduling resource element with the cyclically-shifted base sequence, so as to acquire the modulation symbol sequence corresponding to each frequency-domain scheduling resource element respectively; and map the modulation symbol sequence corresponding to each frequency-domain scheduling resource element to the corresponding frequency-domain scheduling resource element for transmission.

In some possible embodiments of the present disclosure, when a plurality of frequency-domain scheduling resource elements is occupied by the sPUCCH, the cyclic shift sub-module includes an eighth cyclic shift unit configured to generate the base sequence in accordance with a total length of the frequency-domain scheduling resource elements, and perform the cyclic shift operation on the base sequence in accordance with the cyclic shift value. The transmission sub-module includes a ninth transmission unit configured to: multiply the modulation symbol with the cyclically-shifted base sequence so as to acquire the modulation symbol sequence, and map the modulation symbol sequence to the plurality of frequency-domain scheduling resource elements occupied by the sPUCCH for transmission.

In some possible embodiments of the present disclosure, the base sequence may be a CAZAC sequence.

According to the UE in the embodiments of the present disclosure, the sPUCCH may be transmitted in accordance with the cyclic shift value notified through the downlink control channel corresponding to the downlink data. As a result, it is able to transmit the sPUCCH as compared with the conventional LTE system where the channel transmission is defined on a subframe basis.

It should be appreciated that, the implementation of the UE may refer to the implementation of the above-mentioned sPUCCH transmission method, with the same technical effect. The UE may be a mobile electronic device, e.g., a mobile phone or a flat-panel computer.

Figure 13:
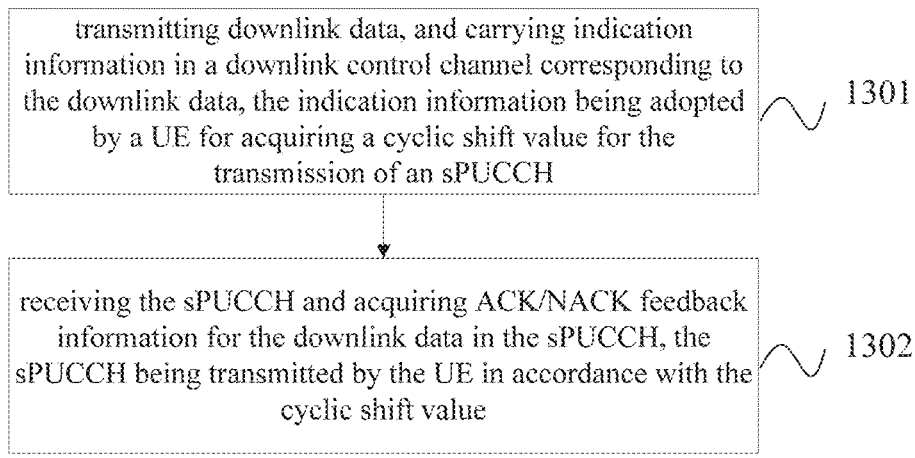
FIG. 13 is a flow chart of an sPUCCH transmission method for use in a base station according to some embodiments of the present disclosure.

The present disclosure further provides in some embodiments an sPUCCH transmission method which, as shown in FIG. 13, includes the following steps.

Step 1301: transmitting downlink data, and carrying indication information in a downlink control channel corresponding to the downlink data, the indication information being adopted by a UE for acquiring a cyclic shift value for the transmission of an sPUCCH.

In this step, the UE may be notified of the cyclic shift value for the transmission of the sPUCCH through the indication information carried in the downlink control channel corresponding to the downlink data, e.g., through an indicator in Downlink (DL) grant (a downlink control channel in a Downlink Control Information (DCI) format).

Step 1302: receiving the sPUCCH and acquiring ACK/NACK feedback information for the downlink data in the sPUCCH, the sPUCCH being transmitted by the UE in accordance with the cyclic shift value.

In this step, the UE may transmit the sPUCCH in accordance with the acquired cyclic shift value, and the ACK/NACK feedback information for the downlink data may be carried in the sPUCCH.

According to the sPUCCH transmission method in the embodiments of the present disclosure, the sPUCCH may be transmitted in accordance with the cyclic shift value notified through the downlink control channel corresponding to the downlink data. As a result, it is able to transmit the sPUCCH as compared with a conventional LTE system where the channel transmission is defined on a subframe basis.

In some possible embodiments of the present disclosure, Step 1301 may include: Step 13011 of transmitting an sPDSCH with a corresponding downlink control channel or a downlink control channel indicating that a short downlink SPS resource release, and carrying the indication information in the downlink control channel: or Step 13012 of transmitting an sPDSCH without the corresponding downlink control channel, and carrying the indication information in the downlink control channel indicating that the short downlink SPS resource activation.

In other words, in the embodiments of the present disclosure, the downlink control channel for notifying the cyclic shift value for the transmission of the sPUCCH may include the downlink control channel with the corresponding dynamic sPDSCH, the downlink control channel indicating that the short downlink SPS resource activation (i.e., the downlink control channel is adopted for activating the transmission of an SPS sPDSCH), and the downlink control channel indicating that the short downlink SPS resource release. Of course, when the sPUCCH carries the ACK/NACK feedback information for the downlink data transmitted within a conventional TTI length, the downlink control channel for notifying the cyclic shift value for the transmission of the sPUCCH may further include a downlink control channel with a corresponding dynamic PDSCH, a downlink control channel indicating that a downlink SPS resource activation, and a downlink control channel indicating that a downlink SPS resource release. In addition, the downlink control channel in the embodiments of the present disclosure may be a downlink control channel transmitted within a conventional TTI, e.g., a legacy PDCCHEPDCCH, or a downlink control channel transmitted within a TTI having a length smaller than 1 ms, i.e., an sPDCCH.

In some possible embodiments of the present disclosure, Step 1302 may include determining the sPUCCH transmitted by the UE through: Step 13021 of generating a base sequence, and performing a cyclic shift operation on the base sequence in accordance with the cyclic shift value; Step 13022 of modulating the ACK/NACK feedback information so as to acquire a modulation symbol; and Step 13023 of acquiring a modulation symbol sequence in accordance with the modulation symbol and the cyclically-shifted base sequence, and mapping the modulation symbol sequence to time-domain and frequency-domain resources of the sPUCCH for transmission.

In some possible embodiments of the present disclosure, the base sequence may be a CAZAC sequence, and the CAZAC sequence may be generated from a gold sequence or a ZC sequence.

In some possible embodiments of the present disclosure, when a plurality of SC-FDMA symbols is occupied by the sPUCCH for transmitting the ACK/NACK feedback information, Step 13021 may include: Mode 1 of applying a same cyclic shift value to each SC-FDMA symbol; or Mode 2 of applying different cyclic shift values to different SC-FDMA symbols, and determining the cyclic shift value corresponding to each SC-FDMA symbol in accordance with the acquired cyclic shift value, or when the acquired cyclic shift value includes a plurality of values, determining one value of the acquired a plurality of cyclic shift values as the cyclic shift value corresponding to each SC-FDMA symbol.

Here, when different cyclic shift values are applied to the SC-FDMA symbols, the cyclic shift value corresponding to each SC-FDMA symbol may be determined in accordance with the acquired cyclic shift values. For example, the cyclic shift value corresponding to each SC-FDMA symbol may be determined through a function about the acquired cyclic shift value and a serial number of each SC-FDMA symbol. For example, a cyclic shift value corresponding to a first SC-FDMA symbol may be just the acquired cyclic shift value, and for the remaining SC-FDMA symbols, a cyclic shift value corresponding to each SC-FMDA symbol is a cyclic shift value corresponding to a previous SC-FDMA symbol plus a, and a represents a step value pre-agreed or notified in the downlink control channel.

When the plurality of SC-FDMA symbols is occupied by the sPUCCH for the transmission of the ACK/NACK feedback information, the same cyclic shift value may be applied to each SC-FDMA symbol, or different cyclic shift values may be applied to the SC-FDMA symbols.

In some possible embodiments of the present disclosure, Step 13023 may include: carrying same ACK/NACK feedback information in each SC-FDMA symbol; or carrying different ACK/NACK feedback information in different SC-FDMA symbols.

At this time, when the plurality of SC-FDMA symbols is occupied by the sPUCCH for the transmission of the ACK/NACK feedback information, the same ACK/NACK feedback information may be carried in each SC-FDMA symbol (at this time, when a plurality of frequency-domain scheduling resource elements are occupied by the sPUCCH in a frequency domain, the ACK/NACK feedback information transmitted on the frequency-domain scheduling resource elements may be the same or different, but a same ACK/NACK feedback information sequence may be transmitted on the different SC-FDMA symbols, e.g., an ACK/NACK modulation symbol 1 may be transmitted on a first frequency-domain scheduling resource element for each SC-FDMA symbol, and an ACK/NACK modulation symbol 2 may be transmitted on a second frequency-domain scheduling resource element for each SC-FDMA symbol; at this time, it may also be deemed that the same ACK/NACK feedback information is carried in each SC-FDMA symbol), or different ACK/NACK feedback information may be carried in the SC-FDMA symbols.

Mode 1-1: when the same cyclic shift value is applied to each SC-FDMA symbol and the same ACK/NACK feedback information is carried in each SC-FDMA symbol, the sPUCCH may be transmitted by the UE through: generating the base sequence, and performing the cyclic shift operation on the base sequence in accordance with the cyclic shift value, so as to acquire the cyclically-shifted base sequence as the cyclically-shifted base sequence corresponding to each SC-FDMA symbol; multiplying the modulation symbol with the cyclically-shifted base sequence so as to acquire the modulation symbol sequence carried in one SC-FDMA symbol; and duplicating the modulation symbol sequence carried in the one SC-FDMA symbol into a plurality of modulation symbol sequences and mapping the duplicated modulation symbol sequences to the SC-FDMA symbols respectively for transmission.

At this time, the UE may multiply the modulation symbol acquired after modulating the ACK/NACK feedback information with the cyclically-shifted base sequence so as to acquire the frequency-spread modulation symbol sequence, and map the same modulation symbol sequence to the SC-FDMA symbols for transmission (i.e., the same modulation symbol sequence may be transmitted on each SC-FDMA symbol).

Mode 1-2: when the same cyclic shift value is applied to each SC-FDMA symbol and different ACK/NACK feedback information is carried in different SC-FDMA symbols, the sPUCCH may be transmitted by the UE through: generating the base sequence, and performing the cyclic shift operation on the base sequence in accordance with the cyclic shift value, so as to acquire the cyclically-shifted base sequence as the cyclically-shifted base sequence corresponding to each SC-FDMA symbol; multiplying one of the modulation symbols carried in an $i^{th}$ SC-FDMA symbol of the plurality of SC-FDMA symbols with the cyclically-shifted base sequence, so as to acquire a modulation symbol sequence corresponding to the $i^{th}$ SC-FDMA symbol, where i=0, 1, . . . , A−1, and A represents the quantity of the SC-FDMA symbols; and mapping the modulation symbol sequence corresponding to the $i^{th}$ SC-FDMA symbol to the $i^{th}$ SC-FDMA symbol for transmission.

At this time, the UE may multiply the $i^{th}$ SC-FDMA symbol acquired through modulating the ACK/NACK feedback information with the cyclically-shifted base sequence so as to acquire an $i^{th}$ frequency-spread modulation symbol sequence, and map the $i^{th}$ frequency-spread modulation symbol sequence to the $i^{th}$ SC-FDMA symbol occupied by the sPUCCH for transmission.

Mode 2-1: when different cyclic shift values are applied to different SC-FDMA symbols and the same ACK/NACK feedback information is carried in each SC-FDMA symbol, the sPUCCH may be transmitted by the UE through: generating the base sequence, and performing the cyclic shift operation on the base sequence in accordance with the cyclic shift value corresponding to each SC-FDMA symbol, so as to acquire the cyclically-shifted base sequence corresponding to the SC-FDMA symbol; multiplying the modulation symbol with the cyclically-shifted base sequence corresponding to each SC-FDMA symbol, so as to acquire the modulation symbol sequence corresponding to each SC-FDMA symbol respectively; and mapping the modulation symbol sequence corresponding to each SC-FDMA symbol to a corresponding one of the SC-FDMA symbols for transmission.

At this time, the UE may generate the base sequence, and perform the cyclic shift operation on the base sequence in accordance with the cyclic shift value corresponding to the ii SC-FDMA symbol occupied by the sPUCCH, so as to acquire the cyclically-shifted base sequence corresponding to the $i^{th}$ SC-FDMA symbol, where i=0, 1, . . . , A−1, and A represents the quantity of the SC-FDMA symbols. Then, the UE may multiply the modulation symbol acquired through modulating the ACK/NACK feedback information with the cyclically-shifted base sequence corresponding to the $i^{th}$ SC-FDMA symbol so as to acquire the modulation symbol sequence corresponding to the $i^{th}$ SC-FDMA symbol, and map the modulation symbol sequence corresponding to the $i^{th}$ SC-FDMA symbol to the $i^{th}$ SC-FDMA symbol for transmission.

Mode 2-2: when different cyclic shift values are applied to different SC-FDMA symbols and different ACK/NACK feedback information is carried in different SC-FDMA symbols, the sPUCCH may be transmitted by the UE through: generating the base sequence, and performing the cyclic shift operation on the base sequence in accordance with the cyclic shift value corresponding to each SC-FDMA symbol, so as to acquire the cyclically-shifted base sequence corresponding to each SC-FDMA symbol respectively; multiplying one of the modulation symbols carried in an $i^{th}$ SC-FDMA symbol of the plurality of SC-FDMA symbols with the cyclically-shifted base sequence corresponding to the $i^{th}$ SC-FDMA symbol, so as to acquire a modulation symbol sequence corresponding to the $i^{th}$ SC-FDMA symbol, where i=0, 1, . . . , A−1, and A represents the quantity of the SC-FDMA symbols; and mapping the modulation symbol sequence corresponding to the $i^{th}$ SC-FDMA symbol to the $i^{th}$ SC-FDMA symbol for transmission.

At this time, the UE may generate the base sequence, and perform the cyclic shift operation on the base sequence in accordance with the cyclic shift value corresponding to the $i^{th}$ SC-FDMA symbol occupied by the sPUCCH, so as to acquire the cyclically-shifted base sequence corresponding to the $i^{th}$ SC-FDMA symbol, where i=0, 1, . . . , A−1, and A represents the quantity of the SC-FDMA symbols. Then, the UE may multiply the modulation symbol carried in the $i^{th}$ SC-FDMA symbol with the cyclically-shifted base sequence corresponding to the $i^{th}$ SC-FDMA symbol so as to acquire the modulation symbol sequence corresponding to the $i^{th}$ SC-FDMA symbol, and map the modulation symbol sequence corresponding to the $i^{th}$ SC-FDMA symbol to the $i^{th}$ SC-FDMA symbol for transmission.

Mode 3: Step 13023 may include acquiring the modulation symbol sequence in accordance with the modulation symbol, the cyclically-shifted base sequence and a time-domain orthogonal spreading sequence, and mapping the modulation symbol sequence to the frequency-domain resources of the sPUCCH for transmission.

The time-domain orthogonal spreading sequence may be pre-agreed, configured through high-layer signaling, or notified through the downlink control channel.

At this time, the UE may generate the base sequence, perform the cyclic shift operation on the base sequence in accordance with the corresponding cyclic shift value (the same cyclic shift value or different cyclic shift values may be applied to the SC-FDMA symbols), multiply the modulation symbol acquired through modulating the ACK/NACK feedback information with the cyclically-shifted base sequence to acquire the frequency-spread modulation symbol sequence, multiply the modulation symbol sequence with the orthogonal spreading sequence having a length of A (A represents the quantity of the SC-FDMA symbols occupied by the sPUCCH), and map the resultant A orthogonally-spread modulation symbol sequences to the A SC-FDMA symbols respectively for transmission.

For Mode 3, when the same cyclic shift value is applied for each SC-FDMA symbol, the sPUCCH may be transmitted by the UE through: generating the base sequence, and performing a cyclic shift operation on the base sequence in accordance with the cyclic shift value, so as to acquire the cyclically-shifted base sequence as the cyclically-shifted base sequence corresponding to each SC-FDMA symbol; multiplying the modulation symbol with the cyclically-shifted base sequence so as to acquire a modulation symbol sequence; multiplying the modulation symbol sequence with a time-domain orthogonal spreading sequence acquired in advance, so as to acquire a plurality of columns of orthogonally-spread modulation symbol sequences, a length of the time-domain orthogonal spreading sequence being equal to the quantity of the SC-FDMA symbols occupied by the sPUCCH; and mapping the plurality of orthogonally-spread modulation symbol sequences to the plurality of SC-FDMA symbols for transmission.

At this time, the UE may generate the base sequence, perform the cyclic shift operation on the base sequence in accordance with the cyclic shift value, multiply the modulation symbol acquired through modulating the ACK/NACK feedback information with the cyclically-shifted base sequence so as to acquire the frequency-spread modulation symbol sequence, multiply the modulation symbol sequence with the time-domain orthogonal spreading sequence having a length of A (A represents the quantity of the SC-FDMA symbols occupied by the sPUCCH), and map the A orthogonally-spread modulation symbol sequences to the A SC-FDMA symbols respectively for transmission.

For Mode 3, when different cyclic shift values are applied to different SC-FDMA symbols, the sPUCCH may be transmitted by the UE through: generating the base sequence, and performing the cyclic shift operation on the base sequence in accordance with the cyclic shift value corresponding to each SC-FDMA symbol, so as to acquire the cyclically-shifted base sequence corresponding to each SC-FDMA symbol respectively; multiplying the modulation symbol with a cyclically-shifted base sequence corresponding to an $i^{th}$ SC-FDMA symbol of the plurality of SC-FDMA symbols, and multiplying the modulation symbol with an $i^{th}$ orthogonal factor in an orthogonal sequence corresponding to the $i^{th}$ SC-FDMA symbol, so as to acquire a modulation symbol sequence corresponding to the $i^{th}$ SC-FDMA symbol, where i=0, 1, . . . , A−1, and A represents the quantity of the SC-FDMA symbols; and mapping the modulation symbol sequence corresponding to each SC-FDMA to the corresponding SC-FDMA symbol for transmission.

When there are A SC-FDMA symbols, the time-domain orthogonal spreading sequence has a length of A and includes A orthogonal coefficients, and each orthogonal coefficient corresponds to one SC-FDMA symbol, the modulation symbol may be multiplied with the cyclically-shifted base sequence corresponding to the $i^{th}$ SC-FDMA symbol and then multiplied with the orthogonal coefficient corresponding to the $i^{th}$ SC-FDMA symbol so as to acquire the modulation symbol sequence, and then the modulation symbol sequence may be mapped to the $i^{th}$ SC-FDMA symbol for transmission.

Mode 4: when a plurality of frequency-domain scheduling resource elements is occupied by the sPUCCH, the base sequence may be generated by the UE through generating the base sequence in accordance with a length of each frequency-domain scheduling resource element, and performing the cyclic shift operation on the base sequence in accordance with the cyclic shift value.

At this time, the UE may generate the base sequence having a length of N1 (N1 represents the length of one frequency-domain scheduling resource element), and then perform the cyclic shift operation on the base sequence having the length of N1 in accordance with the corresponding cyclic shift value (the same cyclic shift value may be applied to each SC-FDMA symbol or different cyclic shift values may be applied to the SC-FDMA symbols).

In some possible embodiments of the present disclosure, when the base sequence is generated in accordance with the length of one frequency-domain scheduling resource element, the sPUCCH may be transmitted by the UE through: carrying same ACK/NACK feedback information on each frequency-domain scheduling resource element; or carrying different ACK/NACK feedback information on each frequency-domain scheduling resource element.

At this time, when the plurality of frequency-domain scheduling resource elements is occupied by the sPUCCH, the same ACK/NACK feedback information may be carried in each frequency-domain scheduling resource element, or different ACK/NACK feedback information may be carried in different frequency-domain scheduling resource elements.

Mode 4-1: when the same ACK/NACK feedback information is carried in each frequency-domain scheduling resource element, the sPUCCH may be transmitted by the UE through: multiplying the modulation symbol with the cyclically-shifted base sequence so as to acquire a modulation symbol sequence corresponding to one frequency-domain scheduling resource element; and duplicating the modulation symbol sequence corresponding to the one frequency-domain scheduling resource element into a plurality of modulation symbol sequences, and mapping the plurality of modulation symbol sequences to the frequency-domain scheduling resource elements occupied by the sPUCCH respectively for transmission.

At this time, the UE may multiply the modulation symbol acquired through modulating the ACK/NACK feedback information with the cyclically-shifted base sequence so as to acquire the frequency-spread modulation symbol sequence having a length of N, and map the modulation symbol sequence having the length of N1 to each frequency-domain scheduling resource element for transmission (i.e., the same modulation symbol sequence may be transmitted on each frequency-domain scheduling resource element).

Mode 4-2: when different ACK/NACK feedback information is carried in different frequency-domain scheduling resource elements, the sPUCCH may be transmitted by the UE through: multiplying one of the modulation symbols carried in each frequency-domain scheduling resource element with the cyclically-shifted base sequence, so as to acquire the modulation symbol sequence corresponding to each frequency-domain scheduling resource element respectively; and mapping the modulation symbol sequence corresponding to each frequency-domain scheduling resource element to the corresponding frequency-domain scheduling resource element for transmission.

At this time, the UE may multiply an $i^{th}$ modulation symbol acquired through modulating the ACK/NACK feedback information with the cyclically-shifted base sequence so as to acquire the frequency-spread modulation symbol sequence, and map the modulation symbol sequence to an $i^{th}$ frequency-domain scheduling resource element occupied by the sPUCCH for transmission, where i=0, 1, . . . , B–1, and B represents the quantity of the frequency-domain scheduling resource elements occupied by the sPUCCH.

Mode 5: when a plurality of frequency-domain scheduling resource elements is occupied by the sPUCCH, the base sequence may be generated by the UE and the sPUCCH may be transmitted by the UE through: generating the base sequence in accordance with a total length of the frequency-domain scheduling resource elements, and performing the cyclic shift operation on the base sequence in accordance with the cyclic shift value; multiplying the modulation symbol with the cyclically-shifted base sequence so as to acquire the modulation symbol sequence; and mapping the modulation symbol sequence to the plurality of frequency-domain scheduling resource elements occupied by the sPUCCH for transmission.

At this time, the UE may generate the base sequence having a length of N2 (N2 represents the total length of the plurality of frequency-domain scheduling resource elements), and perform the cyclic shift operation on the base sequence having the length of N2 in accordance with the corresponding cyclic shift value (the same cyclic shift value may be applied to each SC-FDMA symbol or different cyclic shift values may be applied to the SC-FDMA symbols). The UE may multiply the modulation symbol acquired through modulating the ACK/NACK feedback information with the cyclically-shifted base sequence so as to acquire the frequency-spread modulation symbol sequence having the length of N2, and map the modulation symbol sequence to the plurality of frequency-domain scheduling resource elements (i.e., the same ACK/NACK feedback information is carried in each frequency-domain scheduling resource element).

In the embodiments of the present disclosure, the method where at least one frequency-domain scheduling resource element is occupied by the sPUCCH in the frequency domain may be combined with the method where at least one SC-FDMA symbol is occupied by the sPUCCH in a time domain for the transmission of the ACK/NACK feedback information.

According to the sPUCCH transmission method in the embodiments of the present disclosure, the sPUCCH may be transmitted in accordance with the cyclic shift value notified through the downlink control channel corresponding to the downlink data, e.g., through the DL grant, so as to flexibly control different UEs to transmit the sPUCCH through the same resource in a multiplexing manner, thereby to provide a scheme for the transmission of the sPUCCH as compared with the conventional LTE system where the channel transmission is defined on a subframe basis.

Figure 14:
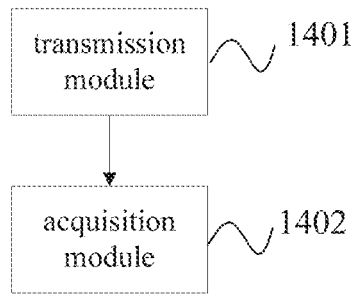
FIG. 14 is a schematic view showing a base station according to some embodiments of the present disclosure.
Figure 15:
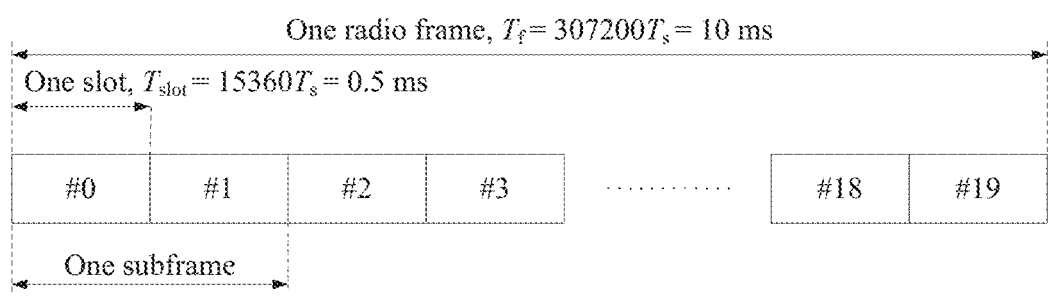
FIG. 15 is a schematic view showing a frame structure type of a conventional LTE FDD system.
Figure 16:
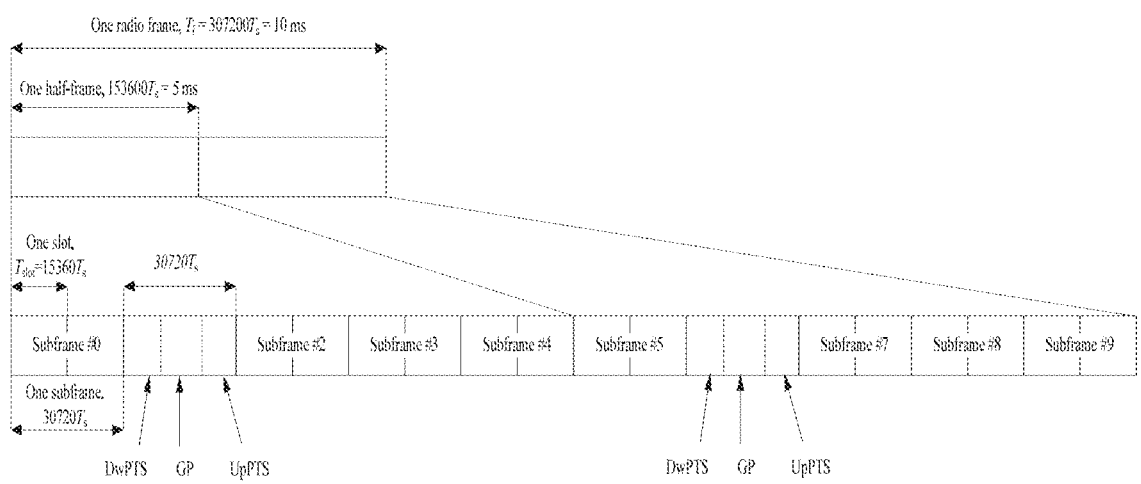
FIG. 16 is a schematic view showing a frame structure type of a conventional LTE TDD system.

The present disclosure further provides in some embodiments a base station which, as shown in FIG. 14, includes: a transmission module 1401 configured to transmit downlink data, and carry indication information in a downlink control channel corresponding to the downlink data, the indication information being adopted by a UE for acquiring a cyclic shift value for the transmission of an sPUCCH; and an acquisition module 1402 configured to receive the sPUCCH and acquire ACK/NACK feedback information for the downlink data in the sPUCCH, the sPUCCH being transmitted by the UE in accordance with the cyclic shift value.

According to the base station in the embodiments of the present disclosure, the sPUCCH may be transmitted in accordance with the cyclic shift value notified through the downlink control channel corresponding to the downlink data, e.g., through the DL grant, so as to flexibly control different UEs to transmit the sPUCCH through the same resource in a multiplexing manner, thereby to provide a scheme for the transmission of the sPUCCH as compared with the conventional LTE system where the channel transmission is defined on a subframe basis.

In some possible embodiments of the present disclosure, the transmission module 1401 may include: a first transmission sub-module configured to transmit an sPDSCH with a corresponding downlink control channel or a downlink control channel indicating that a short downlink SPS resource release, and carry the indication information in the downlink control channel; or a second transmission sub-module configured to transmit an sPDSCH without the corresponding downlink control channel, and carry the indication information in the downlink control channel indicating that the short downlink SPS resource activation.

In some possible embodiments of the present disclosure, the acquisition module 1402 may include a determination sub-module configured to determine the sPUCCH transmitted by the UE through: generating a base sequence, and performing a cyclic shift operation on the base sequence in accordance with the cyclic shift value; modulating the ACK/NACK feedback information so as to acquire a modulation symbol; and acquiring a modulation symbol sequence in accordance with the modulation symbol and the cyclically-shifted base sequence, and mapping the modulation symbol sequence to time-domain and frequency-domain resources of the sPUCCH for transmission.

In some possible embodiments of the present disclosure, when a plurality of SC-FDMA symbols is occupied by the sPUCCH for transmitting the ACK/NACK feedback information, the generating the base sequence and performing the cyclic shift operation on the base sequence in accordance with the cyclic shift value includes: applying a same cyclic shift value to each SC-FDMA symbol; or applying different cyclic shift values to different SC-FDMA symbols, and determining the cyclic shift value corresponding to each SC-FDMA symbol in accordance with the acquired cyclic shift value, or when the acquired cyclic shift value includes a plurality of values, determining one value of the acquired a plurality of cyclic shift values as the cyclic shift value corresponding to each SC-FDMA symbol.

In some possible embodiments of the present disclosure, the acquiring the modulation symbol sequence in accordance with the modulation symbol and the cyclically-shifted base sequence and mapping the modulation symbol sequence to the time-domain and frequency-domain resources in the sPUCCH for transmission includes: carrying same ACK/NACK feedback information in each SC-FDMA symbol; or carrying different ACK/NACK feedback information in different SC-FDMA symbols.

In some possible embodiments of the present disclosure, when the same cyclic shift value is applied to each SC-FDMA symbol and the same ACK/NACK feedback information is carried in each SC-FDMA symbol, the generating the base sequence and performing the cyclic shift operation on the base sequence in accordance with the cyclic shift value includes generating the base sequence, and performing the cyclic shift operation on the base sequence in accordance with the cyclic shift value, so as to acquire the cyclically-shifted base sequence as the cyclically-shifted base sequence corresponding to each SC-FDMA symbol. The acquiring the modulation symbol sequence in accordance with the modulation symbol and the cyclically-shifted base sequence and mapping the modulation symbol sequence to the time-domain and frequency-domain resources in the sPUCCH for transmission includes: multiplying the modulation symbol with the cyclically-shifted base sequence so as to acquire the modulation symbol sequence carried in one SC-FDMA symbol; and duplicating the modulation symbol sequence carried in the one SC-FDMA symbol into a plurality of modulation symbol sequences and mapping the duplicated modulation symbol sequences to the SC-FDMA symbols respectively for transmission. When the same cyclic shift value is applied to each SC-FDMA symbol and different ACK/NACK feedback information is carried in different SC-FDMA symbols, the generating the base sequence and performing the cyclic shift operation on the base sequence in accordance with the cyclic shift value includes generating the base sequence, and performing the cyclic shift operation on the base sequence in accordance with the cyclic shift value, so as to acquire the cyclically-shifted base sequence as the cyclically-shifted base sequence corresponding to each SC-FDMA symbol. The acquiring the modulation symbol sequence in accordance with the modulation symbol and the cyclically-shifted base sequence and mapping the modulation symbol sequence to the time-domain and frequency-domain resources in the sPUCCH for transmission includes: multiplying one of the modulation symbols carried in an $i^{th}$ SC-FDMA symbol of the plurality of SC-FDMA symbols with the cyclically-shifted base sequence, so as to acquire a modulation symbol sequence corresponding to the $i^{th}$ SC-FDMA symbol, where i=0, 1, . . . , A−1, and A represents the quantity of the SC-FDMA symbols; and mapping the modulation symbol sequence corresponding to the $i^{th}$ SC-FDMA symbol to the $i^{th}$ SC-FDMA symbol for transmission. When different cyclic shift values are applied to different SC-FDMA symbols and the same ACK/NACK feedback information is carried in each SC-FDMA symbol, the generating the base sequence and performing the cyclic shift operation on the base sequence in accordance with the cyclic shift value includes generating the base sequence, and performing the cyclic shift operation on the base sequence in accordance with the cyclic shift value corresponding to each SC-FDMA symbol, so as to acquire the cyclically-shifted base sequence corresponding to the SC-FDMA symbol respectively. The acquiring the modulation symbol sequence in accordance with the modulation symbol and the cyclically-shifted base sequence and mapping the modulation symbol sequence to the time-domain and frequency-domain resources in the sPUCCH for transmission includes: multiplying the modulation symbol with the cyclically-shifted base sequence corresponding to each SC-FDMA symbol, so as to acquire the modulation symbol sequence corresponding to each SC-FDMA symbol respectively; and mapping the modulation symbol sequence corresponding to each SC-FDMA symbol to a corresponding one of the SC-FDMA symbols for transmission. When different cyclic shift values are applied to different SC-FDMA symbols and different ACK/NACK feedback information is carried in different SC-FDMA symbols, the generating the base sequence and performing the cyclic shift operation on the base sequence in accordance with the cyclic shift value includes generating the base sequence, and performing the cyclic shift operation on the base sequence in accordance with the cyclic shift value corresponding to each SC-FDMA symbol, so as to acquire the cyclically-shifted base sequence corresponding to each SC-FDMA symbol respectively. The acquiring the modulation symbol sequence in accordance with the modulation symbol and the cyclically-shifted base sequence and mapping the modulation symbol sequence to the time-domain and frequency-domain resources in the sPUCCH for transmission includes: multiplying one of the modulation symbols carried in an $i^{th}$ SC-FDMA symbol of the plurality of SC-FDMA symbols with the cyclically-shifted base sequence corresponding to the $i^{th}$ SC-FDMA symbol, so as to acquire a modulation symbol sequence corresponding to the $i^{th}$ SC-FDMA symbol, where i=0, 1, . . . , A−1, and A represents the quantity of the SC-FDMA symbols; and mapping the modulation symbol sequence corresponding to the $i^{th}$ SC-FDMA symbol to the $i^{th}$ SC-FDMA symbol for transmission.

In some possible embodiments of the present disclosure, the acquiring the modulation symbol sequence in accordance with the modulation symbol and the cyclically-shifted base sequence and mapping the modulation symbol sequence to the time-domain and frequency-domain resources in the sPUCCH for transmission includes acquiring the modulation symbol sequence in accordance with the modulation symbol, the cyclically-shifted base sequence and a time-domain orthogonal spreading sequence, and mapping the modulation symbol sequence to the frequency-domain resources of the sPUCCH for transmission.

In some possible embodiments of the present disclosure, when the same cyclic shift value is applied for each SC-FDMA symbol, the generating the base sequence and performing the cyclic shift operation on the base sequence in accordance with the cyclic shift value includes generating the base sequence, and performing a cyclic shift operation on the base sequence in accordance with the cyclic shift value, so as to acquire the cyclically-shifted base sequence as the cyclically-shifted base sequence corresponding to each SC-FDMA symbol. The acquiring the modulation symbol sequence in accordance with the modulation symbol and the cyclically-shifted base sequence and mapping the modulation symbol sequence to the time-domain and frequency-domain resources in the sPUCCH for transmission includes: multiplying the modulation symbol with the cyclically-shifted base sequence so as to acquire a modulation symbol sequence; multiplying the modulation symbol sequence with a time-domain orthogonal spreading sequence acquired in advance, so as to acquire a plurality of orthogonally-spread modulation symbol sequences, a length of the time-domain orthogonal spreading sequence being equal to the quantity of the SC-FDMA symbols occupied by the sPUCCH; and mapping the plurality of orthogonally-spread modulation symbol sequences to the plurality of SC-FDMA symbols for transmission. When different cyclic shift values are applied to different SC-FDMA symbols, the generating the base sequence and performing the cyclic shift operation on the base sequence in accordance with the cyclic shift value includes generating the base sequence, and performing the cyclic shift operation on the base sequence in accordance with the cyclic shift value corresponding to each SC-FDMA symbol, so as to acquire the cyclically-shifted base sequence corresponding to each SC-FDMA symbol respectively. The acquiring the modulation symbol sequence in accordance with the modulation symbol and the cyclically-shifted base sequence and mapping the modulation symbol sequence to the time-domain and frequency-domain resources in the sPUCCH for transmission includes: multiplying the modulation symbol with a cyclically-shifted base sequence corresponding to an $i^{th}$ SC-FDMA symbol of the plurality of SC-FDMA symbols, and multiplying the modulation symbol with an $i^{th}$ orthogonal factor in an orthogonal sequence corresponding to the $i^{th}$ SC-FDMA symbol, so as to acquire a modulation symbol sequence corresponding to the $i^{th}$ SC-FDMA symbol, where i=0, 1, . . . , A−1, and A represents the quantity of the SC-FDMA symbols; and mapping the modulation symbol sequence corresponding to each SC-FDMA to the corresponding SC-FDMA symbol for transmission.

In some possible embodiments of the present disclosure, when a plurality of frequency-domain scheduling resource elements is occupied by the sPUCCH, the generating the base sequence and performing the cyclic shift operation on the base sequence in accordance with the cyclic shift value includes generating the base sequence in accordance with a length of each frequency-domain scheduling resource element, and performing the cyclic shift operation on the base sequence in accordance with the cyclic shift value.

In some possible embodiments of the present disclosure, the acquiring the modulation symbol sequence in accordance with the modulation symbol and the cyclically-shifted base sequence and mapping the modulation symbol sequence to the time-domain and frequency-domain resources in the sPUCCH for transmission includes: carrying same ACK/NACK feedback information on each frequency-domain scheduling resource element; or carrying different ACK/NACK feedback information on different frequency-domain scheduling resource elements.

In some possible embodiments of the present disclosure, when the same ACK/NACK feedback information is carried in each frequency-domain scheduling resource element, the acquiring the modulation symbol sequence in accordance with the modulation symbol and the cyclically-shifted base sequence and mapping the modulation symbol sequence to the time-domain and frequency-domain resources in the sPUCCH for transmission includes: multiplying the modulation symbol with the cyclically-shifted base sequence so as to acquire a modulation symbol sequence corresponding to one frequency-domain scheduling resource element; and duplicating the modulation symbol sequence corresponding to the one frequency-domain scheduling resource element into a plurality of modulation symbol sequences, and mapping the plurality of modulation symbol sequences to the frequency-domain scheduling resource elements occupied by the sPUCCH respectively for transmission. When different ACK/NACK feedback information is carried in different frequency-domain scheduling resource elements, the acquiring the modulation symbol sequence in accordance with the modulation symbol and the cyclically-shifted base sequence and mapping the modulation symbol sequence to the time-domain and frequency-domain resources in the sPUCCH for transmission includes: multiplying one of the modulation symbols carried in each frequency-domain scheduling resource element with the cyclically-shifted base sequence, so as to acquire the modulation symbol sequence corresponding to each frequency-domain scheduling resource element respectively; and mapping the modulation symbol sequence corresponding to each frequency-domain scheduling resource element to the corresponding frequency-domain scheduling resource element for transmission.

In some possible embodiments of the present disclosure, when a plurality of frequency-domain scheduling resource elements is occupied by the sPUCCH, the generating the base sequence and performing the cyclic shift operation on the base sequence in accordance with the cyclic shift value includes generating the base sequence in accordance with a total length of the frequency-domain scheduling resource elements, and performing the cyclic shift operation on the base sequence in accordance with the cyclic shift value. The acquiring the modulation symbol sequence in accordance with the modulation symbol and the cyclically-shifted base sequence and mapping the modulation symbol sequence to the time-domain and frequency-domain resources in the sPUCCH for transmission includes: multiplying the modulation symbol with the cyclically-shifted base sequence so as to acquire the modulation symbol sequence; and mapping the modulation symbol sequence to the plurality of frequency-domain scheduling resource elements occupied by the sPUCCH for transmission.

In some possible embodiments of the present disclosure, the base sequence may be a CAZAC sequence.

According to the base station in the embodiments of the present disclosure, the sPUCCH may be transmitted in accordance with the cyclic shift value notified through the downlink control channel corresponding to the downlink data, e.g., through the DL grant, so as to flexibly control different UEs to transmit the sPUCCH through the same resource in a multiplexing manner, thereby to provide a scheme for the transmission of the sPUCCH as compared with the conventional LTE system where the channel transmission is defined on a subframe basis.

It should be appreciated that, the implementation of the base station may refer to the implementation of the above-mentioned sPUCCH transmission method, with the same technical effect.

It should be further appreciated that, serial numbers of the steps shall not be used to define the order of the steps, and instead, the order of the steps shall be determined in accordance with their functions and internal logics.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A shortened Physical Uplink Control Channel (sPUCCH) transmission method, comprising:
    receiving downlink data, and acquiring a cyclic shift value for the transmission of an sPUCCH in accordance with indication information carried in a downlink control channel corresponding to the received downlink data; and
    transmitting the sPUCCH in accordance with the cyclic shift value, Acknowledgement (ACK)/Negative ACK (NACK) feedback information for the downlink data being carried in the sPUCCH,
    wherein the transmitting the sPUCCH in accordance with the cyclic shift value comprises:
    generating a base sequence, and performing a cyclic shift operation on the base sequence in accordance with the cyclic shift value;
    modulating the ACK/NACK feedback information so as to acquire a modulation symbol; and
    acquiring a modulation symbol sequence in accordance with the modulation symbol and the cyclically-shifted base sequence, and mapping the modulation symbol sequence to time-domain and frequency-domain resources of the sPUCCH for transmission,
    wherein the generating the base sequence and performing the cyclic shift operation on the base sequence in accordance with the cyclic shift value further comprises at least one of method 2 or method 3:

method 2: when a plurality of frequency-domain scheduling resource elements is occupied by the sPUCCH, generating the base sequence in accordance with a length of each frequency-domain scheduling resource element, and performing the cyclic shift operation on the base sequence in accordance with the cyclic shift value;

method 3: when a plurality of frequency-domain scheduling resource elements is occupied by the sPUCCH, the generating the base sequence and performing the cyclic shift operation on the base sequence in accordance with the cyclic shift value comprises generating the base sequence in accordance with a total length of the frequency-domain scheduling resource elements, and performing the cyclic shift operation on the base sequence in accordance with the cyclic shift value, and the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying the modulation symbol with the cyclically-shifted base sequence, so as to acquire the modulation symbol sequence, and mapping the modulation symbol sequence to the plurality of frequency-domain scheduling resource elements occupied by the sPUCCH for transmission.

2. The method according to claim 1, wherein the acquiring the modulation symbol sequence in accordance with the modulation symbol and the cyclically-shifted base sequence and mapping the modulation symbol sequence to the time-domain and frequency-domain resources in the sPUCCH for transmission comprises:

when method 2 is adopted,
carrying same ACK/NACK feedback information on each frequency-domain scheduling resource element; or
carrying different ACK/NACK feedback information on different frequency-domain scheduling resource elements.

3. The method according to claim 2, wherein when the same cyclic shift value is applied to each SC-FDMA symbol and the same ACK/NACK feedback information is carried in each SC-FDMA symbol, the generating the base sequence and performing the cyclic shift operation on the base sequence in accordance with the cyclic shift value comprises generating the base sequence, and performing the cyclic shift operation on the base sequence in accordance with the cyclic shift value, so as to acquire the cyclically-shifted base sequence as the cyclically-shifted base sequence corresponding to each SC-FDMA symbol, and the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying the modulation symbol with the cyclically-shifted base sequence so as to acquire the modulation symbol sequence carried in one SC-FDMA symbol; and duplicating the modulation symbol sequence carried in the one SC-FDMA symbol into a plurality of modulation symbol sequences and mapping the duplicated modulation symbol sequences to the SC-FDMA symbols respectively for transmission, when the same cyclic shift value is applied to each SC-FDMA symbol and different ACK/NACK feedback information is carried in different SC-FDMA symbols, the generating the base sequence and performing the cyclic shift operation on the base sequence in accordance with the cyclic shift value comprises generating the base sequence, and performing the cyclic shift operation on the base sequence in accordance with the cyclic shift value, so as to acquire the cyclically-shifted base sequence as the cyclically-shifted base sequence corresponding to each SC-FDMA symbol, and the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying one of the modulation symbols carried in an $i^{th}$ SC-FDMA symbol of the plurality of SC-FDMA symbols with the cyclically-shifted base sequence, so as to acquire a modulation symbol sequence corresponding to the $i^{th}$ SC-FDMA symbol, where i=0, 1, . . . , A–1, and A represents the quantity of the SC-FDMA symbols; and mapping the modulation symbol sequence corresponding to the $i^{th}$ SC-FDMA symbol to the $i^{th}$ SC-FDMA symbol for transmission, when different cyclic shift values are applied to different SC-FDMA symbols and the same ACK/NACK feedback information is carried in each SC-FDMA symbol, the generating the base sequence and performing the cyclic shift operation on the base sequence in accordance with the cyclic shift value comprises generating the base sequence, and performing the cyclic shift operation on the base sequence in accordance with the cyclic shift value corresponding to each SC-FDMA symbol, so as to acquire the cyclically-shifted base sequence corresponding to the SC-FDMA symbol respectively, and the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying the modulation symbol with the cyclically-shifted base sequence corresponding to each SC-FDMA symbol, so as to acquire the modulation symbol sequence corresponding to each SC-FDMA symbol respectively; and mapping the modulation symbol sequence corresponding to each SC-FDMA symbol to a corresponding one of the SC-FDMA symbols for transmission, and when different cyclic shift values are applied to different SC-FDMA symbols and different ACK/NACK feedback information is carried in different SC-FDMA symbols, the generating the base sequence and performing the cyclic shift operation on the base sequence in accordance with the cyclic shift value comprises generating the base sequence, and performing the cyclic shift operation on the base sequence in accordance with the cyclic shift value corresponding to each SC-FDMA symbol, so as to acquire the cyclically-shifted base sequence corresponding to each SC-FDMA symbol respectively, and the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying one of the modulation symbols carried in an $i^{th}$ SC-FDMA symbol of the plurality of SC-FDMA symbols with the cyclically-shifted base sequence corresponding to the $i^{th}$ SC-FDMA symbol, so as to acquire a modulation symbol sequence corresponding to the $i^{th}$ SC-FDMA symbol, where i=0, 1, . . . , A−1, and A represents the quantity of the SC-FDMA symbols; and mapping the modulation symbol sequence corresponding to the $i^{th}$ SC-FDMA symbol to the $i^{th}$ SC-FDMA symbol for transmission;

wherein the acquiring the modulation symbol sequence in accordance with the modulation symbol, the cyclically-shifted base sequence and a time-domain orthogonal spreading sequence, and mapping the modulation symbol sequence to the time-domain and frequency-domain resources of the sPUCCH for transmission comprises:

when the same cyclic shift value is applied for each SC-FDMA symbol, the generating the base sequence and performing the cyclic shift operation on the base sequence in accordance with the cyclic shift value comprises generating the base sequence, and performing a cyclic shift operation on the base sequence in accordance with the cyclic shift value, so as to acquire the cyclically-shifted base sequence as the cyclically-shifted base sequence corresponding to each SC-FDMA symbol, and the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying the modulation symbol with the cyclically-shifted base sequence, so as to acquire a modulation symbol sequence; multiplying the modulation symbol sequence with a time-domain orthogonal spreading sequence acquired in advance, so as to acquire a plurality of orthogonally-spread modulation symbol sequences, wherein a length of the time-domain orthogonal spreading sequence is equal to the quantity of the SC-FDMA symbols occupied by the sPUCCH; and mapping the plurality of orthogonally-spread modulation symbol sequences to the plurality of SC-FDMA symbols for transmission, and when different cyclic shift values are applied to different SC-FDMA symbols, the generating the base sequence and performing the cyclic shift operation on the base sequence in accordance with the cyclic shift value comprises generating the base sequence, and performing the cyclic shift operation on the base sequence in accordance with the cyclic shift value corresponding to each SC-FDMA symbol, so as to acquire the cyclically-shifted base sequence corresponding to each SC-FDMA symbol respectively, and the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying the modulation symbol with a cyclically-shifted base sequence corresponding to an $i^{th}$ SC-FDMA symbol of the plurality of SC-FDMA symbols, and multiplying the modulation symbol with an $i^{th}$ orthogonal factor in an orthogonal sequence corresponding to the $i^{th}$ SC-FDMA symbol, so as to acquire a modulation symbol sequence corresponding to the $i^{th}$ SC-FDMA symbol, where i=0, 1, . . . , A−1, and A represents the quantity of the SC-FDMA symbols; and mapping the modulation symbol sequence corresponding to each SC-FDMA to the corresponding SC-FDMA symbol for transmission;

wherein when the same ACK/NACK feedback information is carried in each frequency-domain scheduling resource element, the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying the modulation symbol with the cyclically-shifted base sequence so as to acquire a modulation symbol sequence corresponding to one frequency-domain scheduling resource element; and duplicating the modulation symbol sequence corresponding to the one frequency-domain scheduling resource element into a plurality of modulation symbol sequences, and mapping the plurality of modulation symbol sequences to the frequency-domain scheduling resource elements occupied by the sPUCCH respectively for transmission, and when different ACK/NACK feedback information is carried in different frequency-domain scheduling resource elements, the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying one of the modulation symbols carried in each frequency-domain scheduling resource element with the cyclically-shifted base sequence, so as to acquire the modulation symbol sequence corresponding to each frequency-domain scheduling resource element respectively; and mapping the modulation symbol sequence corresponding to each frequency-domain scheduling resource element to the corresponding frequency-domain scheduling resource element for transmission.

4. The method according to claim 1, wherein the receiving the downlink data, and acquiring the cyclic shift value for the transmission of the sPUCCH in accordance with the indication information carried in the downlink control channel corresponding to the received downlink data comprises:

receiving a shortened Physical Downlink Shared Channel (sPDSCH) with a corresponding downlink control channel or a downlink control channel indicating that a short downlink Semi-Persistent Scheduling (SPS) resource release and acquiring the cyclic shift value for the transmission of the sPUCCH in accordance with the indication information carried in the downlink control channel; or receiving an sPDSCH without the corresponding downlink control channel, and acquiring the cyclic shift value for the transmission of the sPUCCH in accordance with the indication information carried in the downlink control channel indicating that the short downlink SPS resource activation.

5. An sPUCCH transmission method, comprising:

transmitting downlink data, and carrying indication information in a downlink control channel corresponding to the downlink data, the indication information being adopted by a UE for acquiring a cyclic shift value for the transmission of an sPUCCH; and receiving the sPUCCH and acquiring ACK/NACK feedback information for the downlink data in the sPUCCH, the sPUCCH being transmitted by the UE in accordance with the cyclic shift value, wherein the receiving the sPUCCH and acquiring the ACK/NACK feedback information for the downlink data in the sPUCCH comprises determining the sPUCCH transmitted by the UE through:
generating a base sequence, and performing a cyclic shift operation on the base sequence in accordance with the cyclic shift value;
modulating the ACK/NACK feedback information so as to acquire a modulation symbol; and
acquiring a modulation symbol sequence in accordance with the modulation symbol and the cyclically-shifted base sequence, and mapping the modulation symbol sequence to time-domain and frequency-domain resources of the sPUCCH for transmission,
wherein the generating the base sequence and performing the cyclic shift operation on the base sequence in accordance with the cyclic shift value further comprises at least one of method 2 or method 3:
method 2: when a plurality of frequency-domain scheduling resource elements is occupied by the sPUCCH, generating the base sequence in accordance with a length of each frequency-domain scheduling resource element, and performing the cyclic shift operation on the base sequence in accordance with the cyclic shift value;
method 3: when a plurality of frequency-domain scheduling resource elements is occupied by the sPUCCH, the generating the base sequence and performing the cyclic shift operation on the base sequence in accordance with the cyclic shift value comprises generating the base sequence in accordance with a total length of the frequency-domain scheduling resource elements, and performing the cyclic shift operation on the base sequence in accordance with the cyclic shift value, and
the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying the modulation symbol with the cyclically-shifted base sequence, so as to acquire the modulation symbol sequence, and mapping the modulation symbol sequence to the plurality of frequency-domain scheduling resource elements occupied by the sPUCCH for transmission.

6. The method according to claim 5, wherein the acquiring the modulation symbol sequence in accordance with the modulation symbol and the cyclically-shifted base sequence and mapping the modulation symbol sequence to the time-domain and frequency-domain resources in the sPUCCH for transmission comprises:
when method 2 is adopted,
carrying same ACK/NACK feedback information on each frequency-domain scheduling resource element; or
carrying different ACK/NACK feedback information on different frequency-domain scheduling resource elements.

7. The method according to claim 6, wherein when the same cyclic shift value is applied to each SC-FDMA symbol and the same ACK/NACK feedback information is carried in each SC-FDMA symbol, the generating the base sequence and performing the cyclic shift operation on the base sequence in accordance with the cyclic shift value comprises generating the base sequence, and performing the cyclic shift operation on the base sequence in accordance with the cyclic shift value, so as to acquire the cyclically-shifted base sequence as the cyclically-shifted base sequence corresponding to each SC-FDMA symbol, and the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying the modulation symbol with the cyclically-shifted base sequence so as to acquire the modulation symbol sequence carried in one SC-FDMA symbol; and duplicating the modulation symbol sequence carried in the one SC-FDMA symbol into a plurality of modulation symbol sequences and mapping the duplicated modulation symbol sequences to the SC-FDMA symbols respectively for transmission,
when the same cyclic shift value is applied to each SC-FDMA symbol and different ACK/NACK feedback information is carried in different SC-FDMA symbols, the generating the base sequence and performing the cyclic shift operation on the base sequence in accordance with the cyclic shift value comprises generating the base sequence, and performing the cyclic shift operation on the base sequence in accordance with the cyclic shift value, so as to acquire the cyclically-shifted base sequence as the cyclically-shifted base sequence corresponding to each SC-FDMA symbol, and the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying one of the modulation symbols carried in an $i^{th}$ SC-FDMA symbol of the plurality of SC-FDMA symbols with the cyclically-shifted base sequence, so as to acquire a modulation symbol sequence corresponding to the $i^{th}$ SC-FDMA symbol, where i=0, 1, . . . , A−1, and A represents the quantity of the SC-FDMA symbols; and mapping the modulation symbol sequence corresponding to the $i^{th}$ SC-FDMA symbol to the $i^{th}$ SC-FDMA symbol for transmission,
when different cyclic shift values are applied to different SC-FDMA symbols and the same ACK/NACK feedback information is carried in each SC-FDMA symbol, the generating the base sequence and performing the cyclic shift operation on the base sequence in accordance with the cyclic shift value comprises generating the base sequence, and performing the cyclic shift operation on the base sequence in accordance with the cyclic shift value corresponding to each SC-FDMA symbol, so as to acquire the cyclically-shifted base sequence corresponding to the SC-FDMA symbol respectively, and the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying the modulation symbol with the cyclically-shifted base sequence corresponding to each SC-FDMA symbol, so as to acquire the modulation symbol sequence corresponding to each SC-FDMA symbol respectively; and mapping the modulation symbol sequence corresponding to each SC-FDMA symbol to a corresponding one of the SC-FDMA symbols for transmission, and
when different cyclic shift values are applied to different SC-FDMA symbols and different ACK/NACK feedback information is carried in different SC-FDMA symbols, the generating the base sequence and performing the cyclic shift operation on the base sequence in accordance with the cyclic shift value comprises generating the base sequence, and performing the cyclic shift operation on the base sequence in accordance with the cyclic shift value corresponding to each SC-FDMA symbol, so as to acquire the cyclically-shifted base sequence corresponding to each SC-FDMA symbol respectively, and the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying one of the modulation symbols carried in an $i^{th}$ SC-FDMA symbol of the plurality of SC-FDMA symbols with the cyclically-shifted base sequence corresponding to the $i^{th}$ SC-FDMA symbol, so as to acquire a modulation symbol sequence corresponding to the $i^{th}$ SC-FDMA symbol, where i=0, 1, . . . , A−1, and A represents the quantity of the SC-FDMA symbols; and mapping the modulation symbol sequence corresponding to the $i^{th}$ SC-FDMA symbol to the $i^{th}$ SC-FDMA symbol for transmission;

wherein the acquiring the modulation symbol sequence in accordance with the modulation symbol, the cyclically-shifted base sequence and a time-domain orthogonal spreading sequence, and mapping the modulation symbol sequence to the time-domain and frequency-domain resources of the sPUCCH for transmission comprises:

when the same cyclic shift value is applied for each SC-FDMA symbol, the generating the base sequence and performing the cyclic shift operation on the base sequence in accordance with the cyclic shift value comprises generating the base sequence, and performing a cyclic shift operation on the base sequence in accordance with the cyclic shift value, so as to acquire the cyclically-shifted base sequence as the cyclically-shifted base sequence corresponding to each SC-FDMA symbol, and the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying the modulation symbol with the cyclically-shifted base sequence, so as to acquire a modulation symbol sequence; multiplying the modulation symbol sequence with a time-domain orthogonal spreading sequence acquired in advance, so as to acquire a plurality of orthogonally-spread modulation symbol sequences, wherein a length of the time-domain orthogonal spreading sequence is equal to the quantity of the SC-FDMA symbols occupied by the sPUCCH; and mapping the plurality of orthogonally-spread modulation symbol sequences to the plurality of SC-FDMA symbols for transmission, and when different cyclic shift values are applied to different SC-FDMA symbols, the generating the base sequence and performing the cyclic shift operation on the base sequence in accordance with the cyclic shift value comprises generating the base sequence, and performing the cyclic shift operation on the base sequence in accordance with the cyclic shift value corresponding to each SC-FDMA symbol, so as to acquire the cyclically-shifted base sequence corresponding to each SC-FDMA symbol respectively, and the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying the modulation symbol with a cyclically-shifted base sequence corresponding to an $i^{th}$ SC-FDMA symbol of the plurality of SC-FDMA symbols, and multiplying the modulation symbol with an $i^{th}$ orthogonal factor in an orthogonal sequence corresponding to the $i^{th}$ SC-FDMA symbol, so as to acquire a modulation symbol sequence corresponding to the $i^{th}$ SC-FDMA symbol, where i=0, 1, . . . , A−1, and A represents the quantity of the SC-FDMA symbols; and mapping the modulation symbol sequence corresponding to each SC-FDMA to the corresponding SC-FDMA symbol for transmission;

wherein when the same ACK/NACK feedback information is carried in each frequency-domain scheduling resource element, the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying the modulation symbol with the cyclically-shifted base sequence so as to acquire a modulation symbol sequence corresponding to one frequency-domain scheduling resource element; and duplicating the modulation symbol sequence corresponding to the one frequency-domain scheduling resource element into a plurality of modulation symbol sequences, and mapping the plurality of modulation symbol sequences to the frequency-domain scheduling resource elements occupied by the sPUCCH respectively for transmission, and when different ACK/NACK feedback information is carried in different frequency-domain scheduling resource elements, the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying one of the modulation symbols carried in each frequency-domain scheduling resource element with the cyclically-shifted base sequence, so as to acquire the modulation symbol sequence corresponding to each frequency-domain scheduling resource element respectively; and mapping the modulation symbol sequence corresponding to each frequency-domain scheduling resource element to the corresponding frequency-domain scheduling resource element for transmission.

8. The method according to claim 5, wherein the transmitting the downlink data and carrying the indication information in the downlink control channel corresponding to the downlink data comprises:

transmitting an sPDSCH with a corresponding downlink control channel or a downlink control channel indicating that a short downlink SPS resource release, and carrying the indication information in the downlink control channel; or transmitting an sPDSCH without the corresponding downlink control channel, and carrying the indication information in the downlink control channel indicating that the short downlink SPS resource activation.

9. A User Equipment (UE), comprising a processor, a memory and a transceiver, wherein the processor is configured to read programs stored in the memory, so as to: receive through the transceiver downlink data, and acquire a cyclic shift value for the transmission of an sPUCCH in accordance with indication information carried in a downlink control channel corresponding to the received downlink data; and transmit through the transceiver the sPUCCH in accordance with the cyclic shift value, ACK/NACK feedback information for the downlink data being carried in the sPUCCH, the transceiver is configured to receive and transmit data, and the memory is configured to store therein data for the operation of the processor, wherein the transmitting the sPUCCH in accordance with the cyclic shift value comprises:

generating a base sequence, and performing a cyclic shift operation on the base sequence in accordance with the cyclic shift value;

modulating the ACK/NACK feedback information so as to acquire a modulation symbol; and acquiring a modulation symbol sequence in accordance with the modulation symbol and the cyclically-shifted base sequence, and mapping the modulation symbol sequence to time-domain and frequency-domain resources of the sPUCCH for transmission, wherein the generating the base sequence and performing the cyclic shift operation on the base sequence in accordance with the cyclic shift value further comprises at least one of method 2 or method 3:

method 2: when a plurality of frequency-domain scheduling resource elements is occupied by the sPUCCH, generating the base sequence in accordance with a length of each frequency-domain scheduling resource element, and performing the cyclic shift operation on the base sequence in accordance with the cyclic shift value;

method 3: when a plurality of frequency-domain scheduling resource elements is occupied by the sPUCCH, the generating the base sequence and performing the cyclic shift operation on the base sequence in accordance with the cyclic shift value comprises generating the base sequence in accordance with a total length of the frequency-domain scheduling resource elements, and performing the cyclic shift operation on the base sequence in accordance with the cyclic shift value, and the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying the modulation symbol with the cyclically-shifted base sequence, so as to acquire the modulation symbol sequence, and mapping the modulation symbol sequence to the plurality of frequency-domain scheduling resource elements occupied by the sPUCCH for transmission.

10. The UE according to claim 9, wherein the acquiring the modulation symbol sequence in accordance with the modulation symbol and the cyclically-shifted base sequence and mapping the modulation symbol sequence to the time-domain and frequency-domain resources in the sPUCCH for transmission comprises:

when method 2 is adopted, carrying same ACK/NACK feedback information on each frequency-domain scheduling resource element; or carrying different ACK/NACK feedback information on different frequency-domain scheduling resource elements.

11. The UE according to claim 10, wherein when the same cyclic shift value is applied to each SC-FDMA symbol and the same ACK/NACK feedback information is carried in each SC-FDMA symbol, the generating the base sequence and performing the cyclic shift operation on the base sequence in accordance with the cyclic shift value comprises generating the base sequence, and performing the cyclic shift operation on the base sequence in accordance with the cyclic shift value, so as to acquire the cyclically-shifted base sequence as the cyclically-shifted base sequence corresponding to each SC-FDMA symbol, and the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying the modulation symbol with the cyclically-shifted base sequence so as to acquire the modulation symbol sequence carried in one SC-FDMA symbol; and duplicating the modulation symbol sequence carried in the one SC-FDMA symbol into a plurality of modulation symbol sequences and mapping the duplicated modulation symbol sequences to the SC-FDMA symbols respectively for transmission, when the same cyclic shift value is applied to each SC-FDMA symbol and different ACK/NACK feedback information is carried in different SC-FDMA symbols, the generating the base sequence and performing the cyclic shift operation on the base sequence in accordance with the cyclic shift value comprises generating the base sequence, and performing the cyclic shift operation on the base sequence in accordance with the cyclic shift value, so as to acquire the cyclically-shifted base sequence as the cyclically-shifted base sequence corresponding to each SC-FDMA symbol, and the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying one of the modulation symbols carried in an $i^{th}$ SC-FDMA symbol of the plurality of SC-FDMA symbols with the cyclically-shifted base sequence, so as to acquire a modulation symbol sequence corresponding to the $i^{th}$ SC-FDMA symbol, where i=0, 1, . . . , A−1, and A represents the quantity of the SC-FDMA symbols; and mapping the modulation symbol sequence corresponding to the $i^{th}$ SC-FDMA symbol to the $i^{th}$ SC-FDMA symbol for transmission, when different cyclic shift values are applied to different SC-FDMA symbols and the same ACK/NACK feedback information is carried in each SC-FDMA symbol, the generating the base sequence and performing the cyclic shift operation on the base sequence in accordance with the cyclic shift value comprises generating the base sequence, and performing the cyclic shift operation on the base sequence in accordance with the cyclic shift value corresponding to each SC-FDMA symbol, so as to acquire the cyclically-shifted base sequence corresponding to the SC-FDMA symbol respectively, and the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying the modulation symbol with the cyclically-shifted base sequence corresponding to each SC-FDMA symbol, so as to acquire the modulation symbol sequence corresponding to each SC-FDMA symbol respectively; and mapping the modulation symbol sequence corresponding to each SC-FDMA symbol to a corresponding one of the SC-FDMA symbols for transmission, and when different cyclic shift values are applied to different SC-FDMA symbols and different ACK/NACK feedback information is carried in different SC-FDMA symbols, the generating the base sequence and performing the cyclic shift operation on the base sequence in accordance with the cyclic shift value comprises generating the base sequence, and performing the cyclic shift operation on the base sequence in accordance with the cyclic shift value corresponding to each SC-FDMA symbol, so as to acquire the cyclically-shifted base sequence corresponding to each SC-FDMA symbol respectively, and the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying one of the modulation symbols carried in an $i^{th}$ SC-FDMA symbol of the plurality of SC-FDMA symbols with the cyclically-shifted base sequence corresponding to the $i^{th}$ SC-FDMA symbol, so as to acquire a modulation symbol sequence corresponding to the $i^{th}$ SC-FDMA symbol, where i=0, 1, . . . , A−1, and A represents the quantity of the SC-FDMA symbols; and mapping the modulation symbol sequence corresponding to the $i^{th}$ SC-FDMA symbol to the $i^{th}$ SC-FDMA symbol for transmission;

wherein the acquiring the modulation symbol sequence in accordance with the modulation symbol, the cyclically-shifted base sequence and a time-domain orthogonal spreading sequence, and mapping the modulation symbol sequence to the time-domain and frequency-domain resources of the sPUCCH for transmission comprises:

when the same cyclic shift value is applied for each SC-FDMA symbol, the generating the base sequence and performing the cyclic shift operation on the base sequence in accordance with the cyclic shift value comprises generating the base sequence, and performing a cyclic shift operation on the base sequence in accordance with the cyclic shift value, so as to acquire the cyclically-shifted base sequence as the cyclically-shifted base sequence corresponding to each SC-FDMA symbol, and the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying the modulation symbol with the cyclically-shifted base sequence, so as to acquire a modulation symbol sequence; multiplying the modulation symbol sequence with a time-domain orthogonal spreading sequence acquired in advance, so as to acquire a plurality of orthogonally-spread modulation symbol sequences, wherein a length of the time-domain orthogonal spreading sequence is equal to the quantity of the SC-FDMA symbols occupied by the sPUCCH; and mapping the plurality of orthogonally-spread modulation symbol sequences to the plurality of SC-FDMA symbols for transmission, and when different cyclic shift values are applied to different SC-FDMA symbols, the generating the base sequence and performing the cyclic shift operation on the base sequence in accordance with the cyclic shift value comprises generating the base sequence, and performing the cyclic shift operation on the base sequence in accordance with the cyclic shift value corresponding to each SC-FDMA symbol, so as to acquire the cyclically-shifted base sequence corresponding to each SC-FDMA symbol respectively, and the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying the modulation symbol with a cyclically-shifted base sequence corresponding to an $i^{th}$ SC-FDMA symbol of the plurality of SC-FDMA symbols, and multiplying the modulation symbol with an $i^{th}$ orthogonal factor in an orthogonal sequence corresponding to the $i^{th}$ SC-FDMA symbol, so as to acquire a modulation symbol sequence corresponding to the $i^{th}$ SC-FDMA symbol, where i=0, 1, . . . , A−1, and A represents the quantity of the SC-FDMA symbols; and mapping the modulation symbol sequence corresponding to each SC-FDMA to the corresponding SC-FDMA symbol for transmission;

wherein when the same ACK/NACK feedback information is carried in each frequency-domain scheduling resource element, the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying the modulation symbol with the cyclically-shifted base sequence so as to acquire a modulation symbol sequence corresponding to one frequency-domain scheduling resource element; and duplicating the modulation symbol sequence corresponding to the one frequency-domain scheduling resource element into a plurality of modulation symbol sequences, and mapping the plurality of modulation symbol sequences to the frequency-domain scheduling resource elements occupied by the sPUCCH respectively for transmission, and when different ACK/NACK feedback information is carried in different frequency-domain scheduling resource elements, the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying one of the modulation symbols carried in each frequency-domain scheduling resource element with the cyclically-shifted base sequence, so as to acquire the modulation symbol sequence corresponding to each frequency-domain scheduling resource element respectively; and mapping the modulation symbol sequence corresponding to each frequency-domain scheduling resource element to the corresponding frequency-domain scheduling resource element for transmission.

12. The UE according to claim 9, wherein the receiving the downlink data, and acquiring the cyclic shift value for the transmission of the sPUCCH in accordance with the indication information carried in the downlink control channel corresponding to the received downlink data comprises:
    receiving a shortened Physical Downlink Shared Channel (sPDSCH) with a corresponding downlink control channel or a downlink control channel indicating that a short downlink Semi-Persistent Scheduling (SPS) resource release and acquiring the cyclic shift value for the transmission of the sPUCCH in accordance with the indication information carried in the downlink control channel; or
    receiving an sPDSCH without the corresponding downlink control channel, and acquiring the cyclic shift value for the transmission of the sPUCCH in accordance with the indication information carried in the downlink control channel indicating that the short downlink SPS resource activation.

13. A base station, comprising a processor, a memory and a transceiver, wherein
    the processor is configured to read programs stored in the memory, so as to: transmit through the transceiver downlink data, and carry indication information in a downlink control channel corresponding to the downlink data, the indication information being adopted by a UE for acquiring a cyclic shift value for the transmission of an sPUCCH; and receive through the transceiver the sPUCCH and acquire ACK/NACK feedback information for the downlink data in the sPUCCH, the sPUCCH being transmitted by the UE in accordance with the cyclic shift value,
    the transceiver is configured to receive and transmit data, and
    the memory is configured to store therein data for the operation of the processor,
    wherein the receiving the sPUCCH and acquiring the ACK/NACK feedback information for the downlink data in the sPUCCH comprises determining the sPUCCH transmitted by the UE through:
    generating a base sequence, and performing a cyclic shift operation on the base sequence in accordance with the cyclic shift value;
    modulating the ACK/NACK feedback information so as to acquire a modulation symbol; and
    acquiring a modulation symbol sequence in accordance with the modulation symbol and the cyclically-shifted base sequence, and mapping the modulation symbol sequence to time-domain and frequency-domain resources of the sPUCCH for transmission,
    wherein the generating the base sequence and performing the cyclic shift operation on the base sequence in accordance with the cyclic shift value further comprises at least one of method 2 or method 3:
    method 2: when a plurality of frequency-domain scheduling resource elements is occupied by the sPUCCH, generating the base sequence in accordance with a length of each frequency-domain scheduling resource element, and performing the cyclic shift operation on the base sequence in accordance with the cyclic shift value;
    method 3: when a plurality of frequency-domain scheduling resource elements is occupied by the sPUCCH, the generating the base sequence and performing the cyclic shift operation on the base sequence in accordance with the cyclic shift value comprises generating the base sequence in accordance with a total length of the frequency-domain scheduling resource elements, and performing the cyclic shift operation on the base sequence in accordance with the cyclic shift value, and the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying the modulation symbol with the cyclically-shifted base sequence, so as to acquire the modulation symbol sequence, and mapping the modulation symbol sequence to the plurality of frequency-domain scheduling resource elements occupied by the sPUCCH for transmission.

14. The base station according to claim 13, wherein the acquiring the modulation symbol sequence in accordance with the modulation symbol and the cyclically-shifted base sequence and mapping the modulation symbol sequence to the time-domain and frequency-domain resources in the sPUCCH for transmission comprises:
    carrying same ACK/NACK feedback information on each frequency-domain scheduling resource element; or
    carrying different ACK/NACK feedback information on different frequency-domain scheduling resource elements.

15. The base station according to claim 14, wherein when the same cyclic shift value is applied to each SC-FDMA symbol and the same ACK/NACK feedback information is carried in each SC-FDMA symbol, the generating the base sequence and performing the cyclic shift operation on the base sequence in accordance with the cyclic shift value comprises generating the base sequence, and performing the cyclic shift operation on the base sequence in accordance with the cyclic shift value, so as to acquire the cyclically-shifted base sequence as the cyclically-shifted base sequence corresponding to each SC-FDMA symbol, and the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying the modulation symbol with the cyclically-shifted base sequence so as to acquire the modulation symbol sequence carried in one SC-FDMA symbol; and duplicating the modulation symbol sequence carried in the one SC-FDMA symbol into a plurality of modulation symbol sequences and mapping the duplicated modulation symbol sequences to the SC-FDMA symbols respectively for transmission,
    when the same cyclic shift value is applied to each SC-FDMA symbol and different ACK/NACK feedback information is carried in different SC-FDMA symbols, the generating the base sequence and performing the cyclic shift operation on the base sequence in accordance with the cyclic shift value comprises generating the base sequence, and performing the cyclic shift operation on the base sequence in accordance with the cyclic shift value, so as to acquire the cyclically-shifted base sequence as the cyclically-shifted base sequence corresponding to each SC-FDMA symbol, and the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying one of the modulation symbols carried in an $i^{th}$ SC-FDMA symbol of the plurality of SC-FDMA symbols with the cyclically-shifted base sequence, so as to acquire a modulation symbol sequence corresponding to the $i^{th}$ SC-FDMA symbol, where i=0, 1, . . . , A−1, and A represents the quantity of the SC-FDMA symbols; and mapping the modulation symbol sequence corresponding to the $i^{th}$ SC-FDMA symbol to the $i^{th}$ SC-FDMA symbol for transmission, when different cyclic shift values are applied to different SC-FDMA symbols and the same ACK/NACK feedback information is carried in each SC-FDMA symbol, the generating the base sequence and performing the cyclic shift operation on the base sequence in accordance with the cyclic shift value comprises generating the base sequence, and performing the cyclic shift operation on the base sequence in accordance with the cyclic shift value corresponding to each SC-FDMA symbol, so as to acquire the cyclically-shifted base sequence corresponding to the SC-FDMA symbol respectively, and the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying the modulation symbol with the cyclically-shifted base sequence corresponding to each SC-FDMA symbol, so as to acquire the modulation symbol sequence corresponding to each SC-FDMA symbol respectively; and mapping the modulation symbol sequence corresponding to each SC-FDMA symbol to a corresponding one of the SC-FDMA symbols for transmission, and when different cyclic shift values are applied to different SC-FDMA symbols and different ACK/NACK feedback information is carried in different SC-FDMA symbols, the generating the base sequence and performing the cyclic shift operation on the base sequence in accordance with the cyclic shift value comprises generating the base sequence, and performing the cyclic shift operation on the base sequence in accordance with the cyclic shift value corresponding to each SC-FDMA symbol, so as to acquire the cyclically-shifted base sequence corresponding to each SC-FDMA symbol respectively, and the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying one of the modulation symbols carried in an $i^{th}$ SC-FDMA symbol of the plurality of SC-FDMA symbols with the cyclically-shifted base sequence corresponding to the $i^{th}$ SC-FDMA symbol, so as to acquire a modulation symbol sequence corresponding to the $i^{th}$ SC-FDMA symbol, where i=0, 1, . . . , A−1, and A represents the quantity of the SC-FDMA symbols; and mapping the modulation symbol sequence corresponding to the $i^{th}$ SC-FDMA symbol to the $i^{th}$ SC-FDMA symbol for transmission;

wherein the acquiring the modulation symbol sequence in accordance with the modulation symbol, the cyclically-shifted base sequence and a time-domain orthogonal spreading sequence, and mapping the modulation symbol sequence to the time-domain and frequency-domain resources of the sPUCCH for transmission comprises:

when the same cyclic shift value is applied for each SC-FDMA symbol, the generating the base sequence and performing the cyclic shift operation on the base sequence in accordance with the cyclic shift value comprises generating the base sequence, and performing a cyclic shift operation on the base sequence in accordance with the cyclic shift value, so as to acquire the cyclically-shifted base sequence as the cyclically-shifted base sequence corresponding to each SC-FDMA symbol, and the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying the modulation symbol with the cyclically-shifted base sequence, so as to acquire a modulation symbol sequence; multiplying the modulation symbol sequence with a time-domain orthogonal spreading sequence acquired in advance, so as to acquire a plurality of orthogonally-spread modulation symbol sequences, wherein a length of the time-domain orthogonal spreading sequence is equal to the quantity of the SC-FDMA symbols occupied by the sPUCCH; and mapping the plurality of orthogonally-spread modulation symbol sequences to the plurality of SC-FDMA symbols for transmission, and when different cyclic shift values are applied to different SC-FDMA symbols, the generating the base sequence and performing the cyclic shift operation on the base sequence in accordance with the cyclic shift value comprises generating the base sequence, and performing the cyclic shift operation on the base sequence in accordance with the cyclic shift value corresponding to each SC-FDMA symbol, so as to acquire the cyclically-shifted base sequence corresponding to each SC-FDMA symbol respectively, and the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying the modulation symbol with a cyclically-shifted base sequence corresponding to an $i^{th}$ SC-FDMA symbol of the plurality of SC-FDMA symbols, and multiplying the modulation symbol with an $i^{th}$ orthogonal factor in an orthogonal sequence corresponding to the $i^{th}$ SC-FDMA symbol, so as to acquire a modulation symbol sequence corresponding to the $i^{th}$ SC-FDMA symbol, where i=0, 1, . . . , A−1, and A represents the quantity of the SC-FDMA symbols; and mapping the modulation symbol sequence corresponding to each SC-FDMA to the corresponding SC-FDMA symbol for transmission;

wherein when the same ACK/NACK feedback information is carried in each frequency-domain scheduling resource element, the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying the modulation symbol with the cyclically-shifted base sequence so as to acquire a modulation symbol sequence corresponding to one frequency-domain scheduling resource element; and duplicating the modulation symbol sequence corresponding to the one frequency-domain scheduling resource element into a plurality of modulation symbol sequences, and mapping the plurality of modulation symbol sequences to the frequency-domain scheduling resource elements occupied by the sPUCCH respectively for transmission, and when different ACK/NACK feedback information is carried in different frequency-domain scheduling resource elements, the acquiring the modulation symbol sequence in accordance with the modulation symbol and the cyclically-shifted base sequence and mapping the modulation symbol sequence to the time-domain and frequency-domain resources in the sPUCCH for transmission comprises: multiplying one of the modulation symbols carried in each frequency-domain scheduling resource element with the cyclically-shifted base sequence, so as to acquire the modulation symbol sequence corresponding to each frequency-domain scheduling resource element respectively; and mapping the modulation symbol sequence corresponding to each frequency-domain scheduling resource element to the corresponding frequency-domain scheduling resource element for transmission.

16. The base station according to claim 13, wherein the transmitting the downlink data and carrying the indication information in the downlink control channel corresponding to the downlink data comprises:

transmitting an sPDSCH with a corresponding downlink control channel or a downlink control channel indicating that a short downlink SPS resource release, and carrying the indication information in the downlink control channel; or transmitting an sPDSCH without the corresponding downlink control channel, and carrying the indication information in the downlink control channel indicating that the short downlink SPS resource activation.

* * * * *